(12) United States Patent
Suzuki et al.

(10) Patent No.: US 8,142,864 B2
(45) Date of Patent: Mar. 27, 2012

(54) CELLULOSE ESTER PELLETS, CELLULOSE ESTER FILM, MANUFACTURING METHOD OF CELLULOSE ESTER FILM, POLARIZING PLATE, AND LIQUID CRYSTAL DISPLAY

(75) Inventors: Takatugu Suzuki, Tokyo (JP); Takashi Murakami, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 463 days.

(21) Appl. No.: 12/523,345

(22) PCT Filed: Nov. 22, 2007

(86) PCT No.: PCT/JP2007/072652
§ 371 (c)(1),
(2), (4) Date: Jul. 16, 2009

(87) PCT Pub. No.: WO2008/090677
PCT Pub. Date: Jul. 31, 2008

(65) Prior Publication Data
US 2010/0047480 A1 Feb. 25, 2010

(30) Foreign Application Priority Data
Jan. 25, 2007 (JP) ................................. 2007-014813

(51) Int. Cl.
*C09K 19/00* (2006.01)
*B29C 39/00* (2006.01)
(52) U.S. Cl. .................... 428/1.1; 106/163.01; 252/585; 264/299
(58) Field of Classification Search .................... 428/1.1; 106/163.01; 252/585; 264/299
See application file for complete search history.

(56) References Cited

U.S. PATENT DOCUMENTS
2010/0151156 A1* 6/2010 Kawabe et al. .............. 428/1.31

FOREIGN PATENT DOCUMENTS

| JP | 2000352620 | 12/2000 |
|----|------------|---------|
| JP | 2003231776 | 8/2003 |
| JP | 2003329840 | 11/2003 |
| JP | 2004315605 | 11/2004 |
| JP | 2005134608 | 5/2005 |
| JP | 2006142800 | 6/2006 |
| JP | 2006176736 | 7/2006 |
| JP | 2006241200 | 9/2006 |
| JP | 2006241428 | 9/2006 |
| JP | 2006341443 | 12/2006 |
| JP | 2007169591 | 7/2007 |
| JP | 200813628 | 1/2008 |
| WO | 2007145090 | 12/2007 |
| WO | 2008004461 | 1/2008 |

* cited by examiner

*Primary Examiner* — James J Seidleck
*Assistant Examiner* — Deve E Valdez
(74) *Attorney, Agent, or Firm* — Lucas & Mercanti, LLP

(57) ABSTRACT

The present invention can provide cellulose ester pellets, a cellulose ester film, a manufacturing method thereof, a polarizing plate and a liquid crystal display which minimize a manufacturing load, a facility load and an environmental load, each being given by evaporation or recovery (collection) of solvents and which have excellent optical properties, less coloring and high processing stability, and its manufacturing method. The cellulose ester pellets contains cellulose ester and at least one combination selected from combination A, combination B and combination C, the cellulose ester pellets containing the at least one combination in an amount of from 0.001 to 1.00% by weight based on the cellulose ester, wherein the combination A is a combination of a compound represented by formula (1) and a compound represented by formula (2), the combination B is a combination of a compound represented by formula (3) and a compound represented by formula (4), and the combination C is a combination of a compound represented by formula (5) and a compound represented by formula (6).

12 Claims, No Drawings

CELLULOSE ESTER PELLETS, CELLULOSE ESTER FILM, MANUFACTURING METHOD OF CELLULOSE ESTER FILM, POLARIZING PLATE, AND LIQUID CRYSTAL DISPLAY

CROSS REFERENCE TO RELATED APPLICATION

This is a U.S. National Phase Application under 35 U.S.C. 371 of International Application PCT/JP2007/072652, filed on Nov. 22, 2007, which claims the priority of Japanese Application No. 2007-014813 filed Jan. 25, 2007, the entire contents of both Applications are hereby incorporated by reference.

FIELD OF THE INVENTION

The present invention relates to cellulose ester pellets, a cellulose ester film, a manufacturing method of a cellulose ester film, a polarizing plate and a liquid crystal display.

TECHNICAL BACKGROUND

Liquid crystal displays (LCD's) are widely used as display devices in products such as word processors and personal computers, television sets, monitors, and mobile information terminals because they can be directly connected to an IC circuit, operated at low voltage and low power consumption, and formed into thin devices. The basic structure of the LCD is comprised, for example, of a polarizing plate provided on both sides of a liquid crystal cell.

Incidentally, the polarizing plate only allows light of a fixed direction in the polarizing plane to pass. The LCD thus has the important role of making visible the changes in the orientation of the liquid crystal caused by an electric field. In other words, the performance of the polarizing plate greatly affects the performance of the LCD.

The polarizer of the polarizing plate is one in which iodine and the like is adsorbed on a high molecular weight polymer film and is then extruded. That is to say, a solution, called H ink which includes a two-colored substance (iodine), is adsorbed by wet adsorption onto a polyvinyl alcohol film and then the two-colored substance is oriented in one direction due to uniaxial extrusion of the film. Cellulose resin, and cellulose triacetate in particular, may be used as the polarizing plate protective film.

Cellulose ester film is optically and physically effective as a polarizing plate protective film and is thus widely used. However, because the method for manufacturing the film is a casting method using a halogen-based solvent, the cost required to recover the solvent is an extremely large negative factor.

In recent years, as a manufacturing method of cellulose ester film for application to a polarizing plate protective film, a melt cast method has been carried out, for example in Patent Document 1. However, since cellulose ester is a polymer having a high glass transition temperature and a very high viscosity at molten state, a cellulose ester film, which is formed when cellulose ester is melted and extruded from dice to be cast on a cooling drum or on a cooling belt, is difficult to level, and solidifies in a short time after extruded. It has been found that there are problems in that such a cellulose ester film is poor in physical properties such as flatness, anti-curling and dimensional stability, and in uniformity of birefringence as an optical property, particularly in uniformity of birefringence in the transverse direction of the film, as compared with cellulose ester film obtained according to a solution cast method.

The melt cast method for manufacturing a cellulose ester film, comprising a heat application step (process) at a high temperature, has a significant problem that reduction of cellulose ester molecular weight due to thermal decomposition results in coloring of the film or in processing stability lowering of the film. When a cellulose ester film is manufactured according to a melt cast method, deterioration of cellulose ester proceeds due to mechanical stress applied while cellulose ester is heat melted at a high temperature and pelletized employing a uniaxial or biaxial extruder. Since the cellulose ester is further heated at a heat-extruding process until cellulose ester film is obtained, i.e., the cellulose ester is subjected to two time thermal history, deterioration of cellulose ester further proceeds. Although details are not clear, deterioration of cellulose ester results in coloring or lowering of processing stability of film probably because the molecular weight increases due to crosslinking or lowers due to depolymerization, resulting in a broad molecular weight distribution. This is a problem not only in product quality but also in reuse of cellulose ester film pieces occurring during manufacture for raw materials. Since cellulose ester is easily deteriorated by heat application, a melt cast method has been required in which cellulose ester does not deteriorate.

In order to solve such problems, there is proposed a method in which a hindered phenol compound, a hindered amine compound or an acid scavenger is added as a stabilizer in a specific amount to a cellulose ester film, thereby coloring or processing stability lowering of the film is minimized (see, for example, Patent Document 2.). Further, a technique is disclosed in Patent Document 3 in which a triazine compound or a benzoic acid phenyl ester compound is employed a plasticizer in order to prevent streak defects occurring after a melt cast film formation process taken for a long time. However, any known techniques as described above are still insufficient to overcome the above-described problems, particularly or processing stability lowering, coloring or lowering of uniformity of birefringence as an optical property.

Patent Document 1: Japanese Patent O.P.I. Publication No. 2000-352620

Patent Document 2: Japanese Patent O.P.I. Publication No. 2006-241428

Patent Document 3: Japanese Patent O.P.I. Publication No. 2006-176736

DISCLOSURE OF THE INVENTION

Problems to be Solved by the Invention

In view of the above, the invention has been made. An object of the invention is to provide cellulose ester pellets and a cellulose ester film, which minimize a manufacturing load, a facility load and an environmental load, each being given by evaporation or recovery of solvents on film manufacture and which have excellent optical properties, less coloring and high processing stability, and a manufacturing method thereof. Another object of the invention is to provide a polarizing plate employing the cellulose ester film as the polarizing plate protecting film with small variation of birefringence in the transverse direction of the film and a liquid crystal display employing the polarizing plate.

Means for Solving the Above Problems

The above object of the invention can be attained by the following constitution.

1. Cellulose ester pellets containing cellulose ester and at least one combination selected from combination A, combination B and combination C, the cellulose ester pellets containing the at least one combination in an amount of from 0.001 to 1.00% by weight based on the cellulose ester, wherein the combination A is a combination of a compound represented by formula (1) and a compound represented by formula (2), the combination B is a combination of a compound represented by formula (3) and a compound represented by formula (4), and the combination C is a combination of a compound represented by formula (5) and a compound represented by formula (6).

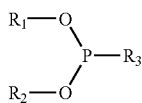

Formula (1)

In formula (1), $R_1$ and $R_2$ independently represent an alkyl group, a cycloalkyl group or an aryl group; and $R_3$ represents an alkyl group, a cycloalkyl group, an aryl group, an alkoxy group or an aryloxy group.

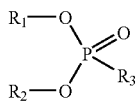

Formula (2)

In formula (2), $R_1$ and $R_2$ independently represent an alkyl group, a cycloalkyl group or an aryl group; and $R_3$ represents an alkyl group, a cycloalkyl group, an aryl group, an alkoxy group or an aryloxy group.

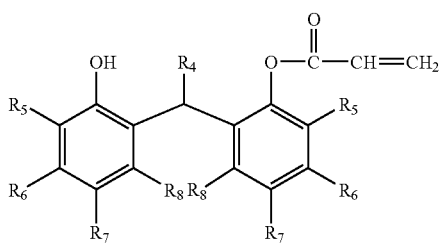

Formula (3)

In formula (3), $R_4$ represents a hydrogen atom, an alkyl group or a cycloalkyl group; and $R_5$, $R_6$, $R_7$ and $R_8$ independently represent a hydrogen atom, an alkyl group, a cycloalkyl group, an aryl group, an alkoxy group or an aryloxy group.

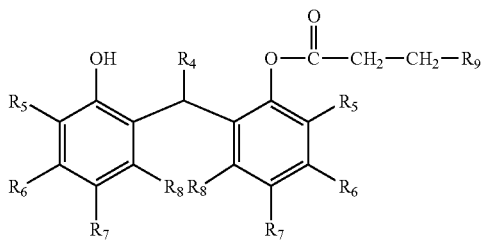

Formula (4)

In formula (4), $R_4$ represents a hydrogen atom, an alkyl group or a cycloalkyl group; $R_5$, $R_6$, $R_7$ and $R_8$ independently represent a hydrogen atom, an alkyl group, a cycloalkyl group, an aryl group, an alkoxy group or an aryloxy group; and $R_9$ represents an alkyl group or a cycloalkyl group.

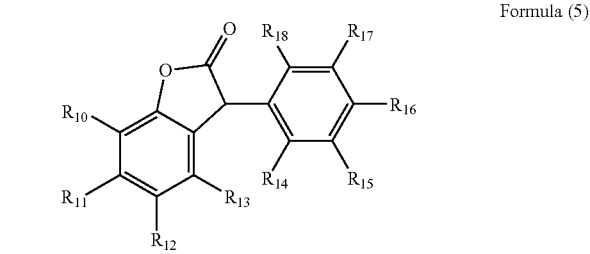

Formula (5)

In formula (5), $R_{10}$, $R_{11}$, $R_{12}$, $R_{13}$, $R_{14}$, $R_{15}$, $R_{16}$, $R_{17}$ and $R_{18}$ independently represent a hydrogen atom, an alkyl group, a cycloalkyl group, an aryl group, an alkoxy group or an aryloxy group.

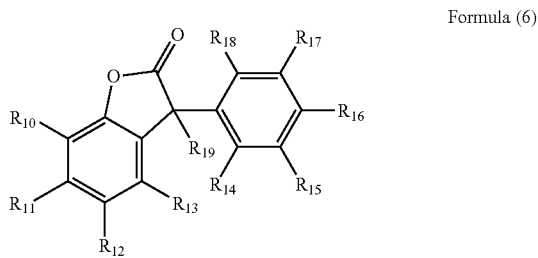

Formula (6)

In formula (6), $R_{10}$, $R_{11}$, $R_{12}$, $R_{13}$, $R_{14}$, $R_{15}$, $R_{16}$, $R_{17}$ and $R_{18}$, independently represent a hydrogen atom, an alkyl group, a cycloalkyl group, an aryl group, an alkoxy group or an aryloxy group, and $R_{19}$ represents an alkyl group or a cycloalkyl group.

2. The cellulose ester pellets of item 1 above, containing combination A and combination B each in an amount of from 0.001 to 1.00% based on the cellulose ester.

3. The cellulose ester pellets of item 1 above, containing combination A and combination C each in an amount of from 0.001 to 1.00% based on the cellulose ester.

4. The cellulose ester pellets of any one of items 1 through 3 above, wherein $R_3$ in formula (1) or (2) represents an alkyl group or an aryl group.

5. A cellulose ester film containing cellulose ester and at least one combination selected from combination A, combination B and combination C, the cellulose ester pellets containing the at least one combination in an amount of from 0.001 to 1.00% by weight based on the cellulose ester, wherein the combination A is a combination of a compound represented by formula (1) and a compound represented by formula (2), the combination B is a combination of a compound represented by formula (3) and a compound represented by formula (4), and the combination C is a combination of a compound represented by formula (5) and a compound represented by formula (6).

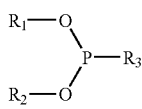
Formula (1)

In formula (1), $R_1$ and $R_2$ independently represent an alkyl group, a cycloalkyl group or an aryl group; and $R_3$ represents an alkyl group, a cycloalkyl group, an aryl group, an alkoxy group or an aryloxy group.

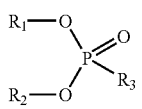
Formula (2)

In formula (2), $R_1$ and $R_2$ independently represent an alkyl group, a cycloalkyl group or an aryl group; and $R_3$ represents an alkyl group, a cycloalkyl group, an aryl group, an alkoxy group or an aryloxy group.

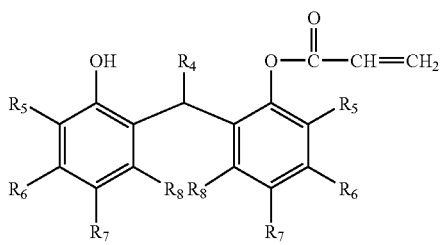
Formula (3)

In formula (3), $R_4$ represents a hydrogen atom, an alkyl group or a cycloalkyl group; and $R_5$, $R_6$, $R_7$ and $R_8$ independently represent a hydrogen atom, an alkyl group, a cycloalkyl group, an aryl group, an alkoxy group or an aryloxy group.

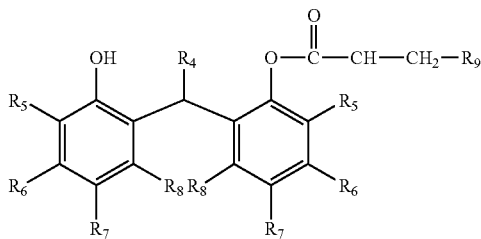
Formula (4)

In formula (4), $R_4$ represents a hydrogen atom, an alkyl group or a cycloalkyl group; $R_5$, $R_6$, $R_7$ and $R_8$ independently represent a hydrogen atom, an alkyl group, a cycloalkyl group, an aryl group, an alkoxy group or an aryloxy group; and $R_9$ represents an alkyl group or a cycloalkyl group.

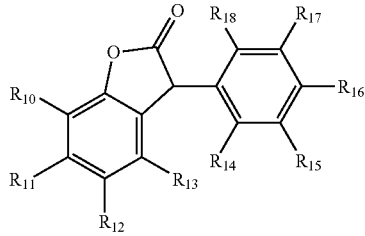
Formula (5)

In formula (5), $R_{10}$, $R_{11}$, $R_{12}$, $R_{13}$, $R_{14}$, $R_{15}$, $R_{16}$, $R_{17}$ and $R_{18}$ independently represent a hydrogen atom, an alkyl group, a cycloalkyl group, an aryl group, an alkoxy group or an aryloxy group.

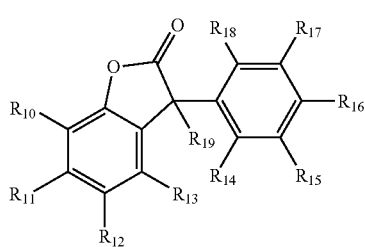
Formula (6)

In formula (6), $R_{10}$, $R_{11}$, $R_{12}$, $R_{13}$, $R_{14}$, $R_{15}$, $R_{16}$, $R_{17}$ and $R_{18}$ independently represent a hydrogen atom, an alkyl group, a cycloalkyl group, an aryl group, an alkoxy group or an aryloxy group, and $R_{19}$ represents an alkyl group or a cycloalkyl group.

6. The cellulose ester film of item 5 above, containing combination A and combination B each in an amount of from 0.001 to 1.00% based on the cellulose ester.

7. The cellulose ester film of item 5 above, containing combination A and combination C each in an amount of from 0.001 to 1.00% based on the cellulose ester.

8. The cellulose ester film of any one of items 5 through 7 above, wherein $R_3$ in formula (1) or (2) represents an alkyl group or an aryl group.

9. A method for manufacturing a cellulose ester film according to a melt cast method comprising heat-melting the cellulose ester pellets of any one of items 1 through 4 above without using a solvent to prepare a cellulose ester melt, and then casting the melt on a support.

10. A method for manufacturing a cellulose ester film, wherein a recycled material of the cellulose ester film of any one of claims 5 through 8 is employed to prepare a melt.

11. A polarizing plate comprising the cellulose ester film of any one of items 5 through 8 above and a polarized film having a first surface and a second surface, the cellulose ester film being provided on at least one surface of the first and second surfaces.

12. A liquid crystal display comprising the polarizing plate of item 11 above and a liquid crystal cell having a first surface and a second surface, wherein the polarizing plate is provided on at least one surface of the first and second surfaces of the liquid crystal cell.

Effects of the Invention

The present invention can provide a cellulose ester film, which minimizes a manufacturing load, a facility load and an environmental load, each being given by evaporation or recovery (collection) of solvents on film manufacture and which have excellent optical properties, less coloring and high processing stability, and its manufacturing method, and can provide a polarizing plate employing the cellulose ester film as the polarizing plate protecting film with small variation of birefringence in the transverse direction of the film and a liquid crystal display employing the polarizing plate.

The invention will be explained in detail below.

A solution cast method as one of cellulose ester film manufacturing methods comprises the steps of casting on a support a cellulose ester solution in which the cellulose ester is dissolved in a solvent to form a wet cellulose ester web on the support, and evaporating the solvent in the web, whereby the web is dried to obtain a cellulose ester film. This method requires removal of the residual solvent of the wet cellulose ester web, and therefore, it requires energy for drying, an apparatus for collecting the evaporated solvent, and an apparatus for regenerating the collected solvent, resulting in increase of appliance investment and manufacturing cost. Reduction of the appliance investment and manufacturing cost has been sought.

In contrast, a melt cast method does not employ a solvent for dissolving cellulose ester, and therefore, does not have load for appliance investment or drying.

The present inventors have made an extensive study on cellulose ester film, and as a result, they have found that a cellulose ester film (for example, used as a protective film for a polarizing plate) containing at least one combination selected from the combinations A, B and C provides surprising results that uniformity of birefringence is greatly improved. At the same time it has proved that coloration or lowering of processing stability of the cellulose ester film is minimized which is caused by thermal decomposition (reduction of molecular weight) of the cellulose ester during melting. It has been found that improvement in uniformity of birefringence or in processing stability of the cellulose ester film is enhanced by addition of both of combination A and combination B or both of combination A and combination C to the cellulose ester film.

Surprisingly, it has been found that the cellulose ester film of the invention can maintain uniformity of birefringence and excellent processing stability even when it is cut into pieces and reused as so-called recycled materials for raw materials, and has excellent recycling property.

Next, compounds used in the invention will be explained in detail.

<<Cellulose Ester>>

The cellulose ester in the invention is a single or mixed acid cellulose ester including in the cellulose ester structure at least one of an aliphatic acyl group or a substituted or unsubstituted aromatic acyl group.

Examples of the benzene ring substituent group when the aromatic ring in the aromatic acyl group is a benzene ring include, a halogen atom, a cyano group, an alkyl group, a cycloalkyl group, an alkoxy group, and aryl group, an aryloxy group, an acyl group, a carbonamide group, a sulfonamide group, a ureido group, an aralkyl group, a nitro group, an alkoxy carbonyl group, an aryloxy carbonyl group, an aralkyloxy carbonyl group, a carbamoyl group, a sulfamoyl group, an acyloxy group, an alkenyl group, an alkinyl group, an alkyl sulfonyl group, an aryl sulfonyl group, an alkyloxy sulfonyl group, an aryloxy sulfonyl group, an alkyl sulfonyloxy group, and an aryloxy sulfonyl group, —S—R, —NH—CO—OR, —PH—R, —P(—R)$_2$, —PH—O—R, —P(—R) (—O—R), —P(—O—R)$_2$, —PH(=O)—R—P(=O) (—R)$_2$, —PH (=O)—O—R, —P(=O) (—R)(—O—R), —P(=O)(—O—R)$_2$, —O—PH(=O)—R, —O—P(=O) (—R)$_2$—O—PH(=O)—O—R, —O—P(=O) (—R) (—O—R), —O—P (=O) (—O—R)$_2$, —NH—PH(=O)—R, —NH—P(=O) (—R) (—O—R), —NH—P(=O) (—O—R)$_2$, —SiH$_2$—R, —SiH(—R)$_2$, —Si(—R)$_3$, —O—SiH$_2$—R, —O—SiH(—R)$_2$ and —O—Si(—R)$_3$. R above is a fatty acid group, an aromatic group, or a heterocyclic group. The number of substituent groups is preferably between 1 and 5, more preferably between 1 and 4 and still more preferably between 1 and 3, and most preferably either 1 or 2. Examples of the substituent group preferably include a halogen atom, cyano, an alkyl group, an alkoxy group, an aryl group, an aryloxy group, an acyl group, a carbonamide group, a sulfonamide group, and a ureido group, and more preferably, a halogen atom, cyano, an alkyl group, an alkoxy group, an aryloxy group, an acyl group, and a carbonamide group, and still more preferably, a halogen atom, cyano, an alkyl group, an alkoxy group, and an aryloxy group, and most preferably, a halogen atom, an alkyl group, and an alkoxy group.

Examples of the halogen atom include a fluorine atom, a chlorine atom, a bromine atom, and an iodine atom.

The alkyl group may have ring structure or may be branched. The number of carbon atoms in the alkyl group is preferably 1 to 20, more preferably 1 to 12, still more preferably 1 to 6, and most preferably 1 to 4. Examples of the alkyl group include methyl, ethyl, propyl, isopropyl, butyl, t-butyl, hexyl, cyclohexyl, octyl and 2-ethyl hexyl. The alkoxy group may have ring structure or may be branched. The number of carbon atoms in the alkoxy group is preferably 1 to 20, more preferably 1 to 12, still more preferably 1 to 6, and most preferably 1 to 4. The alkoxy group may be further substituted with another alkoxy group. Examples of the alkoxy group include a methoxy, ethoxy, 2-methoxyethoxy, 2-methoxy-2-ethoxyethoxy, butyloxy, hexyloxy and octyloxy.

The number of carbon atoms in the aryl group is preferably 6 to 20, and more preferably 6 to 12. Examples of the aryl group include phenyl and naphtyl. The number of carbon atoms in the aryloxy group is preferably 6 to 20, and more preferably 6 to 12. Examples of the aryloxy group include phenoxy and naphtoxy. The number of carbon atoms in the acyl group is preferably 1 to 20, and more preferably 1 to 12. Examples of the acyl group include hormyl, acetyl, and benzoyl. The number of carbon atoms in the carbonamide group is preferably 1 to 20, and more preferably 1 to 12. Examples of the carbonamide include acetoamide and benzamide. The number of carbon atoms in the sulfonamide group is preferably 1 to 20, and more preferably 1 to 12. Examples of the sulfonamide include methane sulfonamide, benzene sulfonamide, and p-toluene sulfonamide. The number of carbon atoms in the ureido group is preferably 1 to 20, and more preferably 1 to 12. Examples of the ureido group include (unsubstituted) ureido.

The number of carbon atoms in the aralkyl group is preferably 7 to 20, and more preferably 7 to 12. Examples of the aralkyl group include benzyl, phenethyl, and naphthylmethyl. The number of carbon atoms in the alkoxycarbonyl group is preferably 1 to 20, and more preferably 2 to 12. Examples of the alkoxycarbonyl group include methoxy carbonyl. The number of carbon atoms in the aryloxy carbonyl group is preferably 7 to 20, and more preferably 7 to 12. Examples of the aryloxy carbonyl group include phenoxy carbonyl. The number of carbon atoms in the aralkyloxycarbonyl is preferably 8 to 20, and more preferably 8 to 12. Examples of the aralkyoxycarbonyl include benzyloxycarbonyl. The number of carbon atoms in the carbamoyl group is preferably 1 to 20, and more preferably 1 to 12. Examples of the carbamoyl group include (unsubstituted) carbamoyl and N-methyl carbamoyl. The number of carbon atoms in the sulfamoyl group is preferably no greater than 20, and more preferably no greater than 12. Examples of the sulfamoyl group include (unsubstituted) sulfamoyl and N-methyl sulfamoyl. The number of carbon atoms in the acyloxy group is preferably 1 to 20, and more preferably 2 to 12. Examples of the acyloxy group include acetoxy and benzoyloxy.

The number of carbon atoms in the alkenyl group is preferably 2 to 20, and more preferably 2 to 12.

Examples of the alkenyl group include vinyl, aryl and isopropenyl. The number of carbon atoms in the alkinyl group is preferably 2 to 20, and more preferably 2 to 12. Examples of the alkinyl group include dienyl. The number of carbon atoms in the alkyl sulfonyl group is preferably 1 to 20, and more preferably 1 to 12. The number of carbon atoms in the aryl sulfonyl group is preferably 6 to 20, and more preferably 6 to 12. The number of carbon atoms in the alkyloxy sulfonyl group is preferably 1 to 20, and more preferably 1 to 12. The number of carbon atoms in the aryloxy sulfonyl group is preferably 6 to 20, and more preferably 6 to 12. The number of carbon atoms in the alkyl sulfonyloxy group is preferably 1 to 20, and more preferably 1 to 12. The number of carbon atoms in the aryloxy sulfonyl is preferably 6 to 20, and more preferably 6 to 12.

In the cellulose ester of the invention, in the case where the hydrogen atom of the hydroxyl group portion of the cellulose is a fatty acid ester with a fatty acid acyl group, the number of carbon atoms in the fatty acid acyl group is 2-20, and specific examples thereof include acetyl, propionyl, butyryl, isobutyryl, valeryl, pivaroyl, hexanoyl, octanoyl, lauroyl, stearoyl and the like.

The aliphatic acyl group in the invention also refers to one which is further substituted, and examples of the substituent include those which when the aromatic ring in the aromatic acyl group described above is a benzene ring, are denoted in the substituents of the benzene ring.

When the ester group of cellulose ester has an aromatic ring, the number of the substituent groups X on the aromatic ring should be 0 or 1 to 5, preferably 1 to 3, and 1 or 2 is particularly preferable. In addition, when the number of substituent groups substituted on the aromatic ring is 2 or more, the substituent groups may be the same or different from each other, and they may also bond with each other to form a condensed polycylic ring (such as naphthalene, indene, indane, phenanthrene, quinoline, isoquinoline, chromene, chromane, phthalazine, acridine, indole, indoline and the like).

In the invention, the cellulose ester has in the ester group a structure selected from at least one of a substituted or unsubstituted aliphatic acyl group or a substituted or unsubstituted aromatic acyl group, and this may be a single acid cellulose ester or a mixed acid cellulose ester, and two or more types of cellulose esters may be used in combination.

The cellulose ester used in the invention is preferably at least one type selected from cellulose acetate, cellulose propionate, cellulose butyrate, cellulose acetate propionate, cellulose acetate butyrate, cellulose acetate phthalate and cellulose phthalate.

Next, a degree of substitution of acyl group in the cellulose ester used in the invention will be explained.

Cellulose is formed from a glucose having in the molecule one hydroxy group at each of the 2, 3 and 6 positions, three hydroxyl groups in total. Degree of substitution of acyl group means the average number of an acyl group with which the hydrogen atom of one glucose unit is substituted. Accordingly, maximum degree of substitution is three. The acyl group may be averagely substituted at the 2, 3 and 6 positions of the glucose unit, or substituted with a certain distribution.

The lower aliphatic acid esters such as cellulose acetate propionate and cellulose acetate butyrate, which are preferred as the mixed aliphatic acid cellulose ester, have an acyl group having 2 to 4 carbon atoms as the substituent.

In the invention, preferred cellulose ester resin comprises cellulose ester satisfying relationships (1), (2) and (3) below, $$2.4 \leq X+Y \leq 2.9 \quad \text{Relationship (1)}$$

$$0 \leq X \leq 2.4 \quad \text{Relationship (2)}$$

$$0.5 \leq Y \leq 2.9 \quad \text{Relationship (3)}$$

wherein X represents a degree of substitution of the acetyl group; and Y represents a degree of substitution of the propionyl group or the butyryl group.

The degree of substitution of an acetyl group or another acyl group is determined according to ASTM-D817-96.

Among these, cellulose acetate propionate is preferably used herein, and among the cellulose acetate propionates, those that satisfy $1.2 \leq X \leq 2.1$ and $0.6 \leq Y \leq 1.4$ are particularly preferable. Cellulose ester film may be one in which cellulose esters having a different degree of acyl substitution are blended so as to satisfy the above relationships. A hydroxyl group is usually present at the portions which are not substituted with an acyl group. These may be synthesized by a known method.

The cellulose ester used in the invention has a number average molecular weight (Mn) of preferably from 50,000 to 150,000, more preferably from 55,000 to 120,000, and still more preferably from 60,000 to 100,000.

In the cellulose ester used in the invention, the ratio of the weight average molecular weight Mw/number average molecular weight Mn is preferably from 1.3 to 5.5, preferably from 1.7 to 3.5, and still more preferably from 2.3 to 3.3.

The Mn and Mw/Mn are determined according to Gel permeation chromatography under the following conditions.

The measurement conditions are as follows:
Solvent: Tetrahydrofuran
Apparatus: HLC-8220 (produced by Toso Co., Ltd.)
Column: TSK gel Super HM-M (produced by Toso Co., Ltd.)
Column temperature: 40° C.
Sample concentration: 0.1% by weight
Injection amount: 10 μl
Flow rate: 0.6 ml/min
Calibration curve: One obtained employing 9 samples of PS-1 (produced by Polymer Laboratories Corporation) having an Mw of from 2,560,000 to 580

Cellulose which is a raw material for the cellulose ester of the invention may be wood pulp or cotton linter, and the wood pulp may be that of a needle-leaf tree or a broad-leaf tree, but that of the broad-leaf tree is more preferable. Cotton linter is preferably used in view of peeling properties at the time of film formation. Cellulose esters made from these substances may be suitably blended or used alone.

For example, the proportion used of cellulose ester from cotton linter: cellulose ester from wood pulp (needle-leaf tree): cellulose ester from wood pulp (broad-leaf tree) may be 100:0:0, 90:10:0, 85:15:0, 50:50:0, 20:80:0, 10:90:0, 0:100:0, 0:0:100, 80:10:10, 85:0:15, and 40:30:30.

The cellulose ester can be obtained, for example, by substituting the hydroxyl group of the material cellulose by the acetic anhydride, anhydrous propionic acid and/or anhydrous butyric acid according to the normal method in such a way that the acetyl group, propionyl group and/or butyl group are kept within the aforementioned range. There is no restriction to the method of synthesizing such a cellulose ester. For example, it can be synthesized by using the method disclosed in Japanese Patent O.P.I. Publication Nos. 10-45804 and 6-501040.

The content of an alkali earth metal used in the cellulose ester of this invention is preferably 1 to 50 ppm. It is liable to increase of lip attaching stain, or to break at thermal stretching process or slitting process after thermal stretching at 50 ppm or more. It is also liable to break when the content being less than 1 ppm, the reason of which is not known. Load against washing process so as to make less than 1 ppm is too heavy, and therefore it is not preferable. The content of 1 to 30 ppm is more preferable. The alkali earth metal content herein refers a total amount of calcium and magnesium, which can be measured by employing X ray photoelectron spectrometric analysis (XPS).

The amount of the residual sulfuric acid contained in the cellulose ester used in the present invention is 0.1 to 45 ppm in terms of the sulfur element. They are considered to be included as salts. The amount of the residual sulfuric acid contained therein of not less than 45 ppm is not preferable since the deposition on the die lip at the time of heat-melting increases and the film tends to tear off at the time of thermal stretching or slitting subsequent to thermal stretching. The amount of the residual sulfuric acid contained therein should be reduced as much as possible, but when it is to be reduced below 0.1 ppm, the load on the cellulose ester washing process will be excessive and the material tends to be damaged easily. This should be avoided. This may be because an increase in the frequency of washing affects the resin, but the details are not yet clarified. Further, the preferred amount is in the range of 1 to 30 ppm. The amount of the residual sulfuric acid can be measured according to a method prescribed in ASTM-D817-96.

The total amount of the free acid in the cellulose ester used in this invention is preferably 1 to 500 ppm. When the amount exceeds 500 ppm, depositions on the die lip at the time of heat-melting increase and the film tends to tear off. It is difficult to make the free acid amount less than 1 ppm by washing. The free acid amount is more preferably 1 to 100 ppm, which increases resistance to tear. The free acid amount is still more preferably 1 to 70 ppm. The amount of free acid can be measured according to a method prescribed in ASTM-D817-96.

The amount of the residual acid can be kept within the aforementioned range if the synthesized cellulose ester is washed more carefully than in the case of the solution casting method. Then, when a film is manufactured by the melt casting, the amount of depositions on the lip portion will be reduced so that a film characterized by a high degree of flatness is produced. Such a film will be further characterized by excellent resistance to dimensional changes, mechanical strength, transparency, resistance to moisture permeation, Rt value and Ro value to be described later. Further, the cellulose ester can be washed using water as well as a poor solvent such as methanol or ethanol. It is also possible to use a mixture and a poor solvent and a good solvent if it is a poor solvent as a result. This will remove inorganic substances other than residual acid, and low-molecular organic impurities. The cellulose ester is washed preferably in the presence of an antioxidant such as a hindered amine and phosphorous acid ester. This will improve the heat resistance and film formation stability of the cellulose ester.

To improve the heat resistance, mechanical property and optical property of cellulose ester, a cellulose ester solution in which the cellulose ester is dissolved in a good solvent is re-precipitated in a poor solvent to purify the cellulose ester, which removes the low molecular weight components and other impurities in the cellulose ester. The reprecipitation is preferably carried out in the presence of an antioxidant in the same manner as in washing as above.

The cellulose ester obtained by the re-precipitation may be added with another polymer or a low molecular weight compound.

<<Compound Represented by Formula (1)>>

Next, a compound represented by formula (1) will be explained, but is not limited thereto.

In formula (1), $R_1$ and $R_2$ independently represent an alkyl group, a cycloalkyl group or an aryl group.

Examples of the alkyl group represented by $R_1$ and $R_2$ include a methyl group, an ethyl group, a propyl group, an isopropyl group, a t-butyl group, a pentyl group, a hexyl group, an octyl group, a dodecyl group, an octadecyl group and a trifluoromethyl group. Examples of the cycloalkyl group represented by $R_1$ and $R_2$ include a cyclopropyl group, a cyclopentyl group, a cyclohexyl group and an adamantly group. Examples of the aryl group represented by $R_1$ and $R_2$ include a phenyl group, a naphthyl group and a phenanthryl group.

The alkyl, cycloalkyl or aryl group represented by $R_1$ and $R_2$ may have a substituent. Examples of the substituent include an alkyl group (such as a methyl group, an ethyl group, a propyl group, an isopropyl group, a t-butyl group, a pentyl group, a hexyl group, an octyl group, a dodecyl group and trifluoromethyl group), a cycloalkyl group (such as a cyclopentyl group and a cyclohexyl group), an aryl group (such as a phenyl group and a naphthyl group), an acylamino group (such as an acetylamino group and a benzoylamino group), an alkylthio group (such as a methylthio group and an ethylthio group), an arylthio group (such as a phenylthio group and a naphthylthio group), an alkenyl group (such as a vinyl group, a 2-propenyl group, a 3-butenyl group, a 1-methyl-3-propenyl group, a 3-pentenyl group, a 1-methyl-3-butenyl group, a 4-hexenyl group and a cyclohexenyl group), a halogen atom (such as a fluorine atom, a chlorine atom, a bromine atom and an iodine atom), an alkynyl group (such as a propargyl group), a heterocyclic group (such as a pyridyl group, a thiazolyl group, an oxazolyl group and an imidazolyl group), an alkylsulfonyl group (such as a methylsulfonyl group and an ethylsulfonyl group), an arylsulfonyl group (such as a phenylsulfonyl group and a naphthylsulfonyl group), an alkylsulfinyl group (such as a methylsulfinyl group), an arylsulfinyl group (such as a phenylsulfinyl group), a phosphono group, an acyl group (such as an acetyl group, a pivaloyl group and a benzoyl group), a carbamoyl group (such as an aminocarbonyl group, a methylaminocarbonyl group, a dimethylaminocarbonyl group, a butylaminocarbonyl group, a cyclohexylaminocarbonyl group, a phenylaminocarbonyl group and a 2-pyridylaminocarbonyl group), a sulfamoyl group (such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group), a sulfonamide group (such as a methanesulfonamide group and a benzenesulfonamido group), a cyano group, an alkoxy group (such as a methoxy group, an ethoxy group and a propoxy group), an aryloxy group (such as a phenoxy group and a naphthyloxy group), a heterocyclicoxy group, a siloxy group, an acyloxy group (such as an acetyloxy group and a benzoyloxy group), a sulfonic acid group, a sulfonate group, an aminocarbonyloxy group, an amino group (such as an amino group, an ethylamino group, a dimethylamino group, a butylamino group, a cyclopentylamino group, a 2-ethylhexylamino group and a dodecylamino group), an anilino group (such as a phenylamino group, a chlorophenylamino group, a toluidino group, an anisidino group, a naphthylamino group and a 2-pyridylamino group), an imido group, a ureido group (such as a methylureido group, an ethylureido group, a pentylureido group, a cyclohexylureido group, an octylureido group, a dodecylureido group, a phenylureido group, a naphthylureido group and a 2-pyridylaminoureido group), an alkoxycarbonylamino group (such as a methoxycarbonylamino group and a phenoxycarbonylamino group), an alkoxycarbonyl group (such as methoxycarbonyl group, ethoxycarbonyl group and phenoxycarbonyl group), an aryloxycarbonyl group (such as a phenoxycarbonyl group), a heterocyclicthio group, a thioureido group, a carboxyl group, a carboxylate group, a hydroxyl group, a mercapto group and a nitro group.

In formula (1), $R_1$ and $R_2$ are preferably an aryl group.

In formula (1), $R_3$ represents an alkyl group, a cycloalkyl group, an aryl group, an alkoxy group or an aryloxy group.

In formula (1), examples of the alkyl group, the cycloalkyl group or the aryl group represented by $R_3$ include the same as those denoted above in the alkyl group, the cycloalkyl group or the aryl group represented by $R_1$ and $R_2$. Examples of the alkoxy group represented by $R_3$ include a methoxy group, an ethoxy group, a propoxy group, an isopropoxy group, an octyloxy group, a dodecyloxy group and an octadecyloxy group. Examples of the aryloxy group represented by $R_3$ include a phenoxy group and a naphthoxy group.

The alkyl group, the cycloalkyl group, the aryl group, the alkoxy group or the aryloxy group represented by $R_3$ may have a substituent, and examples of the substituent include the substituents denoted above which the alkyl group, the cycloalkyl group or the aryl group represented by $R_1$ and $R_2$ may have.

In formula (1), $R_3$ is preferably an alkyl group, a cycloalkyl group or an aryl group, and more preferably an aryl group.

Next, typical examples of a compound represented by formula (1) will be listed below, and the invention is not limited thereto.

Exemplified compound 1-1

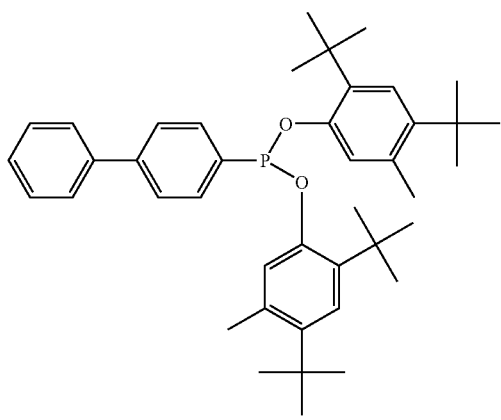

Exemplified compound 1-2

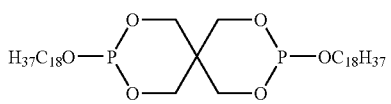

Exemplified compound 1-3

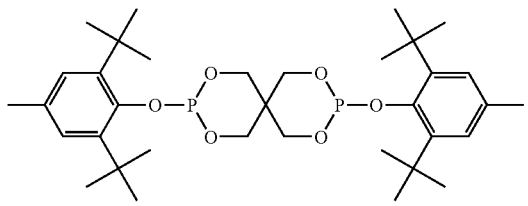

Exemplified compound 1-4

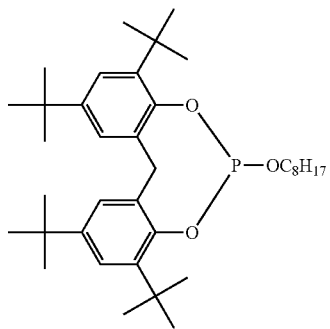

Exemplified compound 1-5

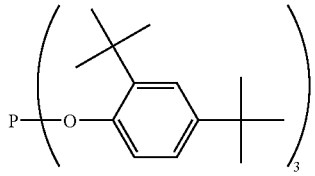

Exemplified compound 1-6

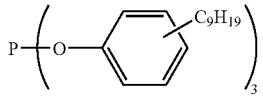

-continued
Exemplified compound 1-7
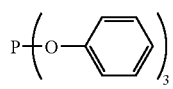
Exemplified compound 1-8
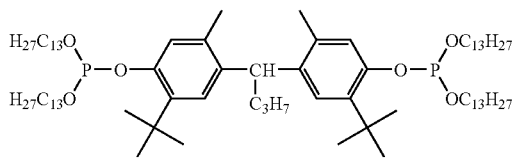
Exemplified compound 1-9
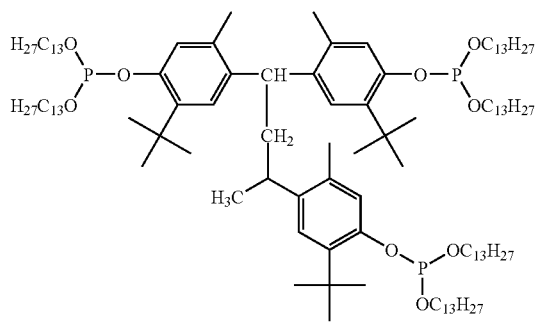
Exemplified compound 1-10
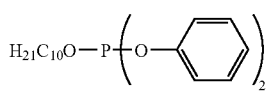
Exemplified compound 1-11
Exemplified compound 1-12
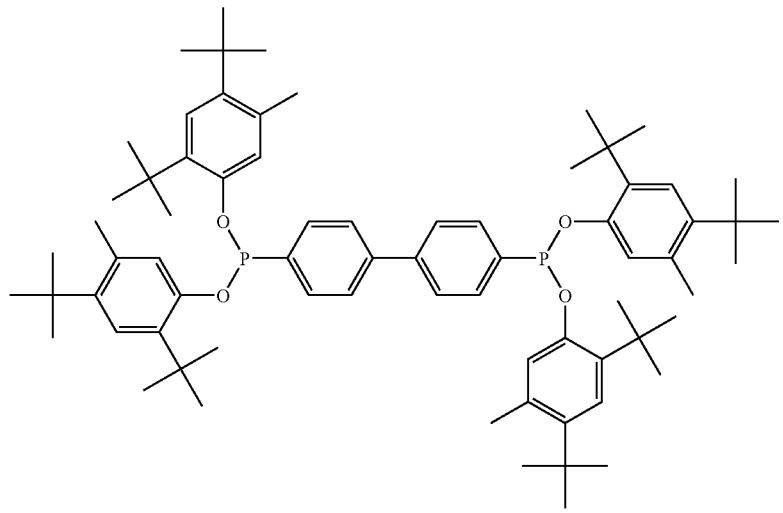
Exemplified compound 1-13
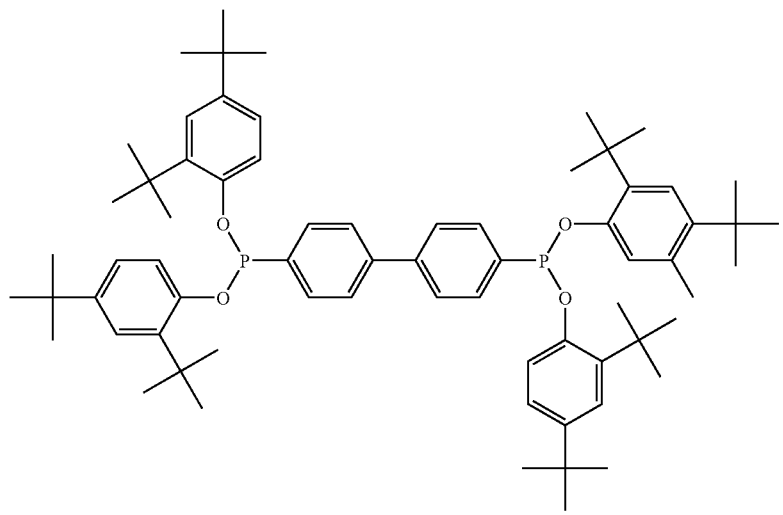

Exemplified compound 1-14

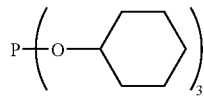

Exemplified compound 1-15

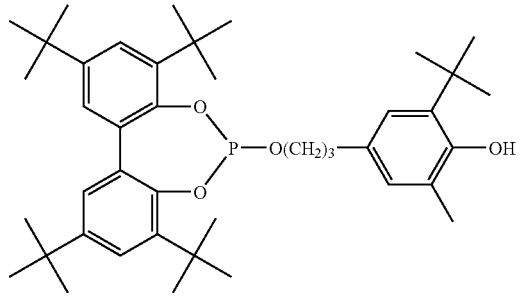

Exemplified compound 1-16

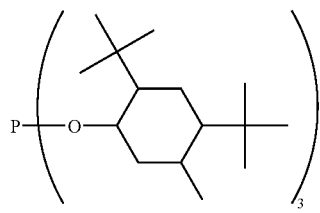

Compound Represented by Formula (2) Above

Next, a compound represented by formula (2) used in the invention will be explained, but the invention is not limited thereto.

In formula (2), $R_1$ and $R_2$ independently represent an alkyl group, a cycloalkyl group or an aryl group. $R_3$ represents an alkyl group, a cycloalkyl group, an aryl group, an alkoxy group or an aryloxy group.

In formula (2), $R_1$ and $R_2$ are preferably an aryl group. $R_3$ is preferably an alkyl group, a cycloalkyl group or an aryl group, and more preferably an aryl group.

Next, typical examples of a compound represented by formula (2) will be listed below, and the invention is not limited thereto.

Exemplified compound 2-1

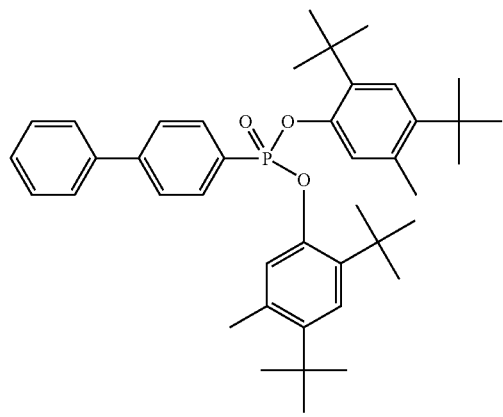

Exemplified compound 2-2

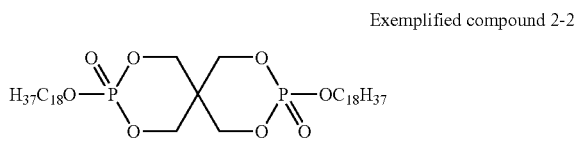

Exemplified compound 2-3

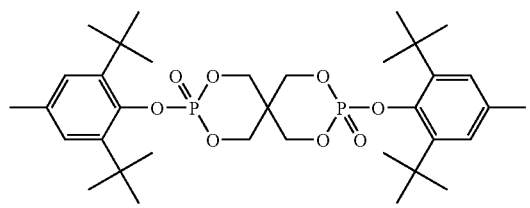

Exemplified compound 2-4

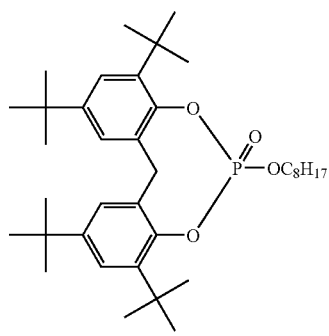

-continued
Exemplified compound 2-5
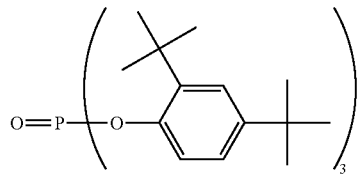
Exemplified compound 2-6
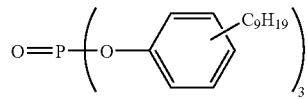
Exemplified compound 2-7
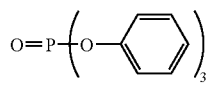
Exemplified compound 2-8
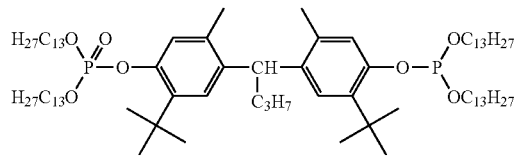
Exemplified compound 2-9
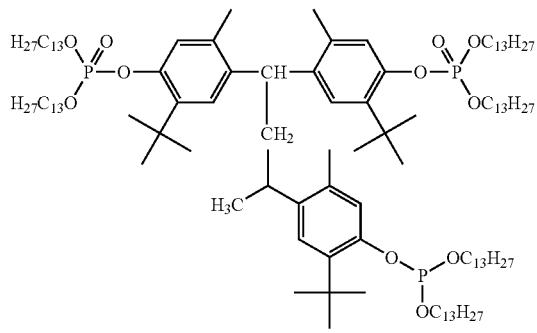
Exemplified compound 2-10
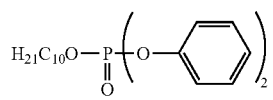
Exemplified compound 2-11
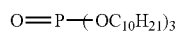
Exemplified compound 2-12
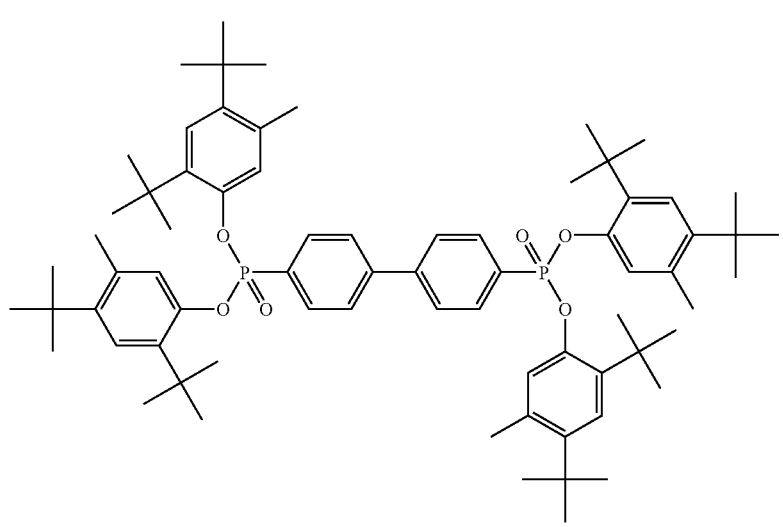

-continued

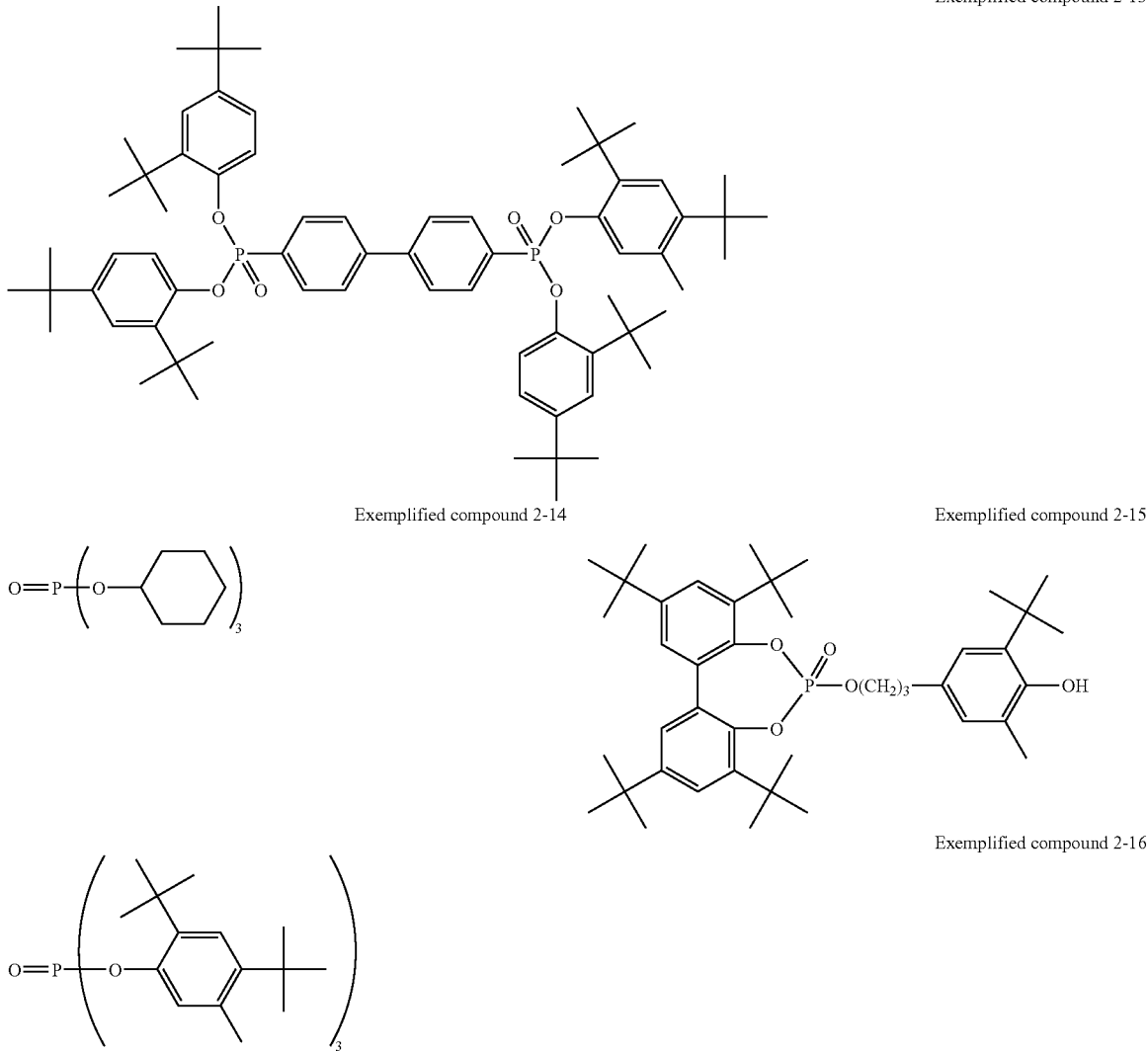

Compound Represented by Formula (3) Above

Next, a compound represented by formula (3) used in the invention will be explained, but the invention is not limited thereto.

In formula (3), $R_4$ represents a hydrogen atom, an alkyl group or a cycloalkyl group.

Examples of the alkyl group or the cycloalkyl group represented by $R_3$ include the same as those denoted above in the alkyl group or the cycloalkyl group represented by $R_1$ and $R_2$ in formula (1) above.

The alkyl group or the cycloalkyl group represented by $R_4$ may have a substituent, and examples of the substituent include the substituents denoted above which the alkyl group or the cycloalkyl group represented by $R_1$ and $R_2$ in formula (1) may have.

In formula (3), $R_4$ is preferably a hydrogen atom or an alkyl group having a carbon atom number of from 1 to 4, more preferably a hydrogen atom or a methyl group, and most preferably a methyl group.

In formula (3), $R_5$, $R_6$, $R_7$, and $R_8$ independently represent a hydrogen atom, an alkyl group, a cycloalkyl group, an aryl group, an alkoxy group or an aryloxy group.

In formula (3), examples of the alkyl group, the cycloalkyl group, the aryl group, the alkoxy group or the aryloxy group represented by $R_5$, $R_6$, $R_7$, and $R_8$ include the same as those denoted above in the alkyl group, the cycloalkyl group, the aryl group, the alkoxy group or the aryloxy group represented by $R_3$ in formula (1) above.

The alkyl group, the cycloalkyl group, the aryl group, the alkoxy group or the aryloxy group represented by $R_5$, $R_6$, $R_7$ and $R_8$ may have a substituent, and examples of the substituent include the same as those substituents denoted above which the alkyl group, the cycloalkyl group or the aryl group represented by $R_1$ and $R_2$ in formula (1) may have.

In formula (3), it is preferred that $R_5$, $R_6$, $R_7$, and $R_8$ independently represent a hydrogen atom, an alkyl group, a cycloalkyl group, or an aryl group, and it is more preferred that $R_5$, $R_6$, $R_7$, and $R_8$ independently represent a hydrogen atom or an alkyl group.

In formula (3), $R_5$ and $R_7$ preferably represent *—C(CH$_3$)$_2$—R' containing a quaternary carbon (in which "*" represents a site bonding to the aromatic ring), and R' represents an alkyl group having a carbon atom number of from 1 to 5). $R_5$ is more preferably a t-butyl group or a t-amyl group. $R_7$ is more preferably a t-butyl group, a t-amyl group or a t-octyl group.

In formula (3), $R_6$ and $R_8$ preferably represent a hydrogen atom.

In formula (3), $R_5$ and $R_6$, $R_6$ and $R_7$, or $R_7$ and $R_8$ may combine with each other to form a ring.

Next, typical examples of a compound represented by formula (3) will be listed below, and the invention is not limited thereto.

Exemplified compound 3-1

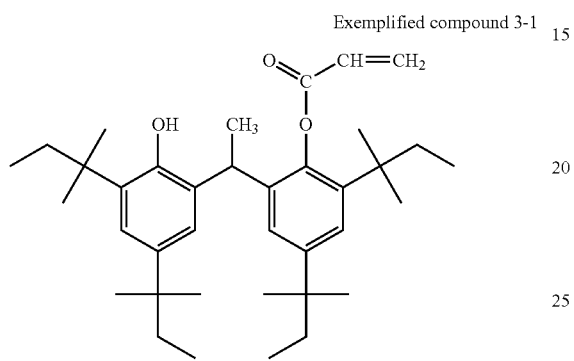

Exemplified compound 3-2

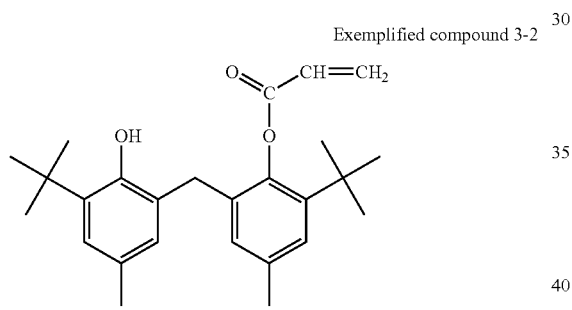

Exemplified compound 3-3

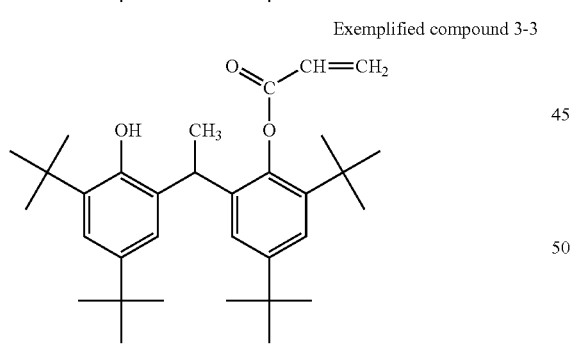

Exemplified compound 3-4

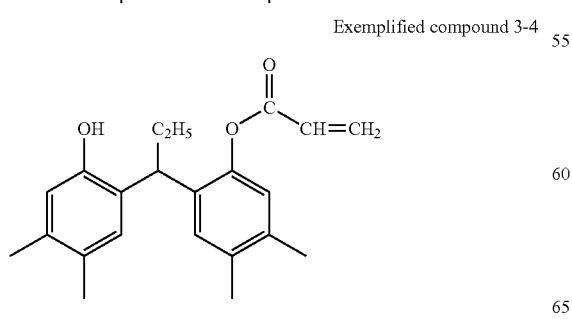

-continued

Exemplified compound 3-5

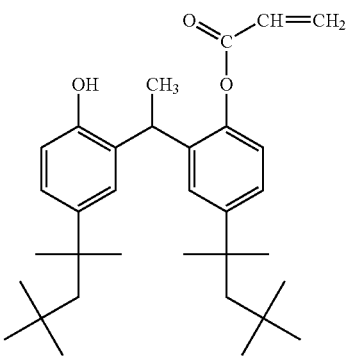

Exemplified compound 3-6

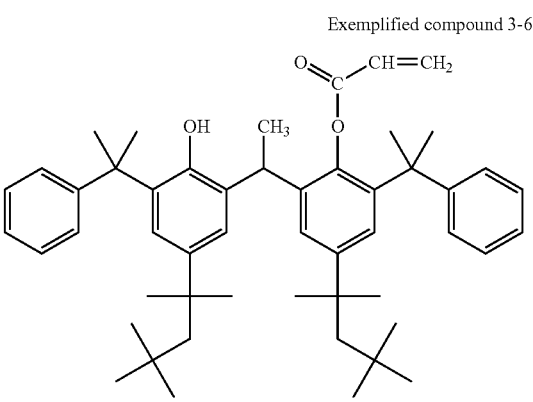

Exemplified compound 3-7

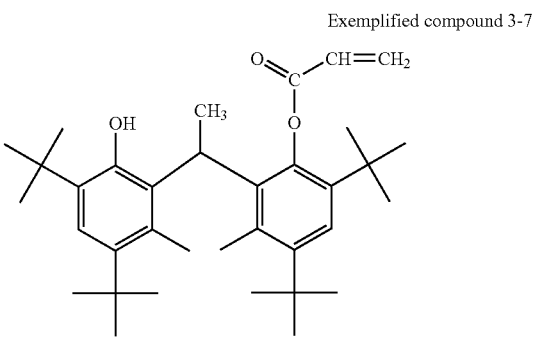

Exemplified compound 3-8

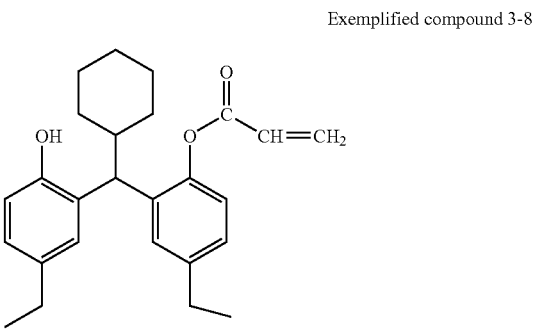

Exemplified compound 3-9

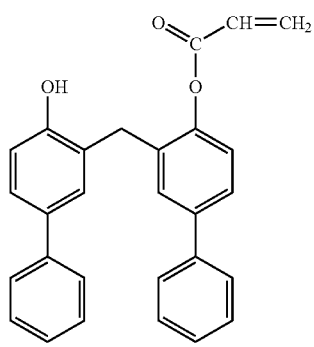

Exemplified compound 3-10

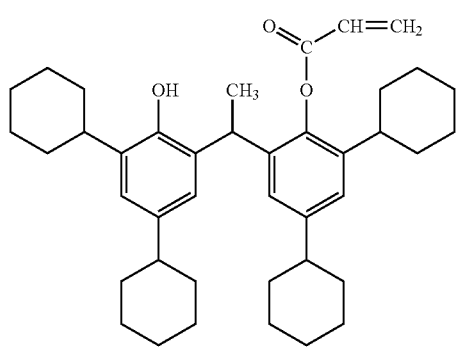

Exemplified compound 3-11

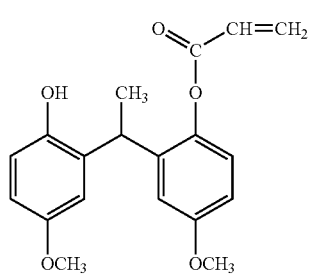

Exemplified compound 3-12

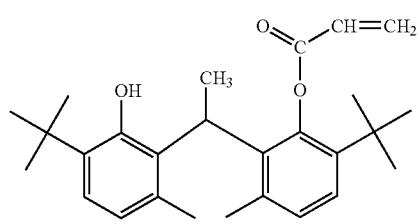

Exemplified compound 3-13

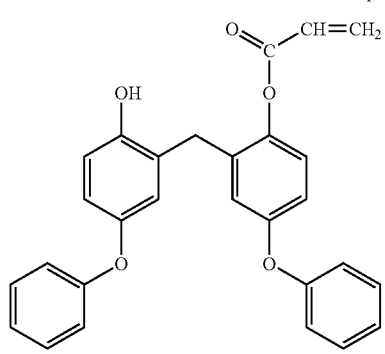

Exemplified compound 3-14

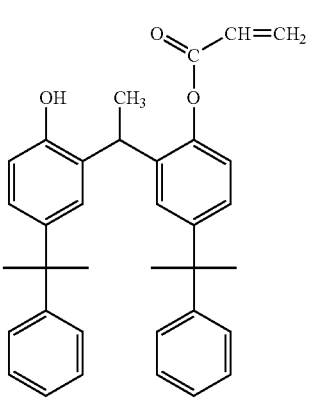

Exemplified compound 3-15

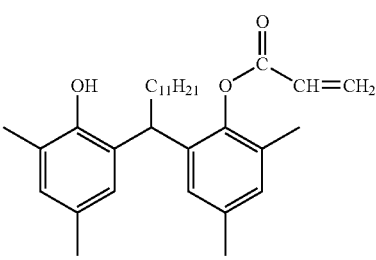

Exemplified compound 3-16

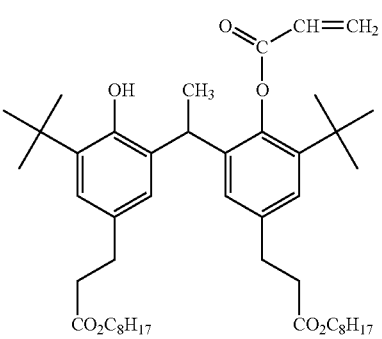

Exemplified compound 3-17

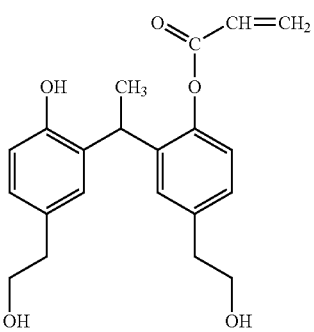

Compound Represented by Formula (4) Above

Next, a compound represented by formula (4) used in the invention will be explained, but the invention is not limited thereto.

In formula (4), $R_4$ represents a hydrogen atom, an alkyl group or a cycloalkyl group. $R_4$ is preferably a hydrogen atom or an alkyl group having a carbon atom number of from 1 to 4, more preferably a hydrogen atom or a methyl group, and most preferably a methyl group.

In formula (4), $R_5$, $R_6$, $R_7$, and $R_8$ independently represent a hydrogen atom, an alkyl group, a cycloalkyl group, an aryl group, an alkoxy group or an aryloxy group. It is preferred that $R_5$, $R_6$, $R_7$, and $R_8$ independently represent a hydrogen atom, an alkyl group, a cycloalkyl group or an aryl group. It is more preferred that $R_5$, $R_6$, $R_7$, and $R_8$ independently represent a hydrogen atom or a methyl group.

In formula (4), $R_5$ and $R_7$ preferably represent *—C(CH$_3$)$_2$—R' containing a quaternary carbon (in which "*" represents a site bonding to the aromatic ring), and R' represents an alkyl group having a carbon atom number of from 1 to 5). $R_5$ is more preferably a t-butyl group or a t-amyl group. $R_7$ is more preferably a t-butyl group, a t-amyl group or a t-octyl group.

In formula (4), $R_6$ and $R_8$ preferably represent a hydrogen atom.

In formula (4), $R_5$ and $R_6$, $R_6$ and $R_7$, or $R_7$ and $R_8$ may combine with each other to form a ring.

In formula (4), $R_9$ represents an alkyl group or a cycloalkyl group.

Examples of the alkyl group or the cycloalkyl group represented by $R_9$ include the same as those denoted above in the alkyl group or the cycloalkyl group represented by $R_1$ and $R_2$ in formula (1) above.

The alkyl group or the cycloalkyl group represented by $R_9$ may have a substituent, and examples of the substituent include the same as those substituents denoted above which the alkyl group or the cycloalkyl group represented by $R_1$ and $R_2$ in formula (1) may have.

In formula (4), $R_9$ is preferably an alkyl group.

Next, typical examples of a compound represented by formula (4) will be listed below, and the invention is not limited thereto.

Exemplified compound 4-1

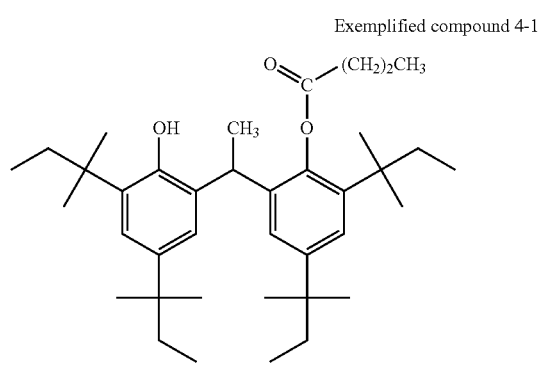

Exemplified compound 4-2

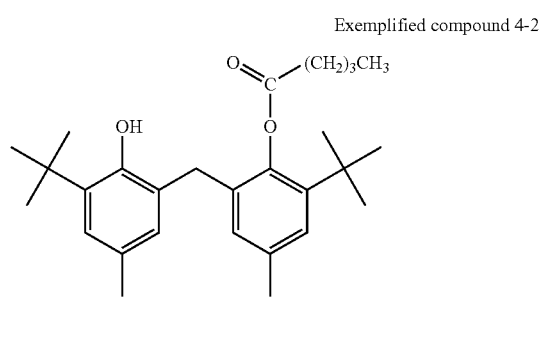

Exemplified compound 4-3

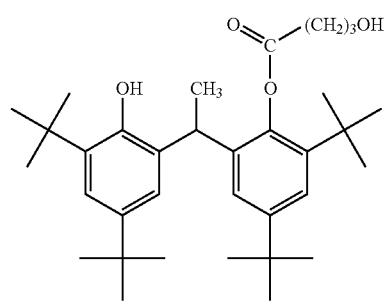

Exemplified compound 4-4

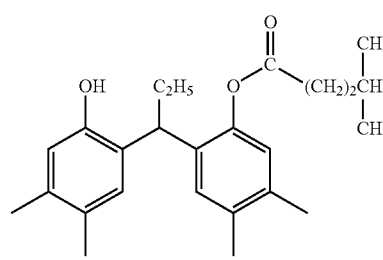

Exemplified compound 4-5

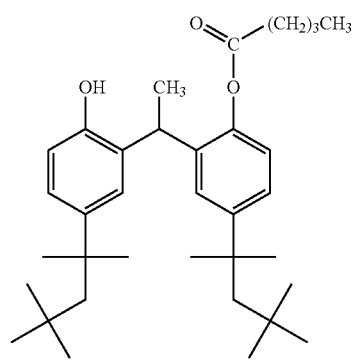

Exemplified compound 4-6

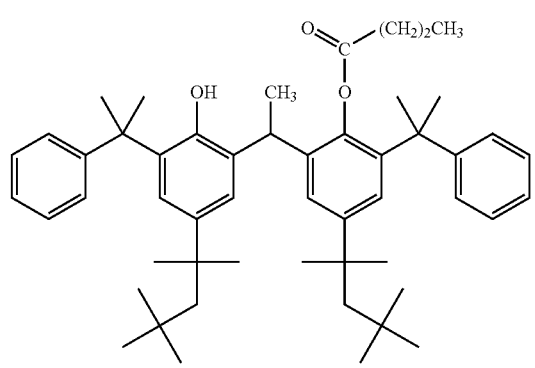

Exemplified compound 4-7

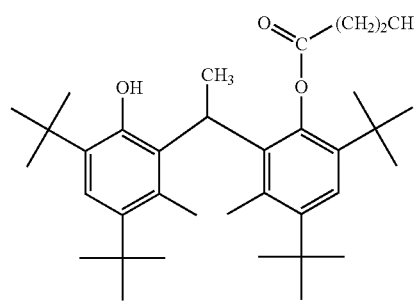

Exemplified compound 4-8
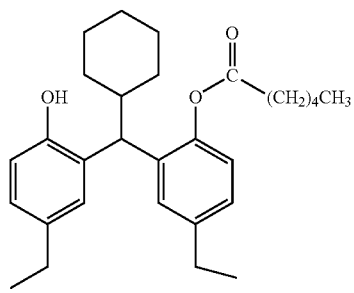
Exemplified compound 4-9
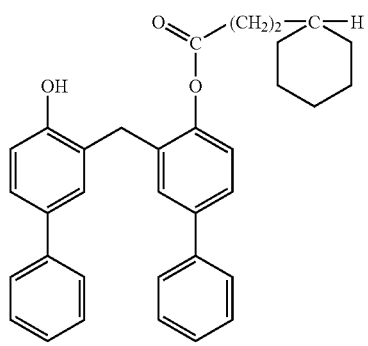
Exemplified compound 4-10
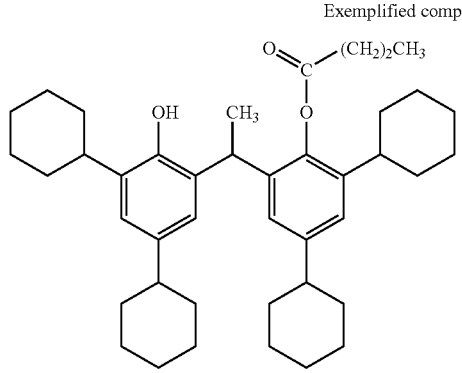
Exemplified compound 4-11
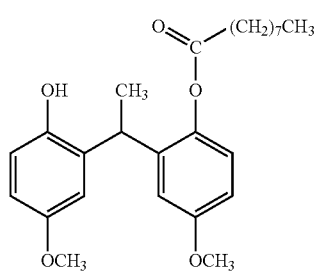
Exemplified compound 4-12
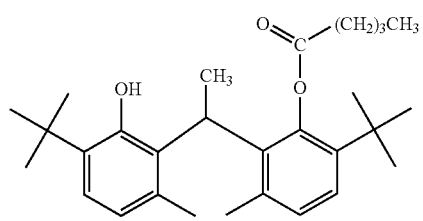
Exemplified compound 4-13
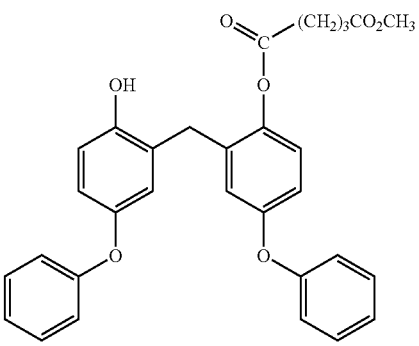
Exemplified compound 4-14
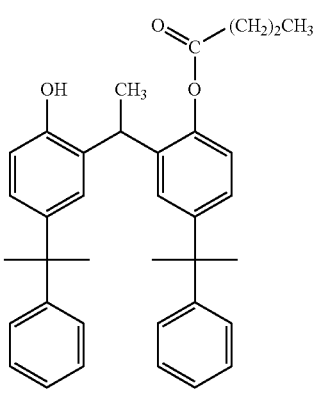
Exemplified compound 4-15
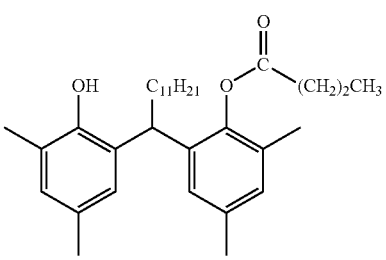
Exemplified compound 4-16
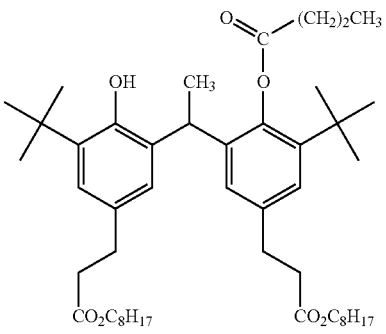

Exemplified compound 4-17

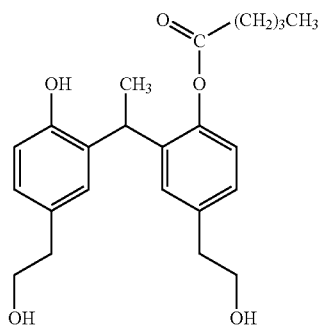

Compound Represented by Formula (5) Above

Next, a compound represented by formula (5) used in the invention will be explained, but the invention is not limited thereto.

In formula (5), $R_{10}$, $R_{11}$, $R_{12}$, $R_{13}$, $R_{14}$, $R_{15}$, $R_{16}$, $R_{17}$ and $R_{18}$ independently represent a hydrogen atom, an alkyl group, a cycloalkyl group, an aryl group, an alkoxy group or an aryloxy group.

In formula (5), examples of the alkyl group, the cycloalkyl group, the aryl group, the alkoxy group or the aryloxy group represented by $R_{10}$, $R_{11}$, $R_{12}$, $R_{13}$, $R_{14}$, $R_{15}$, $R_{16}$, $R_{17}$ and $R_{18}$ include the same as those denoted above in the alkyl group, the cycloalkyl group, the aryl group, the alkoxy group or the aryloxy group represented by $R_3$ in formula (1) above.

The alkyl group, the cycloalkyl group, the aryl group, the alkoxy group or the aryloxy group represented by $R_{10}$, $R_{11}$, $R_{12}$, $R_{13}$, $R_{14}$, $R_{15}$, $R_{16}$, $R_{17}$ and $R_{18}$ may have a substituent, and examples of the substituent include the same as those substituents denoted above which the alkyl group, the cycloalkyl group or the aryl group represented by $R_1$ and $R_2$ in formula (1) above may have.

In formula (5), it is preferred that $R_{10}$, $R_{11}$, $R_{12}$ and $R_{13}$ independently represent a hydrogen atom, an alkyl group, a cycloalkyl group or an aryl group, and it is more preferred that $R_{10}$, $R_{11}$, $R_{12}$ and $R_{13}$ independently represent a hydrogen atom or an alkyl group.

In formula (5), $R_{10}$ and $R_{12}$ preferably represent *—C(CH$_3$)$_2$—R' containing a quaternary carbon (in which "*" represents a site bonding to the aromatic ring), and R' represents an alkyl group having a carbon atom number of from 1 to 5). $R_{10}$ is more preferably a t-butyl group or a t-amyl group. $R_7$ is more preferably a t-butyl group or a t-amyl group or a t-octyl group.

In formula (5), $R_{11}$ and $R_{13}$ preferably represent a hydrogen atom.

In formula (5), $R_{10}$ and $R_{11}$, $R_{11}$ and $R_{12}$, or $R_{12}$ and $R_{13}$ may combine with each other to form a ring.

In formula (5), it is preferred that $R_{14}$, $R_{15}$, $R_{16}$, $R_{17}$ and $R_{18}$ independently represent a hydrogen atom, an alkyl group or a cycloalkyl group.

In formula (5), $R_{14}$ and $R_{15}$, $R_{15}$ and $R_{16}$, $R_{16}$ and $R_{17}$, or $R_{17}$ and $R_{18}$ may combine with each other to form a ring.

Next, typical examples of a compound represented by formula (5) will be listed below, and the invention is not limited thereto.

Exemplified compound 5-1

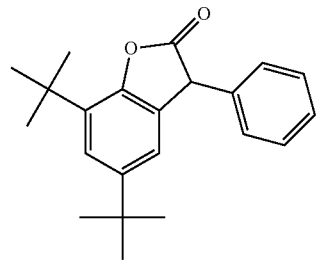

Exemplified compound 5-2

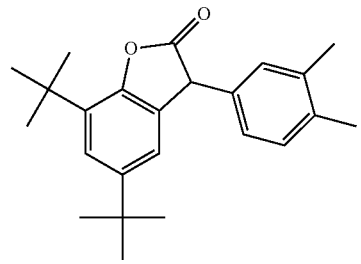

Exemplified compound 5-3

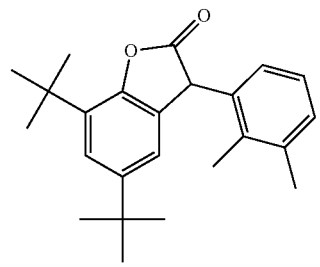

Exemplified compound 5-4

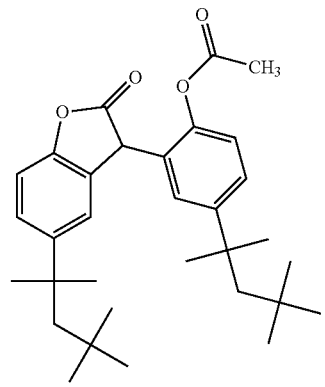

Exemplified compound 5-5

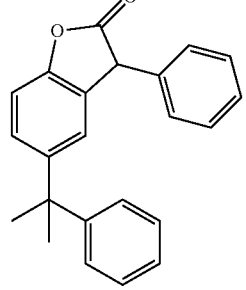

Exemplified compound 5-6
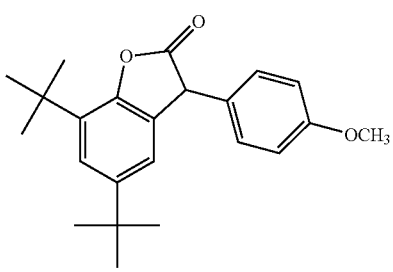
Exemplified compound 5-7
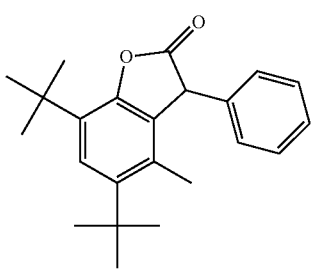
Exemplified compound 5-8
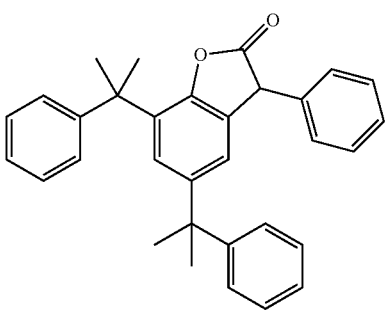
Exemplified compound 5-9
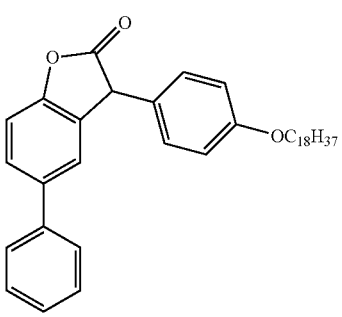
Exemplified compound 5-10
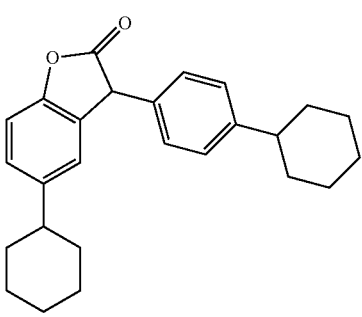
Exemplified compound 5-11
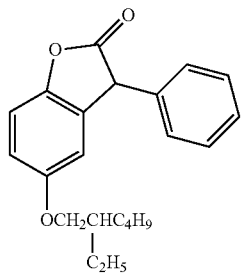
Exemplified compound 5-12
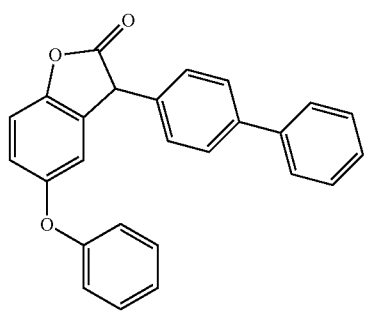
Exemplified compound 5-13
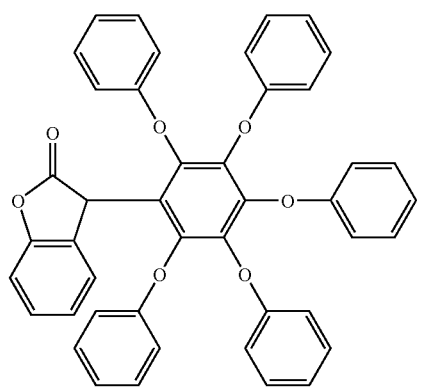
Exemplified compound 5-14
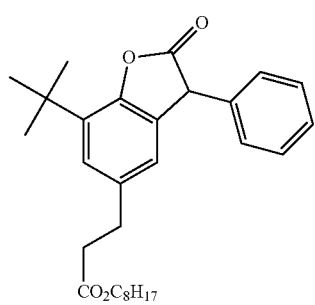
Exemplified compound 5-15
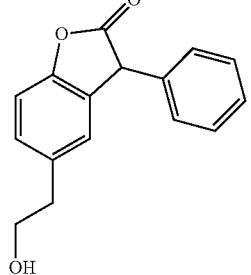

Exemplified compound 5-16

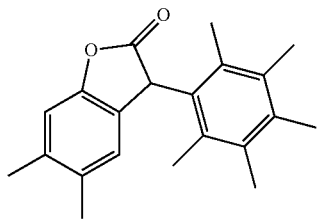

Exemplified compound 5-17

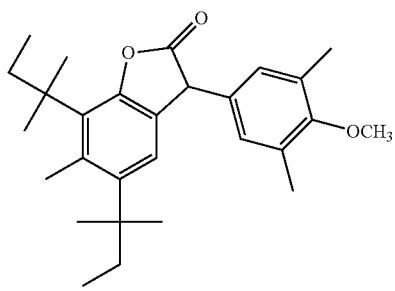

Exemplified compound 5-18

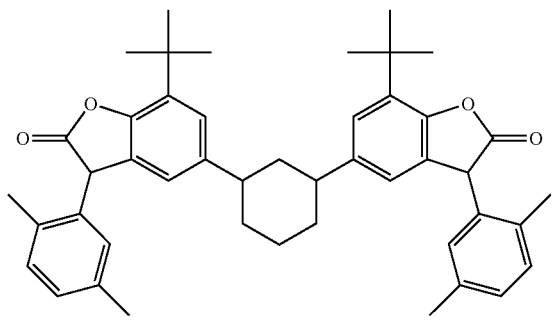

Exemplified compound 5-19

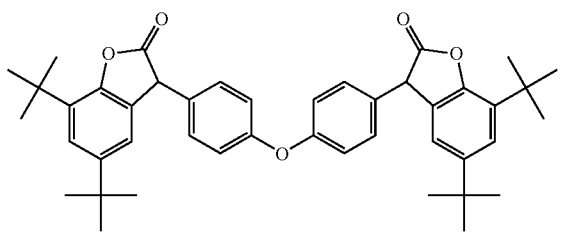

Exemplified compound 5-20

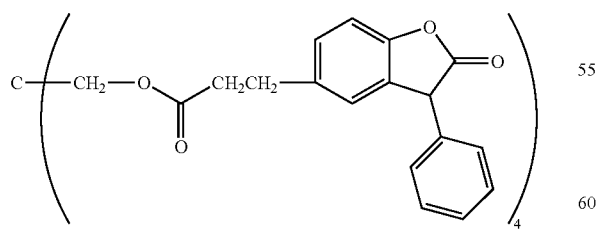

Compound Represented by Formula (6) Above

Next, a compound represented by formula (6) used in the invention will be explained, but the invention is not limited thereto.

In formula (6), $R_{10}$, $R_{11}$, $R_{12}$, $R_{13}$, $R_{14}$, $R_{15}$, $R_{16}$, $R_{17}$ and $R_{18}$ independently represent a hydrogen atom, an alkyl group, a cycloalkyl group, an aryl group, an alkoxy group or an aryloxy group. In formula (6), it is preferred that $R_{10}$, $R_{11}$, $R_{12}$ and $R_{13}$ independently represent a hydrogen atom, an alkyl group, a cycloalkyl group or an aryl group, and it is more preferred that $R_{10}$, $R_{11}$, $R_{12}$ and $R_{13}$ independently represent a hydrogen atom or an alkyl group.

In formula (6), $R_{10}$ and $R_{12}$ preferably represent *—C(CH$_3$)$_2$—R' containing a quaternary carbon (in which "*" represents a site bonding to the aromatic ring), and R' represents an alkyl group having a carbon atom number of from 1 to 5). $R_{10}$ is more preferably a t-butyl group or a t-amyl group. $R_7$ is more preferably a t-butyl group or a t-amyl group or a t-octyl group.

In formula (6), $R_{11}$ and $R_{13}$ preferably represent a hydrogen atom.

In formula (6), $R_{10}$ and $R_{11}$, $R_{11}$ and $R_{12}$, or $R_{11}$ and $R_{13}$ may combine with each other to form a ring.

In formula (6), it is preferred that $R_{14}$, $R_{15}$, $R_{16}$, $R_{17}$ and $R_{18}$ independently represent a hydrogen atom, an alkyl group or a cycloalkyl group.

In formula (6), $R_{14}$ and $R_{15}$, $R_{15}$ and $R_{16}$, $R_{16}$ and $R_{17}$, or $R_{17}$ and $R_{18}$ may combine with each other to form a ring.

In formula (6), $R_{19}$ is preferably an alkyl group or a cycloalkyl group.

In formula (6), examples of the alkyl group or the cycloalkyl group represented by $R_{19}$ include the same as those denoted above in the alkyl group or the cycloalkyl group represented by $R_1$ and $R_2$ in formula (1) above.

The alkyl group or the cycloalkyl group represented by $R_{19}$ may have a substituent, and examples of the substituent include the same as those substituents denoted above which the alkyl group or the cycloalkyl group represented by $R_1$ and $R_2$ in formula (1) above may have.

In formula (6), $R_{19}$ is preferably an alkyl group.

Next, typical examples of a compound represented by formula (6) will be listed below, and the invention is not limited thereto.

Exemplified compound 6-1

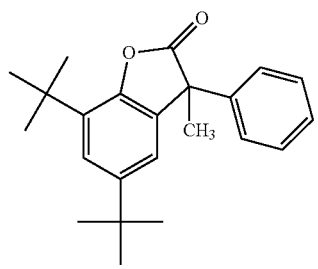

Exemplified compound 6-2

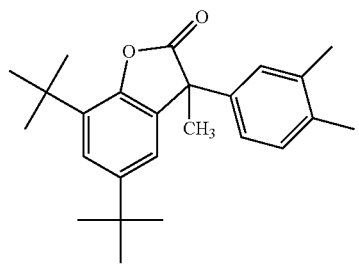

Exemplified compound 6-3
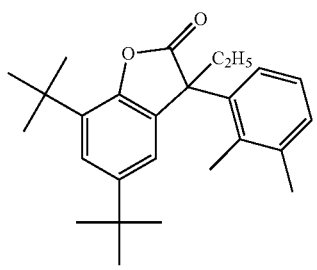
Exemplified compound 6-4
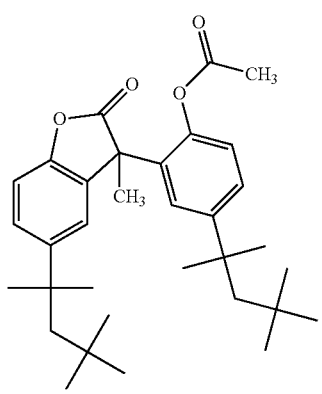
Exemplified compound 6-5
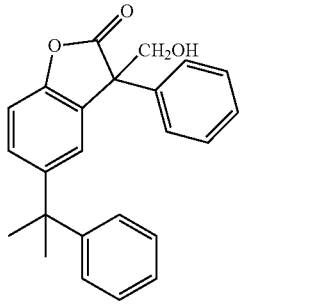
Exemplified compound 6-6
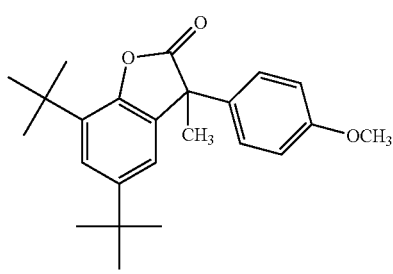
Exemplified compound 6-7
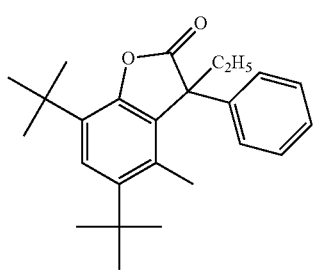
Exemplified compound 6-8
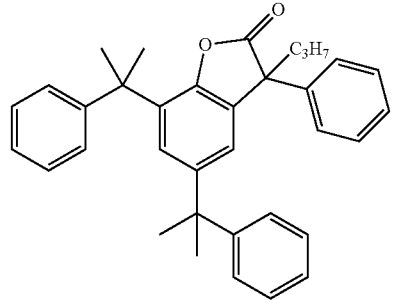
Exemplified compound 6-9
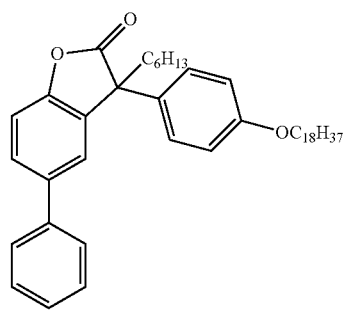
Exemplified compound 6-10
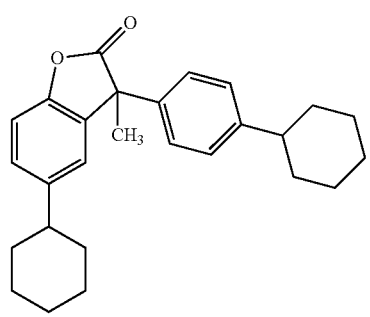
Exemplified compound 6-11
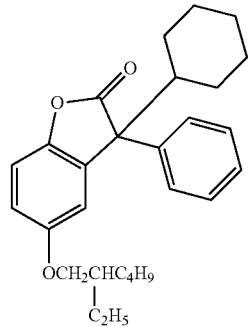
Exemplified compound 6-12
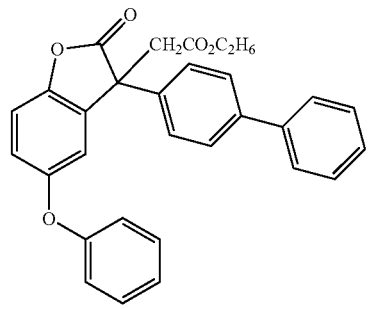

Exemplified compound 6-13

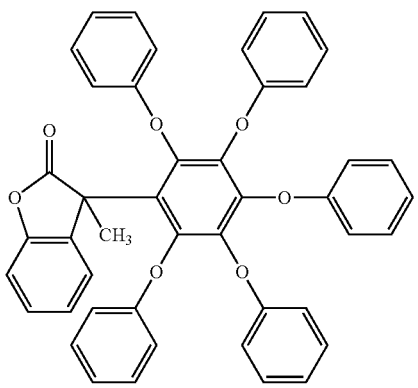

Exemplified compound 6-14

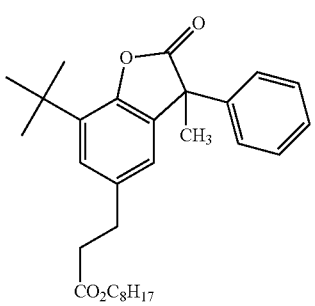

Exemplified compound 6-15

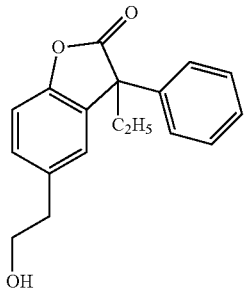

Exemplified compound 6-16

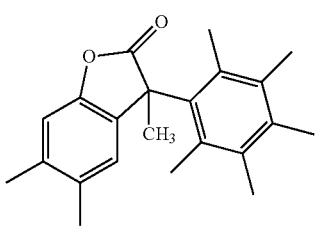

Exemplified compound 6-17

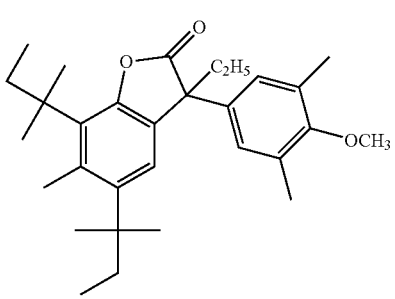

Exemplified compound 6-18

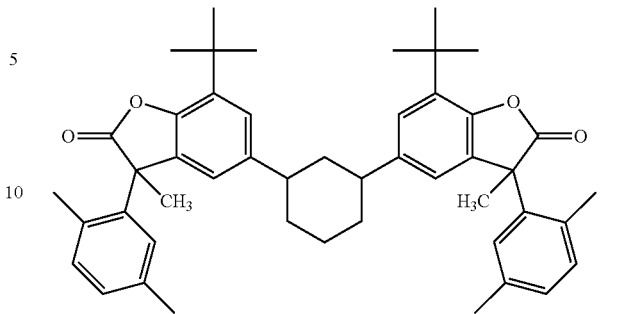

Exemplified compound 6-19

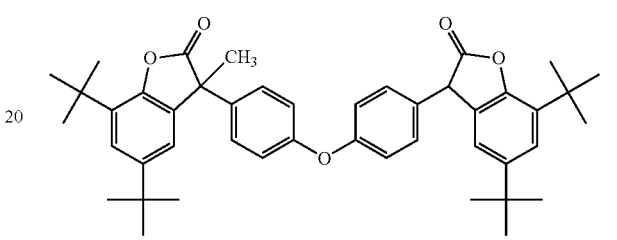

Exemplified compound 6-20

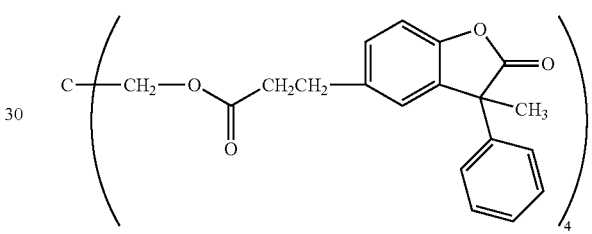

The added amount of the combination A, the compound represented by formula (1) and the compound represented by formula (2) in the cellulose ester pellets and cellulose ester film of the invention may be any as long as the total amount of the both compounds is from 0.001 to 1.00% by weight based on the cellulose ester, the added amount of the combination B, the compound represented by formula (3) and the compound represented by formula (4) in the cellulose ester pellets and cellulose ester film of the invention may be any as long as the total amount of the both compounds is from 0.001 to 1.00% by weight based on the cellulose ester, and the added amount of the combination C, the compound represented by formula (5) and the compound represented by formula (6) in the cellulose ester pellets and cellulose ester film of the invention may be any as long as the total amount of the both compounds is from 0.001 to 1.00% by weight based on the cellulose ester. The added amount less than 0.001% by weight cannot sufficiently exhibit the effects of the invention. In contrast, the added amount more than 1.00% by weight exceeds compatibility limit to cellulose ester and results in turbidity or separation, which is undesired. It is important in solving the problems in the invention that both the compound represented by formula (1) and the compound represented by formula (2) of the combination A are present, both the compound represented by formula (3) and the compound represented by formula (4) of the combination B, or both the compound represented by formula (5) and the compound represented by formula (6) of the combination C. Although details are not clear, it is considered that the presence of the two compounds in each combination exhibits synergic effects.

In the invention, use of both the combinations A and B or use of both the combinations A and C is preferred. When both the combinations A and B are used, the added amount of the combination A is from 0.001 to 1.00% by weight based on the cellulose ester, and the added amount of the combination B is from 0.001 to 1.00% by weight based on the cellulose ester. When both the combinations A and C are used, the added amount of the combination A is from 0.001 to 1.00% by weight based on the cellulose ester, and the added amount of the combination C is from 0.001 to 1.00% by weight based on the cellulose ester.

The total added amount of the compound represented by formula (1) and the compound represented by formula (2) of the combination A is preferably from 0.01 to 0.80% by weight, and more preferably from 0.10 to 0.50% by weight. The total added amount of the compound represented by formula (3) and the compound represented by formula (4) of the combination B is preferably from 0.01 to 0.80% by weight, and more preferably from 0.10 to 0.50% by weight. The total added amount of the compound represented by formula (5) and the compound represented by formula (6) of the combination C is preferably from 0.01 to 0.80% by weight, and more preferably from 0.10 to 0.50% by weight.

When the cellulose ester film of the invention is obtained from cellulose ester pellets only or a mixture of cellulose ester pellets and a recycled material described later, the contents of combination A, B or C contained in the cellulose ester pellets may be the same or different, as long as the content of combination A, B or C in the obtained cellulose ester film is from 0.001 to 1.00% by weight. For example, even if a cellulose ester film is prepared employing cellulose ester pellets having a content of combination A, B or C of more than 1.0% by weight as a master batch, the cellulose ester film falls within the invention, as long as it has a content of combination A, B or C of from 0.001 to 1.00% by weight.

SYNTHETIC EXAMPLES

Next, a synthetic method of compounds represented by formulas (1) through (6) in the invention will be explained, but the invention is not limited to these.

Synthetic Example 1

(Compound Represented by Formula (1), Exemplified Compound 1-1)

Synthetic Example 1

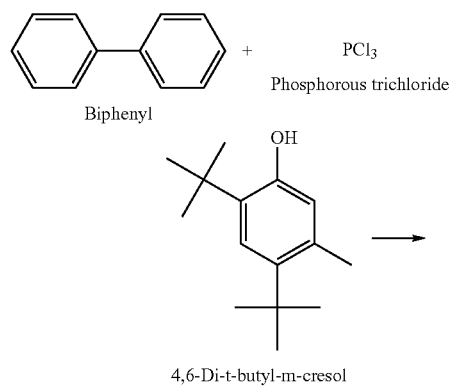

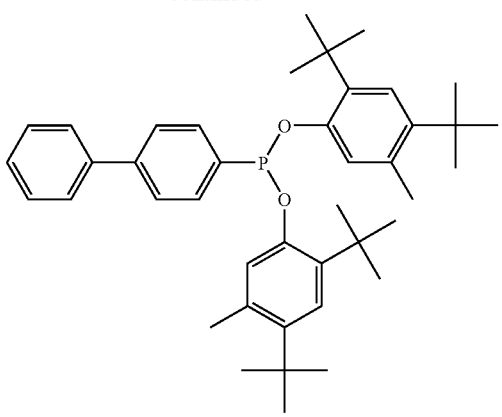

Exemplified Compound 1-1

A mixture of 16.9 g of biphenyl, 58.0 g of phosphorous trichloride and 16.4 g of aluminum chloride was refluxed with vigorous stirring at 70° C. for 6 hours. After that, excess phosphorous trichloride was removed under reduced pressure to obtain oily product. A solution in which 48.3 g of 4,6-di-t-butyl-m-cresol were dissolved in a mixture of 300 ml of toluene and 35 g of pyridine was heated to 80° C., dropwise added with the resulting oily product, and reacted for 4 hours. The resulting reaction mixture was cooled to room temperature, and the resulting precipitates were filtered off to obtain a filtrate. The filtrate was concentrated under reduced pressure and the resulting concentrate was purified according to column chromatography (a methylene chloride/n-hexane mixture solvent being employed as an elution solvent) to obtain 47.8 g of solid product. The solid product proved to be Exemplified Compound 1-1 according to 1H-NMR and MASS spectrum analysis.

Synthetic Example 2

(Compound Represented by Formula (2), Exemplified Compound 2-1)

Synthetic Example 2

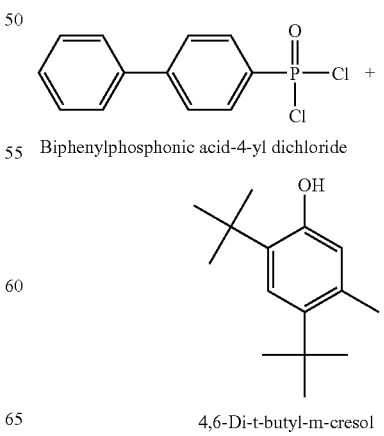

-continued

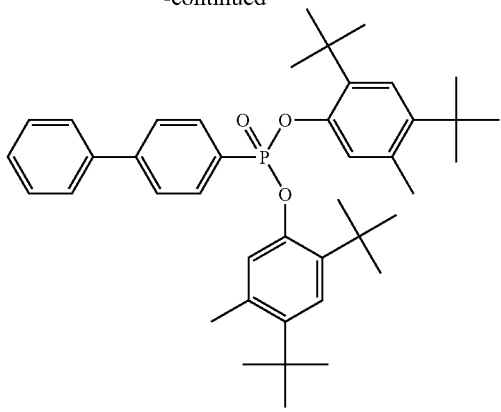

Exemplified Compound 2-1

4,6-Di-t-butyl-m-cresol of 23.2 g and 11.9 g of pyridine were added to 100 ml of toluene to obtain a solution. The resulting solution was heated to 80° C., slowly added with 13.6 g of biphenylphosphonic acid-4-yl dichloride, and reacted for 6 hours. The resulting reaction mixture was cooled to room temperature, and the resulting precipitates were filtered off to obtain a filtrate. The filtrate was concentrated under reduced pressure and the resulting concentrate was purified according to column chromatography (a methylene chloride/n-hexane mixture solvent being employed as an elution solvent) to obtain 25.0 g of solid product. The solid product proved to be Exemplified Compound 2-1 according to $^1$H-NMR and MASS spectrum analysis.

Synthetic Example 3

(Compound Represented by Formula (3), Exemplified Compound 3-1)

Synthetic Example 3

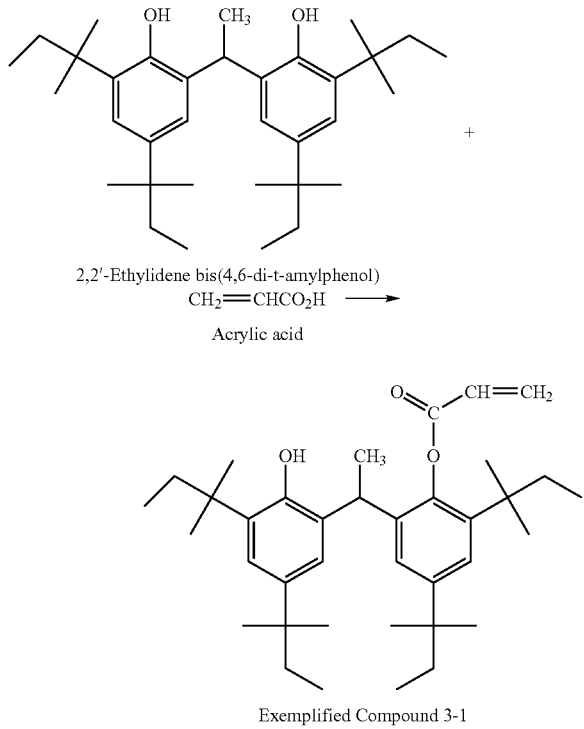

Exemplified Compound 3-1

107.3 g of phosphorous oxychloride were dropwise added to a mixture of 494.8 g of 2,2'-ethylidenebis(4,6-di-t-amylphenol), 72.1 g of acrylic acid, 400 g of heptane and 212.5 g of triethylamine with stirring under nitrogen atmosphere. After the addition, the resulting mixture was stirred for 8 hours at 80° C., and then added with 500 g of water, and washed with water at 60° C. The organic phase was separated, washed with water till the resultant aqueous phase is neutral, and cooled with ice water to produce precipitate. The resulting precipitate was filtered off, washed and dried to obtain 210.7 g of solid product. The solid product proved to be Exemplified Compound 3-1 according to $^1$H-NMR and MASS spectrum analysis.

Synthetic Example 4

(Compound Represented by Formula (4), Exemplified Compound 4-1)

Synthetic Example 4

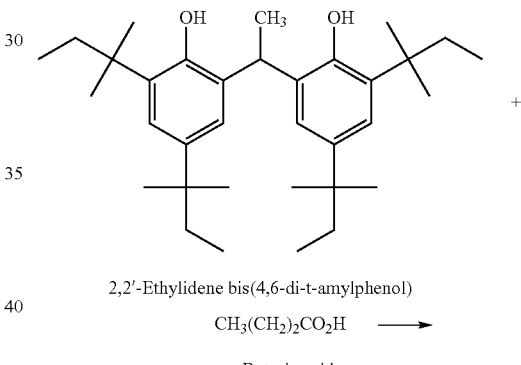

2,2'-Ethylidene bis(4,6-di-t-amylphenol)

CH$_3$(CH$_2$)$_2$CO$_2$H ⟶ n-Butyric acid

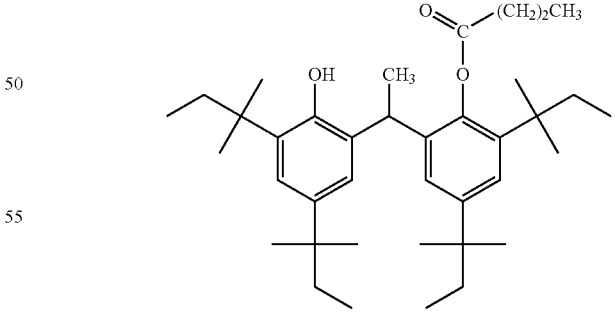

Exemplified Compound 4-1

A solid product was prepared in the same manner as in Exemplified Compound 3-1, except that 88.1 g of butyric acid was used instead of acrylic acid. The solid product proved to be Exemplified Compound 4-1 according to $^1$H-NMR and MASS spectrum analysis.

Synthetic Example 5

(Compound Represented by Formula (5), Exemplified Compound 5-1)

Synthetic Example 5

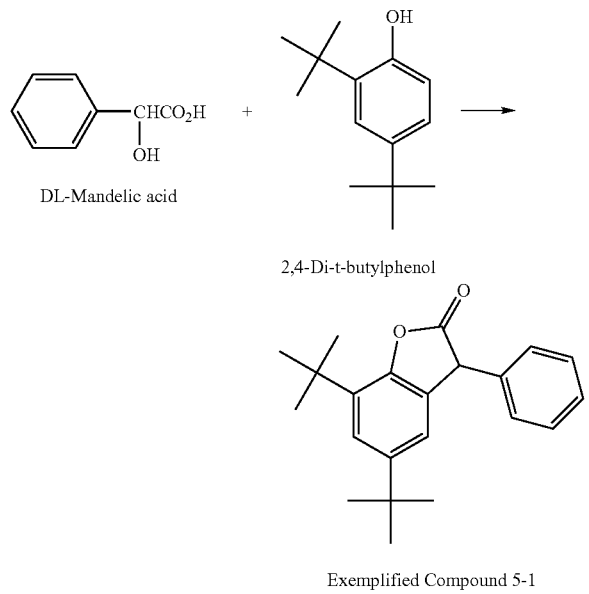

A mixture of 15.2 g of mandelic acid and 20.6 g of 2,4-di-t-butylphenol was heated, and refluxed at 160° C. for 30 minutes under ordinary pressure. After that, the resulting mixture was heated for 5 hours under reduced pressure, the pressure reduced by a vacuum pump, and the temperature was further elevated, reacted at 180° C. for 4 hours. The resulting product was allowed to stand to cool and added with ethanol to obtain a solution. The solution was stirred at room temperature to produce a precipitate. The solution was cooled in a refrigerator overnight, and the resultant precipitate was filtered off, washed and dried to obtain 21.6 g of a solid product. The solid product proved to be Exemplified Compound 5-1 according to $^1$H-NMR and MASS spectrum analysis.

Synthetic Example 6

(Compound Represented by Formula (6), Exemplified Compound 6-1)

Synthetic Example 6

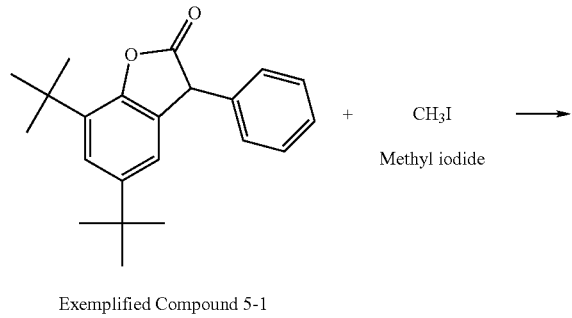

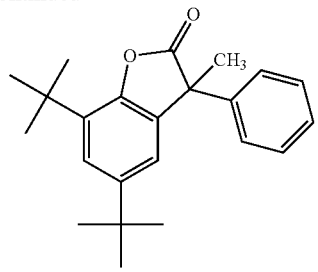

Exemplified Compound 6-1

16.1 g of Exemplified Compound 5-1, 8.5 g of methyl iodide and 10.4 g of potassium carbonate were added in 16.1 g of N,N-dimethylformamide, and reacted at 70° C. for 3 hours with stirring. The reaction solution was added with ethyl acetate and water, and placed in a separating funnel. The upper phase was separated from the lower phase, and washed five times with water. The resulting upper phase was concentrated and dried under reduced pressure to obtain a residue. The resultant residue was recrystallized from acetonitrile to obtain 14.3 g of a solid product. The solid product proved to be Exemplified Compound 6-1 according to $^1$H-NMR and MASS spectrum analysis.

Other exemplified compounds represented by formula (1) through (6) can be also synthesized in the same manner as above.

<<Additives>>

In the invention, various additives can be added in addition to the combination A, B or C.

<<Phenol Compound>>

The cellulose ester pellets or cellulose ester film of the invention preferably contain a phenol compound. The phenol compound is a compound well known in the art and examples thereof include alkyl-substituted phenol such as p-t-butylphenol or p^(1,1,3,3-tetramethylbutyl)phenol, and a 2,6-dialkylphenol derivative compound as described, for example, in columns 12 to 14 of U.S. Pat. No. 4,839,405, so-called a hindered phenol compound. Among these compounds, the hindered phenol compound is preferred.

Typical examples of the hindered phenol compound include n-octadecyl 3-(3,5-di-t-butyl-4-hydroxyphenyl)-propionate, n-octadecyl 3-(3,5-di-t-butyl-4-hydroxyphenyl)-acetate, n-octadecyl 3,5-di-t-butyl-4-hydroxybenzoate, n-hexyl 3,5-di-t-butyl-4-hydroxyphenylbenzylbenzoate, n-dodecyl 3,5-di-t-butyl-4-hydroxyphenylbenzoate, neo-dodecyl 3-(3,5-di-t-butyl-4-hydroxyphenyl)propionate, dodecyl β-(3,5-di-t-butyl-4-hydroxyphenyl) propionate, ethyl α-(4-hydroxy-3,5-di-t-butyl phenyl) iso butyrate, octadecyl α-(4-hydroxy-3,5-di-t-butyl phenyl) iso butyrate, octadecyl α-(4-hydroxy-3,5-di-t-butyl-4-hydroxy-phenyl) propionate, 2-(n-octylthio)ethyl 3,5-di-t-butyl-4-hydroxy-benzoate, 2-(n-octylthio)ethyl 3,5-di-t-butyl-4-hydroxyphenylacetate, 2-(n-octadecylthio) ethyl 3,5-di-t-butyl-4-hydroxyphenyl acetate, 2-(n-octadecylthio)ethyl 3,5-di-t-butyl-4-hydroxybenzoate, 2-(2-hydroxyethylthio)ethyl 3,5-di-t-butyl-4-hydroxybenzoate, diethyl glycol bis-(3,5-di-t-butyl-4-hydroxy-phenyl) propionate, 2-(n-octadecylthio)ethyl 3-(3,5-di-t-butyl-4-hydroxyphenyl) propionate, stearylamido N,N-bis[ethylene 3-(3,5-di-t-butyl-4-hydroxyphenyl)propionate], n-butyl-imino N,N-bis-[ethylene 3-(3,5-di-t-butyl-4-hydroxyphenyl) propionate], 2-(2-stearoyloxyethylthio)ethyl 3,5-di-t-butyl-4-hydroxybenzoate, 2-(2-stearoyloxyethylthio)ethyl 7-(3-methyl-5-t-butyl-4-hydroxyphenyl) heptanoate, 1,2- propylene glycol bis-[3-(3,5-di-t-butyl-4-hydroxyphenyl) propionate], ethylene glycol bis-[3-(3,5-di-t-butyl-4-hydroxyphenyl)propionate], neopentyl glycol bis-[3-(3,5-di-t-butyl-4-hydroxy-phenyl) propionate], ethylene glycol bis-(3,5-di-t-butyl-4-hydroxyphenyl)acetate, glycerol-1-n-octadecanoate-2,3-bis-(3,5-di-t-butyl-4-hydroxy-phenyl acetate), pentaerythrytol tetrakis[3-(3',5'-di-t-butyl-4'-hydroxyphenyl)propionate], 3,9-bis{2-[3-(3-t-butyl-4-hydroxy-5-methylphenyl)-propionyloxy]-1,1-dimethylethy}-2,4,8,10-tetraoxaspiro[5.5]undecane, 1,1,1-trimethylolethane tris[3-(3,5-di-t-butyl-4-hydroxyphenyl) propionate], sorbitol hexa[3-(3,5-di-t-butyl-4-hydroxyphenyl)propionate], 2-hydroxyethyl 7-(3-methyl-5-t-butyl-4-hydroxyphenyl) propionate, 2-stearoyloxyethyl 7-(3-methyl-5-t-butyl-4-hydroxyphenyl) heptanoate, 1,6-n-hexanediol bis[(3',5'-di-t-butyl-4-hydroxyphenyl) propionate], and pentaerythrytol tetrakis(3,5-di-t-butyl-4-hydroxycinnamate). The hindered phenol compounds are available on the market, and there are, for example, IRGANOX 1076 and IRGANOX 1010 (trade name) from Ciba Specialty Chemicals Co., Ltd.

The content of the phenol compound in the cellulose ester pellets or cellulose ester film of the invention is preferably from 0.01 to 5.0% by weight, more preferably from 0.05 to 2.0% by weight, and still more preferably from 0.01 to 1.0% by weight, based on the weight of cellulose ester in the invention. Two or more kinds of the phenol compound may be used in combination.

<<Acid Trapping Agent>>

It is preferable to incorporate an acid trapping agent as a stabilizing agent in the optical film of this invention, since decomposition of the cellulose ester is accelerated by an acid under high temperature environment such as melt-casting. Any compound may be employed without restriction as a useful acid trapping agent in this invention as far as the compound reacts with an acid to render the acid inactive. Preferred examples thereof include compounds containing an epoxy group described in U.S. Pat. No. 4,137,201. Such an epoxy compound is known as an acid trapping agent in the art, and examples thereof include polyglycols derived by condensation such as diglycidyl ethers of various polyglycols, especially those having approximately 8-40 moles of ethylene oxide per mole of polyglycol, diglycidyl ethers of glycerol; metal epoxy compounds (such as those conventionally used in vinyl chloride polymer compositions or together with vinyl chloride polymer compositions), epoxy ether condensation products, a diglycidyl ether of Bisphenol A (namely 4,4'-dihydroxydiphenyl dimethyl methane), epoxidated unsaturated fatty acid esters (particularly fatty acid (with a carbon atom number of 2 to 22) alkyl (with a carbon atom number of 4 to 2) esters (such as butyl epoxy stearate); and various epoxy long-chain fatty acid triglycerides; (such as epoxy plant oils which are typically compositions of epoxy soy bean oil; and other unsaturated natural oils (these are sometimes called epoxidized natural glycerides or unsaturated fatty acids and these fatty acids generally have 12 to 22 carbon atoms)). As commercially available epoxy resin compounds, EPON 815C and other epoxidated ether oligomer condensates can be preferably used.

Other examples of an acid trapping agent that can be used include oxetane compounds, oxazoline compounds, organic acid alkaline earth metal salts, acetylacetonato complexes, and those as described in paragraphs 68 to 105 in Japanese Patent O.P.I. Publication No. 05-194788.

The content of the acid trapping agent in the cellulose ester pellets or cellulose ester film of the invention is preferably from 0.01 to 5.0% by weight, more preferably from 0.05 to 2.0% by weight, and still more preferably from 0.01 to 1.0% by weight, based on the weight of cellulose ester. Two or more kinds of the acid trapping agent may be used in combination.

An acid trapping agent is also referred to as an acid scavenger, an acid capturing agent or an acid catcher, however, in the present invention, any of these agents are usable regardless of the difference in the terms.

<<Metal Inactivating Agent>>

A metal inactivating agent refers to a compound inactivating a metal ion working as an initiator or a catalyst on oxidation reaction. As a metal inactivating agent, there are mentioned hydrazide compounds, oxalic acid diamides and triazole compounds. Typical examples thereof include N,N'-bis[3-(3,5-di-t-butyl-4-hydroxyphenyl)propionyl]hydrazine, 2-hydroxyethyl oxalic acid diamide, 2-hydroxy-N-(1H-1,2, 4-triazole-3-yl)benzamide, and N-(5-tert-butyl-2-ethoxyphenyl)-N'-(2-ethylphenyl) oxalic acid amide.

The content of the metal inactivating agent in the cellulose ester pellets or cellulose ester film of the invention is preferably from 0.01 to 5.0% by weight, more preferably from 0.05 to 2.0% by weight, and still more preferably from 0.01 to 1.0% by weight, based on the weight of cellulose ester in the invention. Two or more kinds of the metal inactivating agent may be used in combination.

<<Plasticizer>>

In the process of preparing the cellulose ester pellets or cellulose ester film of the invention, at least one kind of plasticizer is preferably added to a material for preparing the pellets or film.

Generally, a plasticizer is an additive, which is added to a polymer to improve flexibility of the polymer and impart flexibility to the polymer. In the invention, the plasticizer is employed as an additive to lower the melting temperature of materials for preparing the pellets or film and to lower the viscosity of the materials for preparing the pellets or film at the same temperature. Lowering the melting temperature or melting viscosity can prevent deterioration of cellulose ester in the melting process of the cellulose ester. In the invention, materials having such an effect can be used as a plasticizer without any restriction. The melting temperature or melting viscosity can be effectively lowered employing a plasticizer having a melting point or glass transition point lower than the glass transition point of cellulose ester.

Addition of a plasticizer to cellulose ester film may exhibit the effects of increasing shear strength, providing water absorption resistance, and lowering moisture permeability, and a material having such effects is preferably uses as the plasticizer.

As a plasticizer in the invention which satisfies the conditions above, there are, for example, a polyhydric alcohol ester plasticizer (such as an ethylene glycol ester plasticizer, a glycerin ester plasticizer or a diglycerin ester plasticizer), a polycarboxylic acid ester plasticizer, a carbon hydrate ester plasticizer, and a polymer plasticizer. Among these, a polyhydric alcohol ester plasticizer or a polycarboxylic acid ester plasticizer is preferred, and a polyhydric alcohol ester plasticizer is more preferred. The plasticizer may be liquid or solid, and is preferably colorless in view of properties of composition. The content of the plasticizer in the composition is suitably determined as long as the content has no adverse influence on optical or mechanical properties and does not jeopardize the effects of the invention. The plasticizer content of the cellulose ester pellets or the cellulose ester film of the invention is preferably from 1 to 25% by weight based on the weight of the cellulose ester. When the content is less than 1% by weight, improvement of flatness is insufficient, which is not preferred, and when the content is more than 25% by weight, bleed out is apt to occur, resulting in aged deterioration of stability of film, which is not preferred. The plasticizer content of the cellulose ester pellets or the cellulose ester film of the invention is more preferably from 3 to 20% by weight, and still more preferably from 5 to 15% by weight.

Next, a plasticizer used in the invention will be detailed, but the invention is not limited thereto.

In the invention, an ester plasticizer formed from a polyhydric alcohol and a carboxylic acid or an ester plasticizer formed from a polycarboxylic acid and a monohydric alcohol is preferred since it has high affinity to cellulose ester. The ester plasticizer formed from a polyhydric alcohol and a carboxylic acid, which has further higher affinity to cellulose ester, is more preferred The polyhydric alcohol ester plasticizer refers to a compound obtained by condensation of a compound having plural hydroxyl groups in one molecule with a monocarboxylic organic acid compound. The polycarboxylic acid ester plasticizer refers to a compound obtained by condensation of a compound having plural carboxyl groups in one molecule with plural monohydric alcohols or phenols.

Examples of polyhydric alcohols, which are materials for ester plasticizers preferably used in the invention, include those listed below, but the invention is not limited thereto.

adonitol, arabitol, ethylene glycol, glycerin, diglycerin, diethylene glycol, triethylene glycol, tetraethylene glycol, 1,2-propane diol, 1,3-propane diol, dipropylene glycol, tripropylene glycol, 1,2-butane diol, 1,3-butane diol, 1,4-butane diol, dibutylene glycol, 1,2,4-butane triol, 1,5-pentane diol, 1,6-hexane diol, hexane triol, galactitol, mannitol, 3-methylpentane-1,3,5-triol, pinacol, sorbitol, trimethylolpropane, ditrimethylolpropane, trimethylolethane, pentaerythritol, dipentaerythritol, and xylitol. Particularly preferred are ethylene glycol, glycerin and trimethylolpropane.

Preferred examples of the organic acid include acetic acid, propionic acid, butyric acid, isobutyric acid, pivalic acid, acrylic acid, methacrylic acid, cyclohexane carboxylic acid, benzoic acid, anisic acid, 3,4,5-trimethoxybenzoic acid, toluic acid, tert-butylbenzoic acid, naphthoic acid, and picolic acid. In the invention is preferred a polyhydric alcohol ester derived from an unsaturated carboxylic acid, for example, an aromatic carboxylic acid, which effectively minimizes moisture permeability of cellulose ester.

In the polyhydric alcohol ester, the organic acid used may be used singly or as an admixture of two or more kinds thereof. All of the OH groups of the polyhydric alcohol may be esterified or a part of the OH groups may be free.

Typical examples of the ethylene glycol ester plasticizer which is one of the polyhydric ester plasticizers include ethylene glycol alkyl ester plasticizers such as ethylene glycol diacetate and ethylene glycol dibutyrate; ethylene glycol cycloalkyl ester plasticizers such as ethylene glycol dicyclopropyl carboxylate, and ethylene glycol dicyclohexyl carboxylate; and ethylene glycol aryl ester plasticizers such as ethylene glycol dibenzoate and ethylene glycol di-4-methyl benzoate. The alkylate groups, cycloalkylate groups or arylate groups in the ethylene glycol ester plasticizer may be the same or different and may further have a substituent. The alkylate groups, cycloalkylate groups and arylate groups may be used in combination, and the substituents may be covalently bonded to each other. Further, the ethylene glycol group may have a substituent. A partial structure of the ethylene glycol ester may constitute a part of a polymer, may be included in a polymer as a part of regularly distributed pendants in the polymer, or may be incorporated into a part of the molecular structure of additives such as an antioxidant, an acid scavenger and an ultraviolet absorber.

Typical examples of the glycerin ester plasticizer, which is one of the polyhydric alcohol ester plasticizers, include glycerin alkyl esters such as triacetin, tributyrin, glycerin diacetate carboxylate and glycerin oleate propionate; glycerin cycloalkyl esters such as glycerin tricyclopropyl carboxylate, and glycerin tricyclohexyl carboxylate; glycerin aryl esters such as glycerin tribenzoate and glycerin-4-methylbenzoate; diglycerin alkyl esters such as diglycerin tetraacetylate, diglycerin tetrapropionate, diglycerin acetate tricaprylate and diglycerin tetralaurate; diglycerin cycloalkyl esters such as diglycerin tetracyclobutyl carboxylate and diglycerin tetracyclopentyl carboxylate; and diglycerin aryl esters such as diglycerin tetrabenzoate and diglycerin-3-methyl benzoate. The alkylate groups, cycloalkylate groups or arylate groups in the glycerin ester plasticizer may be the same or different and may further have a substituent. The alkylate groups, cycloalkylate groups and arylate groups may be used in combination, and the substituents may be covalently bonded to each other. Further, the glycerin and diglycerin portions may have a substituent. A partial structure of the glycerin ester or diglycerin ester may constitute a part of a polymer, may be included in a polymer as a part of regularly distributed pendants in the polymer, or may be incorporated into a part of the molecular structure of additives such as an antioxidant, an acid scavenger and an ultraviolet absorber.

Examples of other polyhydric alcohol ester plasticizers include those disclosed in paragraphs 30 to 33 of Japanese Patent O.P.I. Publication No. 2003-12823, and pentaerythritol tetrabenzoate.

The alkylate groups, cycloalkylate groups or arylate groups in the plasticizers may be the same or different and may further have a substituent. The alkylate groups, cycloalkylate groups and arylate groups may be used in combination, and the substituents may be covalently bonded to each other. Further, the polyhydric alcohol portions may have a substituent. A partial structure of the polyhydric alcohol ester may constitute a part of a polymer, may be included in a polymer as a part of regularly distributed pendants in the polymer, or may be incorporated into a part of the molecular structure of additives such as an antioxidant, an acid scavenger and an ultraviolet absorber.

Among the ester plasticizers formed from the polyhydric alcohol and a monocarboxylic acid, a polyhydric alkanol aryl ester is preferred, and typical examples thereof include ethylene glycol dibenzoate, glycerin tribenzoate, diglycerin and tetrabenzoate, as describe above; and Exemplified compound 16 as disclosed in paragraph 31 of Japanese Patent O.P.I. Publication No. 2003-12823.

Typical examples of the dicarboxylic acid ester plasticizer which is one of the polycarboxylic acid esters include alkyl dicarboxylic acid alkyl ester plasticizers such as didodecyl malonate, dioctyl adipate and dibutyl sebacate; alkyl dicarboxylic acid cycloalkyl ester plasticizers such as dicyclopentyl succinate and dicyclohexyl adipate; alkyl dicarboxylic acid aryl ester plasticizers such as diphenyl succinate and di-4-methylphenyl glutarate, cycloalkyl dicarboxylic acid alkyl ester plasticizers such as dihexyl-1,4-cyclohexane dicarboxylate and didecyl bicyclo[2.2.1]heptane-2,3-dicarboxylate; cycloalkyl dicarboxylic acid cycloalkyl ester plasticizers such as dicyclohexyl-1,2-cyclobutane dicarboxylate and dicyclopropyl-1,2-cyclohexyl dicarboxylate; cycloalkyl dicarboxylic acid aryl ester plasticizers such as diphenyl-1, 1-cyclopropyl dicarboxylate and di-2-naphtyl-1,4-cyclohexane dicarboxylate; aryl dicarboxylic acid alkyl ester plasticizers such as diethyl phthalate, dimethyl phthalate, dioctyl phthalate, dibutyl phthalate and di-2-ethylhexyl phthalate; aryl dicarboxylic acid cycloalkyl ester plasticizers such as dicyclopropyl phthalate and dicyclohexyl phthalate; and aryl dicarboxylic acid aryl ester plasticizers such as diphenyl phthalate and di-4-methylphenyl phthalate; glycolic acid ester plasticizers such as butyl phthalylbutyl glycolate and ethyl phthalylethyl glycolate; and citric acid plasticizers such as citric acid acetyltrimethyl, citric acid acetyltriethyl and citric acid acetyltributyl. These alkoxy groups and cycloalkoxy groups may be the same or different, and may have a substituent. The substituent may be further substituted. The alkyl group and the cycloalkyl group may be used in combination, and the substituents may be covalently bonded to each other. Furthermore, the aromatic ring of the phthalic acid may be substituted and may be a polymer such as a dimer, trimer or tetramer. A partial structure of the phthalic acid ester may constitute a part of a polymer, may be included in a polymer as a part of regularly distributed pendants in the polymer, or may be incorporated into a part of the molecular structure of additives such as an antioxidant, an acid scavenger and an ultraviolet absorber.

Typical examples of other polycarboxylic acid ester plasticizers include alkyl polycarboxylic acid alkyl ester plasticizers such as tridodecyl tricarbalate and tributyl-meso-butane-1,2,3,4,-tetracarboxylate; alkyl polycarboxylic acid cycloalkyl ester plasticizers such as tricyclohexyl tricarbalate, and tricyclopropyl 2-hydroxy-1,2,3-propane tricarboxylate; alkyl polycarboxylic acid aryl ester plasticizers such as triphenyl 2-hydroxyl-1,2,3-propane tricarboxylate and tetra-3-methylphenyl tetrahydrofuran-2,3,4,5-tetracarboxylate; cycloalkyl polycarboxylic acid alkyl ester plasticizers such as tetrahexyl 1,2,3,4-cyclobutane tetracarboxylate and tetrabutyl 1,2,3,4-cyclopentane tetracarboxylate; cycloalkyl polycarboxylic acid cycloalkyl ester plasticizers such as tetracyclopropyl 1,2,3,4-cyclobutane tetracarboxylate and tricyclohexyl-1,3,5-cyclohexyl tricarboxylate; cycloalkyl polycarboxylic acid aryl ester plasticizers such as triphenyl 1,3,5-cyclohexyl tricarboxylate and hexa-4-methylphenyl-1,2,3,4,5,6-cyclohexyl hexacarboxylate; aryl polycarboxylic acid alkyl ester plasticizers such as tridodecyl benzene-1,2,4-tricarboxylate and tetraoctyl benzene-1,2,4,5 tetracarboxylate; aryl polycarboxylic acid cycloalkyl ester plasticizers such as tricyclopentyl benzene-1,3,5-tricarboxylate and tetracyclohexyl benzene-1,2,3,5-tetracarboxylate; and aryl polycarboxylic acid aryl ester plasticizers such as triphenyl benzene-1,3,5-tetracarboxylate and hexa-4-methylphenyl benzene-1,2,3,4,5,6-hexacarboxylate. These alkoxy groups and cycloalkoxy groups may be the same or different, and may have a substituent. The substituent may be further substituted. The alkyl group and the cycloalkyl group may be used in combination, and the substituents may be covalently bonded to each other. Furthermore, the aromatic ring of the phthalic acid may be substituted and may be a polymer such as a dimer, trimer or tetramer. A partial structure of the phthalic acid ester may constitute a part of a polymer, may be included in a polymer as a part of regularly distributed pendants in the polymer, or may be incorporated into a part of the molecular structure of additives such as an antioxidant, an acid scavenger and an ultraviolet absorber.

Of the ester plasticizers formed from the polycarboxylic acid and the monohydric alcohol, alkyl dicarboxylic acid alkyl esters are preferred, and typical examples thereof include the foregoing dioctyl adipate.

As other plasticizers used in the invention, there are mentioned a carbohydrate ester plasticizer and a polymer plasticizer.

Next, a carbohydrate ester plasticizer will be explained. The carbohydrate means monosaccharide, disaccharide or trisaccharide in which saccharide is present in the form of pyranose or furanose (6-member ring or 5-member ring). Unlimited examples of the carbohydrate include glucose, saccharose, lactose, cellobiose, mannose, xylose, ribose, galactose, arabinose, fructose, sorbose, cellotriose and raffinose. The carbohydrate ester indicates an ester compound obtained by dehydration condensation of a carbohydrate and a carboxylic acid, and specifically indicates an aliphatic carboxylic ester or an aromatic carboxylic ester. Examples of the aliphatic carboxylic acid include acetic acid and propionic acid, and examples of the aromatic carboxylic acid include benzoic acid, toluic acid and anisic acid. A carbohydrate has a different hydroxyl group number according to kinds thereof, and either a part of the hydroxyl group thereof may react with a carboxylic acid to form an ester compound or the whole hydroxyl group and react with a carboxylic acid to form an ester compound. In the invention, it is preferred that the whole hydroxyl group reacts with a carboxylic acid to form an ester compound.

Preferred examples of the carbohydrate ester plasticizers include glucose pentaacetate, glucose pentapropionate, glucose pentabutyrate, saccharose octaacetate and saccharose octabenzoate. Saccharose octaacetate and saccharose octabenzoate are more preferred among them, and saccharose octabenzoate is still more preferred. As the carbohydrate ester plasticizers, MONOPET SB and MONOPET SOA produced by Dai-Ichi Seiyaku Kogyo Co., Ltd. are available on the market.

Examples of the polymer plasticizer includes an aliphatic hydrocarbon type polymer; an alicyclic hydrocarbon type polymer; an acryl type polymer such as polyethyl acrylate, polymethyl methacrylate, methyl methacrylate-2-hydroxyethyl methacrylate copolymer or methyl methacrylate-methyl acrylate-2-hydroxyethyl methacrylate copolymer; a vinyl type polymer such as polyvinyl isobutyl ether or poly-N-vinyl pyrrolidone; a styrene type polymer such as polystyrene or poly-4-hydroxystyrene; a polyester such as polybutylene succinate, polyethylene terephthalate or polyethylene naphthalate; a polyether such as polyethylene oxide or polypropylene oxide; polyamide; polyurethane; and polyurea. The number average molecular weight of the polymer plasticizer is preferably from 1,000 to 500,000 and more preferably from 5,000 to 200,000. The number average molecular weight of less than 1,000 causes a problem in volatility and that of more than 500,000 lowers plasticizing ability, which results in an unfavorable effect on mechanical properties of the cellulose ester pellets or cellulose ester film. These polymer plasticizers may be a homopolymer comprised of one kind of a repeating unit or a copolymer containing plural kinds of repeating units. Two or more kinds of the polymer plasticizers may be used in combination.

The cellulose ester pellets or cellulose ester film of the present invention preferably contain 1 to 25% by weight of an ester plasticizer formed from a polyhydric alcohol and a monocarboxylic acid or an ester plasticizer formed from a polycarboxylic acid and a monohydric alcohol. However, other plasticizers may be used in combination.

A plasticizer used in the cellulose ester pellets or cellulose ester film of the invention is more preferably an ester plasticizer formed from a polyhydric alcohol and a monocarboxylic acid. An ester type plasticizer formed from a tri- or higher hydric alcohol and a monocarboxylic acid is most preferable, since it can be added to cellulose ester due to its high compatibility with the cellulose ester, and when used in combination with other plasticizers or additives, its bleeding-out is minimized which renders it easy to use in combination with other plasticizers or additives.

<<Ultraviolet Absorbent>>

In the invention, it is preferred that the pellets or film further contain an ultraviolet absorbent in improving the durability. An ultraviolet absorbent having excellent absorbance of ultraviolet light with wavelengths not longer than 370 nm is preferred in view of preventing deterioration of a polarizer or a display device due to ultraviolet light, and an ultraviolet absorbent having little absorbance of visible light with wavelengths of not shorter than 400 nm from is preferred in view of displaying properties of a liquid crystal display. Examples of the ultraviolet absorbents include oxybenzophenone compounds, benzotriazole compounds, salicylic acid ester compounds, benzophenone compounds, cyano acrylate compounds, nickel complex compounds, and triazine compounds. Benzophenone compounds or little colored benzotriazole or triazine compounds are preferred. The ultraviolet absorbents disclosed in Japanese Patent O.P.I. Publication Nos. 10-182621 and 08-337574 and the high molecular ultraviolet absorbents disclosed in Japanese Patent O.P.I. Publication Nos, 06-148430 and 2003-113317 may also be used.

Examples of the benzotriazole ultraviolet absorbents include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzo-triazole, 2-(2'-hydroxy-3'-(3",4",5",6"-tetrahydrophthalimidomethyl)-5'-methylphenyl)-benzotriazole, 2,2-methylene bis(4-(1,1,3,3,-tetramethylbutyl)-6-(2H-benzotriazole-2-yl)-phenol), 2-(2'-hydroxy-3'-tert-butyl-5'-methylphenyl)-5-chlorobenzotriazole, 2-(2'-hydroxy-3'-tert-butyl-5'-(2-octyloxycarbonylethyl)-phenyl)-5-chlorobenzotriazole, 2-(2'-hydroxy-3'-(1-methyl-1-phenylethyl)-5'-(1,1,3,3-tetramethylbutyl)-phenyl)benzotriazole, 2-(2H-benzotriazole-2-yl)-6-(straight-chained or branched dodecyl)-4-methylphenol, a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate, and so on, but are not limited thereto.

As commercially available ultraviolet absorbents, there are mentioned TINUVIN 326, TINUVIN 109, TINUVIN 171, TINUVIN 900, TINUVIN 928 and TINUVIN 360 (each being manufactured by Chiba Specialty Chemical Co., Ltd.), LA-31 (manufactured by ADEKA Co., Ltd.), Sumisorb (manufactured by Sumitomo Chemical Co., Ltd.), and RUVA-100 (manufactured by Otsuka Chemical Co., Ltd.).

Examples of the benzophenone compounds include 2,4-dihydroxybenzophenone, 2,2'-dihydroxy-4-methoxy benzophenone, 2-hydroxy-4-methoxy-5-sulfobenzophenone, and bis(2-methoxy-4-hydroxy-5-benzoylphenyl methane), but are not limited thereto.

In the invention, the ultraviolet absorbent is preferably a benzotriazole compound.

In the invention, the ultraviolet absorbent is added in an amount of preferably from 0.1 to 10% by weight, more preferably from 0.2 to 5% by weight, and still more preferably from 0.5 to 3% by weight, based on the weight of cellulose ester in the invention. Two or more kinds of the ultraviolet absorbents may be used in combination.

A structure of the benzotriazole or triazine may constitute a part of a polymer, may be included in a polymer as a part of regularly distributed pendants in the polymer, or may be incorporated into a part of the molecular structure of additives such as a plasticizer, an antioxidant, and an acid scavenger.

A conventional ultraviolet absorbing polymer is not specifically limited, but there is, for example, a homopolymer obtained by polymerization of RUVA-93 (produced by Otsuka Chemical Co., Ltd.) and a copolymer obtained by copolymerization of RUVA-93 and another monomer. Typical examples of the ultraviolet absorbing polymer include PUVA-30M obtained by copolymerization of RUVA 93 and methyl methacrylate (3:7 by weight ratio), PUVA-50M obtained by copolymerization of RUVA 93 and methyl methacrylate (5:5 by weight ratio), and polymers disclosed in Japanese Patent O.P.I. Publication No. 2003-113317.

<<Other Additives>>

In the invention, the cellulose can contain various other additives besides the additives described above. Examples of other additives include a matting agent, fillers, inorganic compounds such as silica or silicates, dyes, pigments, dichroic colorants, retardation controlling agents, refractive index adjusting agents, gas permeation resistant agents, anti-fungus agents, and biodegradability providing agents. Any additives, which do not fall outside the above classification, can be used as long as they have the function described above.

As a method for incorporating these additives in the cellulose, there is a method comprising the steps of mixing cellulose ester with the additives in the form of solid or liquid, heat-melting and kneading the mixture to obtain a uniform melt, and casting the melt on a support to obtain a film or a method comprising the steps of dissolving cellulose ester and the additives in a solvent to obtain a solution, removing the solvent from the solution to obtain a mixture of the cellulose ester and the additives, heat-melting the mixture to obtain a melt, and casting the melt on a support to obtain a film.

<<Matting Agent>>

A matting agent can be added to the film of the invention in order to impart lubricity, and optical and mechanical functions. As the matting agents, there are mentioned fine particles of an inorganic or organic compound.

The matting agent is preferably in the form of sphere, rod, needle, layer or plate. The matting agents include inorganic fine particles of metal oxides, phosphates, silicates or carbonates such as silicon dioxide, titanium dioxide, aluminum oxide, zirconium oxide, calcium carbonate, kaolin, talc, burned calcium silicate, hydrated calcium silicate, aluminum silicate, magnesium silicate and calcium phosphate; and fine particles of cross-linked polymers. Of these, silicon dioxide is preferred in view of reducing haze of a film. These particles are preferably surface treated with an organic substance whereby film haze can be reduced.

The surface treatment is preferably conducted using halosilanes, alkoxysilanes, silazanes or siloxanes. Particles having a larger average particle diameter have high lubricity effect, while particles having a smaller average particle diameter have excellent transparency. The primary particles of the particles have an average particle diameter of 0.01 to 1.0 μm. The primary particles have an average particle diameter of preferably from 5 to 50 nm, and more preferably from 7 to 14 nm. These fine particles are preferably used because they produce concavo-convexes of from 0.01 to 1.0 μm in the plane of cellulose ester film.

Examples of the silicon dioxide particles include Aerosil 200, 200V, 300, R972, R972V, R974, R202, R812, OX50, TT600 and NAX50, each manufactured by Nippon Aerosil Co., Ltd.; and KE-P10, KE-P30, KE-P100, and KE-P150 each manufactured by Nippon Shokubai Co., Ltd. Of these, Aerosil 200V, R972V, NAX50, KE-P30 and KE-P100 are preferred. Two or more of these matting agents may be used in combination.

In the case where 2 or more matting agents are used, they may be mixed in any proportion. Particles, which are different in an average particle diameter or material, for example, Aerosil 200V and Aerosil R972 are used in an amount ratio by weight of from 0.1:99.9 to 99.9:0.1.

A method for adding these matting agents is preferably one carried out by kneading. Alternatively, another method is one which adds a matting agent during the manufacture of a melt of cellulose ester using a solid which is prepared by adding cellulose ester and/or a plasticizer and/or an anti-oxidant and/or a UV absorbent to a solvent in which a matting agent has been previously dispersed, and dispersing them in the solvent, followed by evaporating the solvent or by precipitation. The latter method is preferred since the matting agent can be uniformly dispersed in the cellulose ester.

The above matting agent can be added in order to improve a mechanical property, an electric property or an optical property of film.

When the matting agent is added in a film in a larger amount, a lubricant property of the film is improved, however, haze of the film increases. Accordingly, the matting agent content of the film is preferably from 0.001 to 5 weight %, more preferably from 0.005 to 1 weight %, and still more preferably from 0.01 to 0.5 weight %.

The haze value of the film in the invention is preferably less than 1.0%, and more preferably less than 0.5%, since the haze of 1% or more affects an optical property of the film. The haze value is determined according to JIS K 7136.

<<Pellets>>

Pellet-like molds (hereinafter referred to simply as pellets) can be obtained by kneading a mixture of additives and cellulose ester sufficiently dried (for example, dried at 80 to 150° C. for 1 to 24 hours preferably under reduced pressure), melting the kneaded mixture preferably at a glass transition temperature to (a melting point+50° C.), extruding the melted mixture from a porous die of a uniaxial or biaxial extruder, introducing the extruded materials into water to obtain a strand-like solid, cutting the solid into required size and drying.

The die temperature is preferably from 150 to 250° C., more preferably from 180 to 240° C., and still more preferably from 200 to 230° C., although it is different due to kinds of cellulose ester. The screw rotation speed is preferably from 100 to 800 rpm, more preferably from 150 to 600 rpm, and still more preferably from 200 to 400 rpm. The dwell time is preferably from 5 seconds to 3 minutes, more preferably from 10 seconds to 2 minutes, and still more preferably from 20 seconds to 90 seconds. Preparation of the pellets is carried out preferably under an inactive gas atmosphere in order to minimize deterioration of cellulose ester. The inactive gas is preferably a nitrogen gas. It is preferred that the pellets are prepared while evacuating the air through a ventilation provided on the outlet side of a biaxial extruder.

The temperature of water into which melted materials are introduced for solidifying is preferably from 5 to 90° C., more preferably from 10 to 80° C., and still more preferably from 20 to 40° C. Drying is generally carried out after water adhered to the solidified materials produced in water is blown away.

The thus obtained pellets have a cross-section area (a cut surface area) of preferably from 1 to 100 mm$^2$, and more preferably 5 to 50 mm$^2$. The pellets have a length (in the direction normal to the cut surface) of preferably from 1 to 30 mm, and more preferably 2 to 10 mm. The shape of the cut surface may be circular, ellipsoidal or polygonal, but is preferably circular or ellipsoidal.

In order to improve kneading properties of a mixture of cellulose ester and various additives, it is preferred that the die temperature is higher, the screw rotation speed is higher, and the dwell time is longer. There is a trade-off between the above preferences and cellulose ester performance. Even if the palletizing is carried out under an inactive gas atmosphere, performance deterioration of the cellulose ester can be reduced but cannot be completely prevented. Accordingly, further advanced deterioration preventing techniques are required.

<<Cellulose Ester Film>>

The cellulose ester film of the invention has a thickness of preferably from 10 to 500 μm. The thickness of the cellulose ester film of the invention is preferably not less than 20 μm, and more preferably not less than 25 μm. The thickness of the cellulose ester film of the invention is preferably not more than 150 μm, and more preferably not more than 120 μm. The thickness of the cellulose ester film of the invention is especially preferably from 25 to 90 μm. Haze of the cellulose ester film of the invention is preferably less than 1%, and more preferably less than 0.5%.

<<Manufacturing Process of Cellulose Ester>>

The cellulose ester film of the invention is preferably manufactured according to a melt cast method. The melt cast method refers to a method which comprises the steps of heat-melting cellulose ester without using a solvent at temperature exhibiting its fluidity to obtain a fluid cellulose ester and then casting the fluid cellulose ester on a support. In the melt cast method cellulose ester used is preferably one in the form of pellets rather than in the form of powder. The pellets can be prepared according to the method described above.

Methods for the heat-melting can be classified into a melt extrusion molding method, a press molding method, an inflation method, an ejection molding method, a blow molding method, and an stretch molding method. Of these, the melt extrusion method is excellent in obtaining a cellulose ester film with excellent mechanical strength and excellent surface accuracy. As the manufacturing process of the cellulose ester film of the invention, there is, for example, a method which comprises the steps of heat-melting a cellulose ester composition constituting the cellulose ester film at temperature exhibiting its fluidity to melt and then extruding and casting the melted composition on a support such as a drum or an endless belt to form a web.

The cellulose ester composition in the invention, being subjected to melt extrusion, is extruded as a film from a T-type die to be in contact with a cooling drum using an electrostatic discharge method, and cooled to obtain an unstretched film. The temperature of the cooling drum is preferably maintained at 90 to 150° C.

The melt extrusion may be performed using a uniaxial extruder, a biaxial extruder, or using a biaxial extruder which has a uniaxial extruder connected downstream thereof, but it is preferable that the uniaxial extruder is used in view of the mechanical strength and optical properties of the resulting film. Also, it is preferable that the usual ambient air supplied to the raw material tank, the raw material charge section and the extruder interior and during the melting process is replaced by an inactive gas such as nitrogen, or that the pressure of the ambient air is reduced.

The temperature during melt extrusion is ordinarily in the range of 150 to 300° C., preferably 180 to 270° C., and still more preferably 200 to 250° C.

The cellulose ester film of the invention is preferably stretched in the transverse direction or in the mechanical direction.

The film is preferably peeled from the cooling drum and the resulting unstretched film is heated in the range from the glass transition temperature (Tg) of the cellulose ester to Tg+100° C. via a heating device, such as a plurality of heated rollers and/or infrared ray heaters, and stretched in one step or multiple-steps in the mechanical direction, and cooled. Next, the resulting cellulose ester film, which has been stretched in the mechanical direction as described above, is preferably also stretched in the transverse direction in the range of Tg to Tg−20° C., after which heat-fixing is preferably conducted.

During transverse stretching, when the stretching is done while sequentially heating the film in two or more stretching zones which have a temperature difference of 1-50° C., distribution of physical properties in the transverse direction of the film is reduced, which is favorable. Also, when the film after transverse stretching is maintained for 0.01 to 5 minutes between the final transverse stretching temperature and Tg−40° C., the distribution of physical properties in the transverse direction of the film is further reduced, which is advantageous.

Heat-fixing is normally done within a range higher than the final lateral stretching temperature but not greater than Tg−20° C. for a period of 0.5-300 seconds. At that time, it is preferable that heat-fixing is done while sequentially elevating temperature in two or more stretching zones which have a temperature difference in the range of 1 to 100° C.

The film subjected to heat-fixing is usually cooled to a temperature not more than Tg, and the clip holding portion of both ends of the film is cut off and the film is wound up. At that time, it is preferred that a 0.1 to 10% relaxing process is performed in the transverse and/or mechanical direction at a temperature range between the final heat-fixing temperature and Tg−20 (° C.). Also, gradual cooling is preferably conducted in such a manner that cooling from the final heat-fixing temperature to the Tg is achieved at a cooling rate not greater than 100° C. per second. The means for the slow cooling or relaxing process is not particularly limited and can be performed by common known means, but it is particularly preferable to perform these processes while sequentially cooling in a plurality of temperature zones in view of improving dimensional stability of the film. It is to be noted that, given that the final fixing temperature is T1 and the time for the film to reach Tg from the final heat-fixing temperature is "t", the cooling rate is determined by (T1−Tg)/t.

The optimal conditions for heat-fixing, cooling, and slow cooling processes differ depending on cellulose ester constituting the film, and thus are determined by measuring the physical properties of the biaxially stretched film, and suitably adjusting the conditions to obtain favorable properties.

<<Recycled Material>>

A recycled material in the invention refers to one reused for any reason as a raw material for a thermoplastic resin film, including film side edge portions (referred to also as edges), which are slit in the film manufacturing process as described later; the entire width portions of the leading and tailing edges of the film in the film manufacturing process; or a film which has problems in appearance such as defects or streaks and is impracticable.

The cellulose ester film is transported and stretched, both edges of the cellulose ester film being held by tenter clips. The both edges being slit off, the stretched film is wound around a core. The slit edges of the film (as recycled material) are preferably reused as raw materials. The content of the recycled material contained in the melted mixture is preferably from 10 to 90% by weight, preferably from 20 to 80% by weight, and more preferably from 30 to 70% by weight. It is preferred that the slit film edges are cut into pieces with a size of from 1 to 30 mm, and used in the preparation of the melted mixture. The cut pieces are reused as a part of raw materials optionally after re-drying. The cut pieces may be further pelletized and used in the melted mixture.

(Functional Layers)

In the invention, functional layers such as an antistatic layer, a hard coat layer, an anti-reflection layer, a matting facilitating layer, a contact facilitating layer, an anti-glare layer, a barrier layer, an optical compensation layer, or the like may be provided on the cellulose ester film prior to and/or after stretching. It is preferred that at least one layer selected from the anti-static layer, the hard coat layer, the anti-reflection layer, the contact facilitating layer, the anti-glare layer and the optical compensation layer is provided. At that time, various surface treatments such corona discharge treatment, plasma treatment, chemical treatment and the like may also be carried out, as appropriate.

A composition containing cellulose resins, and additives such as the plasticizer, ultraviolet absorbents described above having a different concentration may be co-extruded to prepare a layered structure cellulose ester film. For example, a cellulose ester film can be made so as to have the structure of a skin layer/a core layer/a skin layer. A matting agent may be contained in a larger amount in the skin layers or alternatively, may be only in the skin layers. The plasticizer and the ultraviolet light absorber may be contained in a larger amount in the core layer than in the skin layers, or may be only in the core layer. The types of plasticizers and ultraviolet absorbents in the core layer and the skin may be changed and a low volatile plasticizer and/or an ultraviolet absorbent may be added to the skin layer, while a plasticizer with excellent plasticity or an ultraviolet absorbent with excellent ultraviolet absorption may be added to the core layer. Tg of the skin layer and the core layer may be different, and it is preferred that the Tg of the core layer is lower than that of a skin layer. Further, the viscosity of melt including the cellulose ester during melt casting may differ between the skin layer and the core layer, and the viscosity of the skin layer may be greater than the core layer, or the viscosity of the core layer may be greater than or equal to the skin layer.

<<Polarizing Plate>>

The cellulose ester film of the invention can be used as a polarizing plate protective film. When the cellulose ester film of the invention is used as a polarizing plate protective film, a preparing method of the polarizing plate is not specifically limited and can be carried out employing a conventional method. As the lamination method, there is a method in which the polarizing plate protecting film is alkali treated, and is laminated on at least one surface of a polarized film having a first surface and a second surface which is obtained by immersing a polyvinyl alcohol film in an iodine solution and stretching. A method is also preferred in which the polarizing plate protecting film is laminated on each surface of the polarized film.

Lamination processing disclosed in Japanese Patent O.P.I. Publication Nos. 6-94915 and 6-118232 can be applied instead of the alkali treatment to manufacture a polarizing plate.

The polarizing plate is comprised of a polarized film and a polarizing plate protecting film provided on both surfaces of the polarizing plate. The polarizing plate may have further a protect film on one surface, and a separate film on the other surface. The protect film or separate film is provided in order to protect the surface of the polarizing plate at shipment or transportation. The protect film is provided on the surface of the polarizing plate opposite the polarizing plate surface to be adhered to a liquid crystal cell. The separate film is used in order to cover an adhesive layer through which the polarizing plate is adhered to the liquid crystal cell, and provided on the polarizing plate surface to which the liquid crystal cell is adhered.

<<Dimensional Stability>>

In the cellulose ester film of the invention, variation of the film dimension is preferably within the range of ±1.0%, more preferably within the range of ±0.5%, and still more preferably within the range of ±0.1%, after the film has been allowed to stand at 80° C. and at 90% RH for 24 hours, based on the film dimension after the film has been allowed to stand at 23° C. and at 55% RH for 24 hours.

The cellulose ester film of the invention is used for a polarizing plate protecting film. The cellulose ester film falling outside the range as described above may result in less improvement of display quality or deterioration of display quality, since absolute value of birefringence and oriented angle of the polarizing plate are away from intended ones.

<<Stretching and Refractive Index Control>>

Refractive index of the cellulose ester film of the invention can be controlled by stretching. When the stretching is performed by a factor of 1.0 to 2.0 in one direction of the cellulose ester film and by a factor of 1.01 to 2.5 in the direction in plane of the film perpendicular to that direction, the refractive index can be controlled within a desirable range.

For example, the film can be successively or simultaneously stretched in the mechanical direction and in the direction (transverse direction) in plane normal to the mechanical direction. In this case, too small stretching magnification in at least one direction provides insufficient optical retardation, while too much stretching magnification results in rupture of the film.

For example, when film is stretched in the casting direction, too much contraction in the transverse direction of the film provides too large refractive index in the thickness direction of the film. In this case, improvement can be carried out by restraining the contraction in the transverse direction of the film or by stretching the film in the transverse direction. When the film is stretched in the transverse direction, diversion of refractive index may be produced in the transverse direction. This phenomenon is sometimes found in a tenter method, and is considered to be due to so-called bowing phenomenon, which is caused by the fact that the film center shrinks and the film edges are fixed. In this case also, the bowing phenomenon is restrained by stretching the film in the casting direction, whereby diversion of refractive index in the transverse direction is minimized and improved.

Further, stretching in the two directions crossing at right angles each other can minimize variation of film thickness. Too much variation of film thickness causes unevenness of the optical retardation, resulting in color unevenness of images of a liquid crystal display.

Variation of thickness of cellulose ester film is preferably in the range within preferably ±3%, and more preferably ±1%. In order to meet the requirements described above, stretching in the two directions crossing at right angles each other is effective, wherein finally, the film is stretched in the casting direction by a magnification of preferably from 1.0 to 2.0, and more preferably from 1.01 to 1.5, and in the transverse direction by a magnification of preferably from 1.01 to 2.5, and more preferably from 1.2 to 2.0.

When cellulose ester providing a positive birefringence to stress is employed, stretching in the transverse direction can give the delayed phase axis to the transverse direction of cellulose ester film. In order to improve display quality, the delayed phase axis is preferably in accordance with the transverse direction of film, and it is necessary to meet the relationship (stretching magnification in the transverse direction) >(stretching magnification in the casting direction).

The variation of retardation in plane $R_o$ of an optical film is preferably less than 5%, more preferably not more than 2%, and still more preferably less than 1.5%. The variation of retardation $R_t$ in the thickness direction of an optical film is preferably less than 5%, more preferably not more than 2%, and still more preferably less than 1.5%.

In the phase difference film, variation of retardation is preferably less. When a polarizing plate comprising the phase difference film is used in a liquid crystal display, the phase difference film having less variation of retardation is preferred in minimizing color unevenness.

The retardations Ro and Rt are given by the formulas:

$$Ro = (nx - ny) \times d \qquad \text{Formula (i)}$$

$$Rt = ((nx + ny)/2 - nz) \times d \qquad \text{Formula (ii)}$$

In the formulas, nx is refractive index in the retarded phase axis direction, ny is refractive index in the advanced phase axis direction, nz is refractive index in the thickness direction, measured at 23° C. and 55% RH employing light with t a wavelength of 590 nm, and d is film thickness (nm).

Measurement of the refractive indices, thickness and retardations of the optical film can be made by means of an Abbe diffraction meter (4T), a micrometer on a market and an automatic birefringence meter KOBRA-21ADH (marketed by Oji Scientific Instruments), respectively.

In order to adjust retardation of a phase difference film to improve a displaying quality of a VA mode or TN mode liquid crystal cell, so that the phase difference film is employed in a MVA mode which is divided into multi-domains as the VA mode, it is required that $R_0$ is in the range of from more than 30 to 95 nm, and $R_t$ is in the range of from more than 70 nm to 400 nm.

The web stretching method is not specifically limited. As the stretching method, there are a method stretching film in the mechanical direction employing plural rollers having a different circumferential speed, a method stretching film in the mechanical direction by pulling clips or pins fixing the film edges in the mechanical direction, a method stretching film in the transverse direction by pulling clips or pins fixing the film edges in the transverse direction, and a method stretching film in the transverse direction and at the same time shrinking the film in the mechanical direction by pulling simultaneously clips or pins fixing the film edges in the mechanical and transverse directions. These methods may be used in combination. In a tenter method, when the clips are driven by a linear drive method, smooth stretching of film can be conducted, overcoming problems such as rupture of film.

In the film manufacture, holding of the film width or stretching in the transverse direction may be carried out employing a tenter, and the tenter may be a pin tenter or a clip tenter.

When the cellulose ester film of the invention is used as a polarizing plate protecting film, the thickness of the polarizing plate protecting film is preferably from 10 to 500 μm, more preferably from 20 to 150 μm, still more preferably from 25 to 120 μm, and most preferably from 25 to 90 μm. The above range of the thickness is preferred in weight reduction of a liquid crystal display, development of birefringence, and moisture resistance.

When a delayed or advanced phase axis of cellulose ester film is present in a plane of the film and the angle between the delayed or advanced phase axis and the mechanical direction of the film is defined as θ1, θ1 is preferably from −1 to +1°, and more preferably from −0.5 to +0.50. This θ1 can be defined as an orientation angle, and determined employing an automatic birefringence meter KOBRA-21ADH (produced by Oji Keisoku Kiki Co., Ltd.).

The above range of θ1 provides high luminance, minimized light leakage, and high color reproduction of displayed images in a color liquid crystal display.

<<Liquid Crystal Display>>

A liquid crystal display usually comprises two polarizing plates and provided therebetween, a liquid crystal cell. When the cellulose ester film of the invention is used as a polarizing plate protective film, the polarizing plate protective film provides excellent display properties regardless of where it is disposed. For example, it is preferred that the polarizing plate of the invention is provided at least one surface of a liquid crystal cell having a first surface and a second surface. It is especially preferred that the polarizing plate protective film is provided on the outermost surface of the display side of the liquid crystal display. When a polarizing plate protective film with an optical compensation film or a polarizing plate protective film manufactured employing stretching treatment to have a suitable optical compensation function is provided so as to contact a liquid crystal cell, excellent displaying property is obtained.

The cellulose ester film of the invention can provide an optical film such a polarizing plate protective film, an antireflection film or a phase difference film with high quality, and further a liquid crystal display with high display quality.

An optical film in which the cellulose ester film of the invention is used refers to a functional film preferably used in various displays such as a liquid crystal display, a plasma display and an organic EL display, and particularly in a liquid crystal display. The optical film includes a polarizing plate protective film, a phase difference film, an anti-reflection film, a luminance increasing film or an optical compensation film increasing viewing angle.

EXAMPLES

Next, the present invention will be explained employing examples, but is not specifically limited thereto. In the examples, the added amount represents "% by weight", based on cellulose ester.

[Preparation of Cellulose Ester Pellets]

A cellulose ester described later was dried at 130° C. for 4 hours under reduced pressure. The resulting cellulose ester was mixed with a plasticizer as shown in Tables 1, 2 and 3 (the addition amount based on the cellulose ester being shown in terms of % by weight in Tables 1, 2 and 3), at least one of combinations A, B and C in the invention (the addition amount based on the cellulose ester being shown in terms of % by weight in Tables 1, 2 and 3), 0.50% by weight of IRGANOX 1010 (produced by Ciba Specialty Chemicals Co., Ltd.), 1.5% by weight of TINUBIN 928 (produced by Ciba Specialty Chemicals Co., Ltd.), 0.2% by weight of Aerosil NAX50 (produced by Nippon Aerosil Co., Ltd.) as silica particles, and 0.02% by weight of KE-P100 (produced by Nippon Shokubai Co., Ltd.).

The resulting mixture was placed in a 60° C. hopper, extruded from a die at a die temperature of 230° C., at a screw rotation speed of 350 rpm, at a kneading time of 40 seconds and at an extrusion amount of 200 kg/hr, employing a biaxial kneading extruder with a vacuum exhaustion device, and introduced into 25° C. water to be solidified. The resulting solid was cut to obtain cylindrical pellets with a diameter of 2 mm and a length of 3 mm, and the pellets were dried employing 65° C. hot air.

(Evaluation of Processing Stability)

Melt index (MI) is defined as a value represented by an amount (in terms of g) of a melted organic polymer material extruded during 10 minutes from a circular die with a specific length and inner diameter at a specific pressure, and used as a measure of melt viscosity. In cellulose ester, the larger the value is, the higher the processing stability, and the smaller the value is, the lower the processing stability. Melt index (MI) of the pellets prepared above was measured according to JIS-K7210 at a temperature of 230° C. and at a load of 21.2N.

(Evaluation of Coloring)

In the pellets obtained above, yellow index (YI) and b value, each representing a degree of coloring, were measured according to the following. The results are shown in Tables 1, 2 and 3. When the values are nearer to zero, the coloring is minimized. The b value is more sensitive to coloring than yellow index.

(YI)

YI values of twenty pieces of each pellet sample were measured according to the following method, and the maximum value thereof was defined as YI value.

YI (yellowness) can be determined according to a method described in JIS K7105-6.3. YI in the invention can be determined from the following formula and tristimulus values X, Y, and Z measured through a spectrophotometer U-3310 (manufactured by Hitachi Seisakusho Co., Ltd.) and chroma calculation program attached thereto.

$$YI=100(1.28X-1.06Z)/Y$$

(b Value)

b values of twenty pieces of each pellet sample were determined according to the following method, and the maximum value of absolute values thereof was defined as b value.

The b value was measured through a color analyzer TC-1800MK TYPE II (produced by Tokyo Denshoku Co., Ltd.) according to a method prescribed in JIS-Z-8722.

Materials used will be shown below.

(Cellulose Ester)

C-1: Cellulose acetate propionate (with a degree of substitution of an acetyl group of 1.31, a degree of substitution of a propionyl group of 1.23, molecular weight Mn=66,000, and Mw/Mn of 3.0)

C-2: Cellulose acetate propionate (with a degree of substitution of an acetyl group of 1.38, a degree of substitution of a propionyl group of 1.30, molecular weight Mn=86,000, and Mw/Mn of 2.5)

C-3: Cellulose acetate propionate (with a degree of substitution of an acetyl group of 1.67, a degree of substitution of a propionyl group of 0.93, molecular weight Mn=73,000, and Mw/Mn of 2.9)

C-4: Cellulose acetate propionate (with a degree of substitution of an acetyl group of 1.95, a degree of substitution of a propionyl group of 0.73, molecular weight Mn=91,000, and Mw/Mn of 2.4)

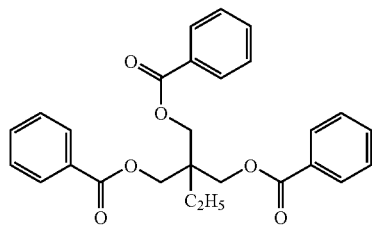

Plasticizer-A

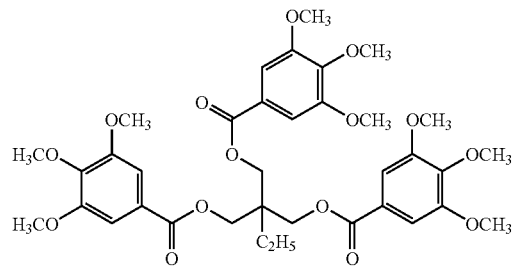

Plasticizer-B

-continued

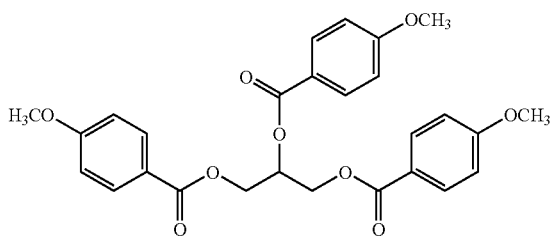

Plasticizer-D

Benzoic acid sucrose ester (a mixture containing as a main component the following compound prepared by reacting benzoic acid with sucrose)

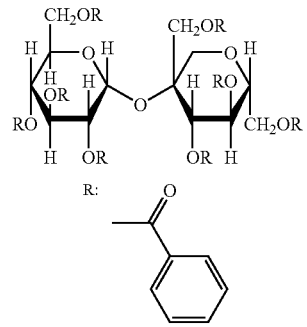

Plasticizer-E

Methyl methacrylate-methyl acrylate-2-hydroxyethyl methacrylate copolymer (with a monomer composition ratio and a weight average molecular weight as shown below)

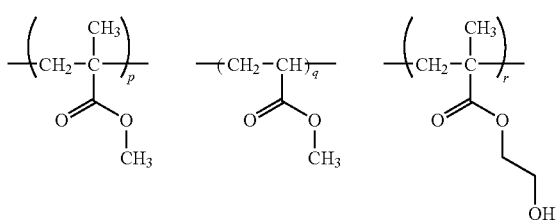

p/q/r = 80/10/10
Weight average molecular weight: 8,000

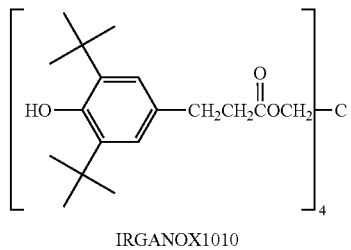

IRGANOX1010

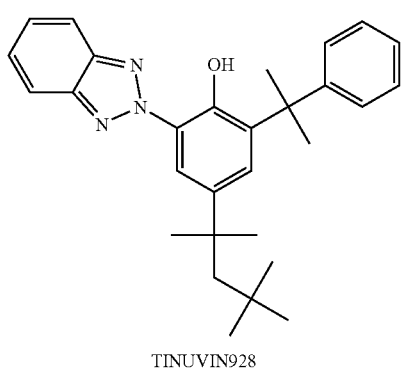

TINUVIN928

Comparative compound-1

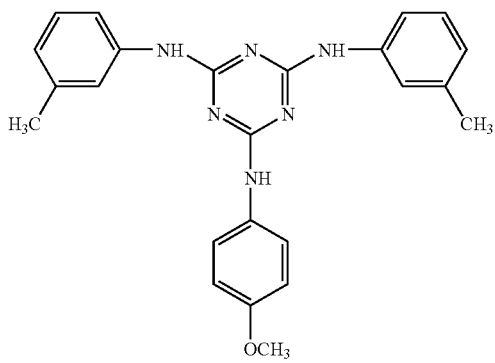

Compartive compound-2

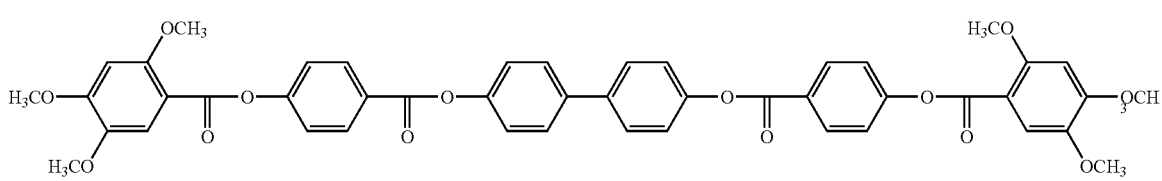

TABLE 1

| Pellet sample No. | Cellulose ester | Plasticizer 1 (wt %) | Plasticizer 2 (wt %) | C1 | Additive 1 Exemplified compound Compound 1 (wt %) | Compound 2 (wt %) | C2 | Additive 2 Exemplified compound Compound 3 (wt %) | Compound 4 (wt %) | Remarks |
|---|---|---|---|---|---|---|---|---|---|---|
| 1-1 | C-1 | P-A (8.0) | None | A | 1-1 (0.30) | 2-1 (0.10) | None | — | — | Inv. |
| 1-2 | C-1 | P-A (8.0) | None | A | 1-3 (0.80) | 2-3 (0.10) | None | — | — | Inv. |
| 1-3 | C-1 | P-A (8.0) | None | A | 1-13 (0.25) | 2-13 (0.05) | None | — | — | Inv. |
| 1-4 | C-1 | P-A (8.0) | None | B | 3-1 (0.30) | 4-1 (0.15) | None | — | — | Inv. |
| 1-5 | C-1 | P-A (8.0) | None | B | 3-2 (0.30) | 4-2 (0.30) | None | — | — | Inv. |
| 1-6 | C-1 | P-A (8.0) | None | B | 3-1 (0.01) | 4-1 (0.005) | None | — | — | Inv. |
| 1-7 | C-1 | P-A (8.0) | None | C | 5-1 (0.30) | 6-1 (0.10) | None | — | — | Inv. |
| 1-8 | C-1 | P-A (8.0) | None | C | 5-2 (0.50) | 6-2 (0.25) | None | — | — | Inv. |
| 1-9 | C-1 | P-A (8.0) | None | C | 5-6 (0.001) | 6-6 (0.001) | None | — | — | Inv. |
| 1-10 | C-1 | P-A (8.0) | None | A | 1-12 (0.15) | 2-12 (0.15) | B | 3-1 (0.25) | 4-1 (0.05) | Inv. |
| 1-11 | C-1 | P-A (8.0) | None | A | 1-15 (0.30) | 2-15 (0.20) | B | 3-1 (0.10) | 4-1 (0.02) | Inv. |
| 1-12 | C-1 | P-A (8.0) | None | A | 1-5 (0.10) | 2-5 (0.90) | C | 5-1 (0.25) | 6-1 (0.05) | Inv. |
| 1-13 | C-1 | P-A (8.0) | None | A | 1-12 (0.10) | 2-12 (0.01) | C | 5-1 (0.10) | 6-1 (0.02) | Inv. |

| Pellet sample No. | Properties of Pellets MI | YI | b Value | Remarks |
|---|---|---|---|---|
| 1-1 | 3.5 | 0.2 | 0.2 | Inventive |
| 1-2 | 3.4 | 0.3 | 0.4 | Inventive |
| 1-3 | 3.5 | 0.2 | 0.2 | Inventive |
| 1-4 | 3.4 | 0.3 | 0.5 | Inventive |
| 1-5 | 3.3 | 0.3 | 0.5 | Inventive |
| 1-6 | 3.4 | 0.3 | 0.5 | Inventive |
| 1-7 | 3.3 | 0.3 | 0.5 | Inventive |
| 1-8 | 3.2 | 0.3 | 0.5 | Inventive |
| 1-9 | 3.3 | 0.3 | 0.5 | Inventive |
| 1-10 | 4.0 | 0.1 | 0.1 | Inventive |
| 1-11 | 3.8 | 0.1 | 0.1 | Inventive |
| 1-12 | 3.6 | 0.1 | 0.1 | Inventive |
| 1-13 | 4.1 | 0.1 | 0.1 | Inventive |

Inv.: Inventive,
C1: Combination 1,
C2: Combination 2,
P-A: Plasticizer-A

TABLE 2

| Pellet sample No. | Cellulose ester | Plasticizer 1 (wt %) | Plasticizer 2 (wt %) | C1 | Additive 1 Exemplified compound Compound 1 (wt %) | Compound 2 (wt %) | C2 | Additive 2 Exemplified compound Compound 3 (wt %) | Compound 4 (wt %) | Remarks |
|---|---|---|---|---|---|---|---|---|---|---|
| 1-14 | C-1 | P-B (12) | None | A | 1-12 (0.30) | 2-12 (0.05) | B | 3-1 (0.10) | 4-1 (0.10) | Inv. |
| 1-15 | C-1 | P-C (12) | None | A | 1-13 (0.01) | 2-13 (0.01) | C | 5-6 (0.80) | 6-6 (0.10) | Inv. |
| 1-16 | C-1 | P-B (8.0) | P-D (4.0) | A | 1-12 (0.10) | 2-12 (0.05) | C | 5-1 (0.30) | 6-1 (0.30) | Inv. |
| 1-17 | C-1 | P-D (4.0) | P-E (8.0) | A | 1-13 (0.08) | 2-13 (0.02) | B | 3-2 (0.50) | 4-2 (0.20) | Inv. |
| 1-18 | C-2 | P-A (8.0) | None | A | 1-12 (0.40) | 2-12 (0.15) | None | — | — | Inv. |

TABLE 2-continued

| | | | | | | | | | | |
|---|---|---|---|---|---|---|---|---|---|---|
| 1-19 | C-3 | P-A (8.0) | None | A | 1-12 (0.95) | 2-12 (0.05) | None | — | — | Inv. |
| 1-20 | C-4 | P-A (8.0) | None | A | 1-13 (0.50) | 2-13 (0.25) | None | — | — | Inv. |
| 1-21 | C-1 | P-A (8.0) | None | A | 1-1 (0.90) | 2-1 (0.20) | None | — | — | Comp. |
| 1-22 | C-1 | P-A (8.0) | None | A | 1-1 (0.0004) | 2-1 (0.0002) | None | — | — | Comp. |
| 1-23 | C-1 | P-A (8.0) | None | B | 3-1 (0.90) | 4-1 (0.20) | None | — | — | Comp. |
| 1-24 | C-1 | P-A (8.0) | None | B | 3-1 (0.0004) | 4-1 (0.0002) | None | — | — | Comp. |
| 1-25 | C-1 | P-A (8.0) | None | C | 5-1 (0.90) | 6-1 (0.20) | None | — | — | Comp. |
| 1-26 | C-1 | P-A (8.0) | None | C | 5-1 (0.0004) | 6-1 (0.0002) | None | — | — | Comp. |

| Pellet sample No. | Properties of Pellets | | | Remarks |
|---|---|---|---|---|
| | MI | YI | b Value | |
| 1-14 | 4.1 | 0.1 | 0.1 | Inventive |
| 1-15 | 3.9 | 0.1 | 0.1 | Inventive |
| 1-16 | 4.3 | 0.1 | 0.1 | Inventive |
| 1-17 | 4.0 | 0.1 | 0.1 | Inventive |
| 1-18 | 3.4 | 0.2 | 0.3 | Inventive |
| 1-19 | 3.2 | 0.2 | 0.4 | Inventive |
| 1-20 | 3.2 | 0.2 | 0.4 | Inventive |
| 1-21 | 3.0 | 0.5 | 0.7 | Comparative |
| 1-22 | 2.0 | 0.8 | 1.0 | Comparative |
| 1-23 | 2.9 | 1.0 | 1.8 | Comparative |
| 1-24 | 2.6 | 1.7 | 1.4 | Comparative |
| 1-25 | 2.8 | 0.9 | 0.9 | Comparative |
| 1-26 | 2.4 | 1.0 | 1.1 | Comparative |

Inv.: Inventive,
Comp.: Comparative,
C1: Combination 1,
C2: Combination 2,
P-A: Plasticizer-A,
P-B: Plasticizer-B,
P-C: Plasticizer C,
P-D: Plasticizer-D,
P-E: Plasticizer-E

TABLE 3

| Pellet sample No. | Cellulose ester | Plasticizer 1 (wt %) | Plasticizer 2 (wt %) | Additive 1 | | | Additive 2 | | | Remarks |
|---|---|---|---|---|---|---|---|---|---|---|
| | | | | C1 | Exemplified compound | | C2 | Exemplified compound | | |
| | | | | | Compound 1 (wt %) | Compound 2 (wt %) | | Compound 3 (wt %) | Compound 4 (wt %) | |
| 1-27 | C-1 | P-A (8.0) | None | | 1-1 (0.30) | | None | — | — | Comp. |
| 1-28 | C-1 | P-A (8.0) | None | | 1-13 (0.30) | | None | — | — | Comp. |
| 1-29 | C-1 | P-A (8.0) | None | | 2-1 (0.30) | | None | — | — | Comp. |
| 1-30 | C-1 | P-A (8.0) | None | | 3-1 (0.30) | | None | | | Comp. |
| 1-31 | C-1 | P-A (8.0) | None | | 4-1 (0.30) | | None | — | — | Comp. |
| 1-32 | C-1 | P-A (8.0) | None | | 5-1 (0.30) | | None | — | — | Comp. |
| 1-33 | C-1 | P-A (8.0) | None | | 6-1 (0.30) | | None | — | — | Comp. |
| 1-34 | C-1 | P-A (8.0) | None | | Comparative Compound-1 (5.0) | | None | — | — | Comp. |
| 1-35 | C-1 | P-A (8.0) | None | | Comparative Compound-1 (0.5) | | None | — | — | Comp. |
| 1-36 | C-1 | P-A (8.0) | None | | Comparative Compound-2 (4.0) | | None | — | — | Comp. |
| 1-37 | C-1 | P-A (8.0) | None | | Comparative Compound-2 (0.4) | | None | — | — | Comp. |

TABLE 3-continued

| 1-38 | C-1 | P-A (8.0) | None | None | — | — | None | — | — | Comp. |

| Pellet sample No. | Properties of Pellets ||||
|---|---|---|---|---|
| | MI | YI | b Value | Remarks |
| 1-27 | 2.9 | 0.8 | 1.2 | Comparative |
| 1-28 | 3.0 | 0.5 | 0.7 | Comparative |
| 1-29 | 2.4 | 2.0 | 3.1 | Comparative |
| 1-30 | 2.5 | 1.5 | 2.2 | Comparative |
| 1-31 | 2.0 | 2.3 | 3.2 | Comparative |
| 1-32 | 3.1 | 1.0 | 1.5 | Comparative |
| 1-33 | 2.5 | 1.0 | 1.6 | Comparative |
| 1-34 | 0.8 | 12.0 | 17.4 | Comparative |
| 1-35 | 0.6 | 10.6 | 15.3 | Comparative |
| 1-36 | 1.2 | 9.8 | 14.2 | Comparative |
| 1-37 | 1.0 | 8.9 | 13.1 | Comparative |
| 1-38 | 0.5 | 8.5 | 12.0 | Comparative |

Comp.: Comparative,
C1: Combination 1,
C2: Combination 2,
P-A: Plasticizer-A

As is apparent from Tables 1, 2 and 3, it has proved that the inventive pellet samples provide excellent processing stability and anti-coloring property as compared with the comparative pellet samples. With respect to anti-coloring property, inventive pellet samples containing at least one combination selected from combinations A, B and C in the invention provide good values in the b value which is more sensitive than YI, as compared with comparative pellet samples containing a conventional anti-deterioration agent. Further, it has proved that the combined use of combinations A and B or of combinations A and C brings about preferred synergic effects, resulting in improvement of performance. In comparative pellet samples 1-34 through 1-38, occurrence of gel-like foreign matter was visually observed.

The weight average molecular weight (Mw)/number average molecular weight (Mn) ratio of the cellulose ester of each sample before and after processing stability evaluation above were determined according to gel permeation chromatography under the following conditions:
(Gel permeation chromatography measurement conditions)
Solvent: Tetrahydrofuran
Apparatus: HLC-8220 (produced by Toso Co., Ltd.)
Column: TSK gel Super HM-M (produced by Toso Co., Ltd.)
Column temperature: 40° C.
Sample concentration: 0.1% by weight
Injection amount: 10 μl
Flow rate: 0.6 ml/min
Calibration curve: One obtained employing 9 samples having a different molecular weight of standard polystyrene PS-1 (produced by Polymer Laboratories Corporation) Mw=2,560,000 to 580

Variation of Mn/Mw ratio before and after processing stability evaluation was in the range of from 0 to 5% in inventive pellet samples 1-1 through 1-20, in which the ratio was scarcely varied. However, variation of Mn/Mw ratio before and after processing stability evaluation was in the range of from 6 to 10% in comparative pellet samples 1-21 through 1-33, and in the range of from 11 to 30% in comparative pellet samples 1-34 through 1-38. Deterioration of the cellulose ester in all the comparative pellet samples was observed.

Example 2

(Preparation of Cellulose Ester Film Samples)
Cellulose ester film samples were prepared from the pellets prepared in Example 1 according to the following procedures.

The pellets prepared above were dried at 100° C. for 4 hours, heat-melted at 250° C. under nitrogen atmosphere, extruded from a T die, and then stretched at a stretching ratio of 1.2×1.2 at 160° C. Thus, cellulose ester film samples having a thickness of 80 Vm were obtained.
(Evaluation of Cellulose Ester Film Samples)
The resulting cellulose ester film samples were evaluated as follows. The results are shown in Table 4.
(Smoking)
Smoke generated from the outlet of a T die and the longitudinal polishing roll surface were visually observed, and evaluated according to the following criteria:
A: No smoking was observed.
B: A slight smoking was observed.
C: Marked smoking was observed.
D: Marked smoking was observed, and the longitudinal polishing roll surface became cloudy due to the smoking.
(Evaluation of Coloring)
YI of the film samples was determined in the same manner as in the pellets above and evaluated as a measure of coloring.
(Evaluation of Coefficient of Variation (CV) of Retardation)
Refractive index in three directions of the cellulose ester film samples prepared was measured at an interval of 1 cm in the transverse direction of the samples. The measurement was carried out at a wavelength 590 nm at 23° C. and 55% RH employing an automatic birefringence meter KOBRA-21ADH (produced by Oji Keisokuki Co., Ltd.). From the resulting measurements, birefringences were obtained employing the following formulae, and then coefficient of variation (CV) of retardation was determined.

$$\text{Birefringence in plane } R_0 = (nx - ny) \times d$$

$$\text{Birefringence in the thickness direction } Rt = \{(nx + ny)/2 - nz\} \times d$$

wherein d represents a thickness (nm) of the sample, nx represents a maximum refractive index in plane of the sample (a refractive index in the delayed phase axis direction in plane of the sample), ny represents a refractive index in the direction normal to the delayed phase axis direction in plane of the sample, and nz represents a refractive index in the thickness direction of the sample. Standard deviations of the birefringence in plane and the birefringence in the thickness direction were determined according to a (n−1) method. Subsequently, a coefficient of variation (CV) was determined from the following equation, and evaluated as a measure of variation of retardation. Herein, n was set as 130-140.

Coefficient of variation (CV)=Standard deviation/ Average of birefringence

A: CV is less than 1.5%.
B: CV is in the range of from 1.5% to less than 5%.
C: CV is in the range of from 5% to less than 10%.
D: CV is not less than 10%.
(Evaluation of Transparency)

Haze of the cellulose ester film samples was determined employing a haze meter 1001DP TYPE (produced by Nippon Denshoku Co., Ltd.). The haze was one of a sample with a thickness of 80 μm.
A: Haze is less than 0.5%.
B: Haze is in the range of from 0.5% to less than 1.0%.
C: Haze is in the range of from 1.0% to less than 1.5%.
D: Haze is in the range of from 1.5% to less than 2.0%.
E: Haze is not less than 2.0%.

use of combinations A and B or use of combinations A and C brings about preferred synergic effects, resulting in improvement of performance.

Film samples 1-1 through 1-21, 1-23 and 1-25 were evaluated for bleeding-out according to a method described later, and as a result, bleeding out was observed on the surface thereof. In contrast, the preferred results were obtained that no bleeding out was observed on the surface of any of the inventive film samples.

(Bleeding-out)

After the cellulose ester film samples were allowed to stand at a high temperature of 80° C. and at a high humidity of 90% for 1000 hours, the surface of the samples was visually observed for bleeding-out (crystal occurrence).

Example 3

[Preparation of Cellulose Ester Film Employing Recycled Material]

Cellulose ester film samples 1-1 through 1-38 prepared in Example 2 each were slit by 25% by weight at both edges

TABLE 4

| Film sample No. | Pellet sample No. | Smoking | YI | Coefficient of Variation (CV) of Retardation | Transparency | Remarks |
|---|---|---|---|---|---|---|
| 1-1 | 1-1 | A | 2.0 | A | A | Inv. |
| 1-2 | 1-2 | A | 2.1 | A | A | Inv. |
| 1-3 | 1-3 | A | 1.9 | A | A | Inv. |
| 1-4 | 1-4 | A | 2.4 | A | A | Inv. |
| 1-5 | 1-5 | A | 2.5 | A | A | Inv. |
| 1-6 | 1-6 | A | 2.4 | A | A | Inv. |
| 1-7 | 1-7 | A | 2.2 | A | A | Inv. |
| 1-8 | 1-8 | A | 2.3 | A | A | Inv. |
| 1-9 | 1-9 | A | 2.2 | A | A | Inv. |
| 1-10 | 1-10 | A | 1.6 | A | A | Inv. |
| 1-11 | 1-11 | A | 1.8 | A | A | Inv. |
| 1-12 | 1-12 | A | 1.8 | A | A | Inv. |
| 1-13 | 1-13 | A | 1.5 | A | A | Inv. |
| 1-14 | 1-14 | A | 1.6 | A | A | Inv. |
| 1-15 | 1-15 | A | 1.5 | A | A | Inv. |
| 1-16 | 1-16 | A | 1.5 | A | A | Inv. |
| 1-17 | 1-17 | A | 1.7 | A | A | Inv. |
| 1-18 | 1-18 | A | 2.0 | A | A | Inv. |
| 1-19 | 1-19 | A | 2.6 | A | A | Inv. |
| 1-20 | 1-20 | A | 2.6 | A | A | Inv. |
| 1-21 | 1-21 | B | 2.9 | C | C | Comp. |
| 1-22 | 1-22 | C | 3.0 | B | B | Comp. |
| 1-23 | 1-23 | C | 4.3 | C | C | Comp. |
| 1-24 | 1-24 | C | 4.5 | C | C | Comp. |
| 1-25 | 1-25 | B | 3.3 | B | C | Comp. |
| 1-26 | 1-26 | C | 3.6 | C | B | Comp. |
| 1-27 | 1-27 | B | 3.3 | B | B | Comp. |
| 1-28 | 1-28 | B | 3.0 | B | B | Comp. |
| 1-29 | 1-29 | B | 6.1 | C | C | Comp. |
| 1-30 | 1-30 | B | 4.6 | B | C | Comp. |
| 1-31 | 1-31 | B | 7.1 | C | C | Comp. |
| 1-32 | 1-32 | B | 3.9 | B | B | Comp. |
| 1-33 | 1-33 | B | 4.0 | B | B | Comp. |
| 1-34 | 1-34 | D | 8.5 | D | D | Comp. |
| 1-35 | 1-35 | D | 8.1 | D | D | Comp. |
| 1-36 | 1-36 | D | 7.3 | D | D | Comp. |
| 1-37 | 1-37 | D | 7.2 | D | D | Comp. |
| 1-38 | 1-38 | D | 11.0 | D | D | Comp. |

Inv.: Inventive,
Comp.: Comparative

As is apparent from Table 4, the inventive film samples do not produce smoke, and provide excellent processing stability, excellent anti-coloring property, less variation of retardation and high transparency, as compared with the comparative film samples. It has proved that the inventive samples have excellent optical properties. Particularly, it has proved that parallel to the mechanical direction to obtain recycled material Nos. 1-1 through 1-38, respectively. The resulting materials were cut into pieces with a size of from 5 to 10 mm. A mixture of the cut pieces and each of the cellulose ester pellet samples prepared in Example 1 (1:1 by weight mixture) as shown in Table 5 was heat-melted at 250° C. under nitrogen atmosphere, extruded from a T die, and then stretched at a stretching ratio of 1.2×1.2 at 160° C. to obtain a cellulose ester film sample having a thickness of 80 μm. The resulting film sample was evaluated in the same manner as in Example 2. The results are shown in Table 5.

TABLE 5

| Film sample No. | Pellet sample No. | Recycled material No. | Smoking | YI | Coefficient of variation (CV) of Retardation | Transparency | Remarks |
|---|---|---|---|---|---|---|---|
| 2-1 | 1-1 | 1-1 | A | 2.2 | A | A | Inv. |
| 2-2 | 1-2 | 1-2 | A | 2.4 | A | A | Inv. |
| 2-3 | 1-3 | 1-3 | A | 2.1 | A | A | Inv. |
| 2-4 | 1-4 | 1-4 | A | 2.7 | A | A | Inv. |
| 2-5 | 1-5 | 1-5 | A | 2.9 | A | A | Inv. |
| 2-6 | 1-6 | 1-6 | A | 2.7 | A | A | Inv. |
| 2-7 | 1-7 | 1-7 | A | 2.4 | A | A | Inv. |
| 2-8 | 1-8 | 1-8 | A | 2.5 | A | A | Inv. |
| 2-9 | 1-9 | 1-9 | A | 2.4 | A | A | Inv. |
| 2-10 | 1-10 | 1-10 | A | 1.6 | A | A | Inv. |
| 2-11 | 1-11 | 1-11 | A | 1.8 | A | A | Inv. |
| 2-12 | 1-12 | 1-12 | A | 1.8 | A | A | Inv. |
| 2-13 | 1-13 | 1-13 | A | 1.5 | A | A | Inv. |
| 2-14 | 1-14 | 1-14 | A | 1.6 | A | A | Inv. |
| 2-15 | 1-15 | 1-15 | A | 1.5 | A | A | Inv. |
| 2-16 | 1-16 | 1-16 | A | 1.5 | A | A | Inv. |
| 2-17 | 1-17 | 1-17 | A | 1.7 | A | A | Inv. |
| 2-18 | 1-18 | 1-18 | A | 2.1 | A | A | Inv. |
| 2-19 | 1-19 | 1-19 | A | 2.8 | A | A | Inv. |
| 2-20 | 1-20 | 1-20 | A | 3.0 | A | A | Inv. |
| 2-21 | 1-21 | 1-21 | C | 4.4 | C | D | Comp. |
| 2-22 | 1-22 | 1-22 | C | 4.7 | D | C | Comp. |
| 2-23 | 1-23 | 1-23 | C | 5.7 | C | D | Comp. |
| 2-24 | 1-24 | 1-24 | C | 5.3 | D | C | Comp. |
| 2-25 | 1-25 | 1-25 | B | 4.6 | C | D | Comp. |
| 2-26 | 1-26 | 1-26 | C | 4.4 | D | C | Comp. |
| 2-27 | 1-27 | 1-27 | B | 4.8 | C | C | Comp. |
| 2-28 | 1-28 | 1-28 | B | 4.4 | C | C | Comp. |
| 2-29 | 1-29 | 1-29 | B | 8.9 | D | D | Comp. |
| 2-30 | 1-30 | 1-30 | B | 6.7 | C | D | Comp. |
| 2-31 | 1-31 | 1-31 | B | 10.3 | D | D | Comp. |
| 2-32 | 1-32 | 1-32 | B | 5.7 | C | C | Comp. |
| 2-33 | 1-33 | 1-33 | B | 5.9 | C | C | Comp. |
| 2-34 | 1-34 | 1-34 | D | 12.3 | D | D | Comp. |
| 2-35 | 1-35 | 1-35 | D | 11.8 | D | D | Comp. |
| 2-36 | 1-36 | 1-36 | D | 10.6 | D | D | Comp. |
| 2-37 | 1-37 | 1-37 | D | 10.5 | D | D | Comp. |
| 2-38 | 1-38 | 1-38 | D | 16.1 | D | D | Comp. |

Inv.: Inventive,
Comp.: Comparative

Table 5 shows that even when the recycled materials are employed, the inventive film samples do not produce smoke, and provide excellent processing stability, excellent anti-coloring property, less variation of retardation and high transparency as compared with the comparative film samples. It has proved that the inventive samples have excellent optical properties and excellent recycling property. Particularly, it has proved that use of combinations A and B or use of combinations A and C brings about preferred synergic effects, resulting in improvement of performance.

Film samples 2-1 through 2-21, 2-23 and 2-25 were evaluated for bleeding-out according to the method described above, and as a result, bleeding out was observed on the surface thereof. In contrast, the preferred results were obtained that no bleeding out was observed on the surface of any of the inventive film samples.

Example 4

[Preparation of Coating Liquids]

In the following coating liquids, "parts" denotes "parts by weight".

| (Antistatic layer coating liquid (1)) | |
|---|---|
| Polymethyl methacrylate (weight average molecular weight: 550,000; Tg: 90° C.) | 0.5 parts |
| Propylene glycol monomethyl ether | 60 parts |
| Methyl ethyl ketone | 16 parts |
| Ethyl lactate | 5 parts |
| Methanol | 8 parts |
| Conductive polymer resin P-1 (particle size: 0.1-0.3 μm) | 0.5 parts |

| (Hard coat layer coating liquid (2)) | |
|---|---|
| Dipentaerythritol hexacrylate monomer | 60 parts |
| Dipentaerythritol hexacrylate dimmer | 20 parts |
| Dipentaerythritol hexacrylate oligomer (having three or more of dipentaerythritol hexacrylate unit) | 20 parts |
| Diethoxybenzophenone photoinitiator | 6 parts |
| Silicon-contained surface active agent | 1 part |

-continued

| (Hard coat layer coating liquid (2)) | |
|---|---|
| Propylene glycol monomethyl ether | 75 parts |
| Methyl ethyl ketone | 75 parts |

| (Anti-curl layer coating liquid (3)) | |
|---|---|
| Acetone | 35 parts |
| Ethyl acetate | 45 parts |
| Isopropyl alcohol | 5 parts |
| Diacetyl cellulose | 0.5 parts |
| 2% superfine silica particle acetone dispersion (Aerosil 200V, manufactured by Nippon Aerosil Co., Ltd.) | 0.1 parts |
| Conductive polymer resin P-1 | |

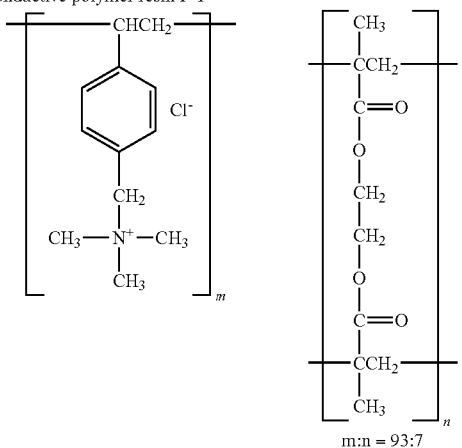

m:n = 93:7

Polarizing plate protective films provided with functions were prepared according to the following.

[Polarizing Plate Protective Film]

On one surface of sample 3-1, which was prepared in the same manner as cellulose ester film sample 1-1 of Example 1 except that the sample was stretched in the mechanical direction by a factor of 1.2 and in the transverse direction by a factor of 2.0, the anti-curl layer liquid (3) was applied using gravure coating so that the wet coating thickness was 13 μm, and then dried at a drying temperature of 80±5° C. to form an anti-curl layer. Thus, sample 3-1A was prepared.

The surface of the sample 3-1A opposite the anti-curl layer was coated with the antistatic layer coating liquid (1) at 28° C. and 82% RH, at a film conveyance speed of 30 m/min, and at a coating width of 1 m so that the wet coating thickness was 7 μm, and then dried at the drying section which was set at 80±5° C. to form an anti-static layer with a dry coating thickness of 0.2 μm. Thus, sample 3-1B with an antistatic layer was prepared.

In addition, the hard coat layer coating liquid (2) was coated on the antistatic layer of sample 3-1B so that the wet thickness was 13 μm, then dried at a drying temperature of 90° C., and then subjected to ultraviolet ray irradiation at 150 mJ/m$^2$ to form a clear hard coat layer with a dry thickness of 5 μm. Thus, sample 1-3C was prepared.

The resulting samples 3-1A, 3-1B and 3-1C had favorable coating properties without causing brushing and any cracks after drying.

Samples 3-2 (A, B and C) through 3-20 (A, B and C) were prepared in the same manner as in samples 3-1 (A, B and C) above, except that cellulose ester film sample 1-1 of Example 1 was changed to cellulose ester film samples 1-2 through 1-20 of Example 1. The resulting samples had favorable coating properties. Further, Samples 4-1 (A, B and C) through 4-20 (A, B and C) were prepared in the same manner as in samples 3-1 (A, B and C) above, except that cellulose ester film sample 1-1 of Example 1 was changed to cellulose ester film samples 2-1 through 2-20 of Example 2. The resulting samples also had favorable coating properties.

For comparison, the same procedures as above were performed using samples 1-21 through 1-38 prepared in Example 1.

Thus, samples with the anti-curl layer were designated as samples 3-21A through 3-38A, samples with the antistatic layer further applied as samples 3-21B through 3-38B, and samples with the hard coat layer further applied on the antistatic layer as samples 3-21C through 3-38C.

The results reveal that when coating was done in a high humidity environment, brushing occurred in samples 3-21A through 3-38A. Further, fine cracks after drying were sometimes observed in samples 3-21B through 3-38B, and fine cracks after drying were observed in samples 3-21C through 3-38C.

[Preparation of Polarizing Plate]

A 120 ml thick polyvinyl alcohol film was immersed in an aqueous solution comprised of 1 part by weight of iodine, 2 parts by weight of potassium iodide and 4 parts by weight of boric acid, and stretched at 50° C. by a factor of 4 to obtain a polarized film.

Inventive samples 1-1 through 1-20 and 2-1 through 2-20, and comparative samples 1-21 through 1-38 and 2-21 through 2-38 were subjected to alkali treatment at 40° C. for 60 seconds in 2.5 M aqueous solution of sodium hydroxide, then washed in water, and dried, thereby the surface of the samples was subjected to alkali treatment.

The alkali treated surface of inventive samples 1-1 through 1-20 and 2-1 through 2-20, and comparative samples 1-21 through 1-38 and 2-21 through 2-38 was adhered to each side of the polarized film obtained above using a 5% completely saponified polyvinyl alcohol aqueous solution as an adhesive. Thus, inventive polarizing plate samples 1-1 through 1-20 and 2-1 through 2-20, and comparative polarizing plate samples 1-21 through 1-38 and 2-21 through 2-38, each having a polarizing plate protective film, were prepared.

Inventive polarizing plate samples exhibited excellent polarization, and superior optical and physical properties, as compared to comparative polarizing plate samples.

(Liquid Crystal Display and its Evaluation)

The polarizing plate of a VA type liquid display, a 32-inch TV AQUEOUS-32AD5 (manufactured by Sharp Co., Ltd.) was peeled off. Each of the polarizing plate samples prepared above was cut to fit the size of the liquid crystal cell, and adhered to both sides of the liquid crystal cell so that the polarizing axes of the two polarizing plate samples intersected at right angles without changing the original polarizing axes. Thus, a 32-inch VA type color liquid crystal display was prepared in which the polarizing plates were changed, and evaluated for display properties. As a result, the liquid crystal display employing inventive polarizing plate samples exhibited high image contrast and excellent display properties, as compared to those employing comparative polarizing plate samples. This has proved that the liquid crystal display according to the invention is superior as an image display device such as a liquid crystal display.

The invention claimed is:

1. Cellulose ester pellets containing cellulose ester and at least one combination selected from combination A, combination B and combination C, the cellulose ester pellets containing the at least one combination in an amount of from 0.001 to 1.00% by weight based on the cellulose ester, wherein the combination A is a combination of a compound represented by formula (1) and a compound represented by formula (2), the combination B is a combination of a compound represented by formula (3) and a compound represented by formula (4), and the combination C is a combination of a compound represented by formula (5) and a compound represented by formula (6),

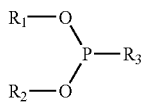

Formula (1)

wherein $R_1$ and $R_2$ independently represent an alkyl group, a cycloalkyl group or an aryl group; and $R_3$ represents an alkyl group, a cycloalkyl group, an aryl group, an alkoxy group or an aryloxy group,

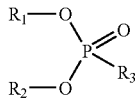

Formula (2)

wherein $R_1$ and $R_2$ independently represent an alkyl group, a cycloalkyl group or an aryl group; and $R_3$ represents an alkyl group, a cycloalkyl group, an aryl group, an alkoxy group or an aryloxy group,

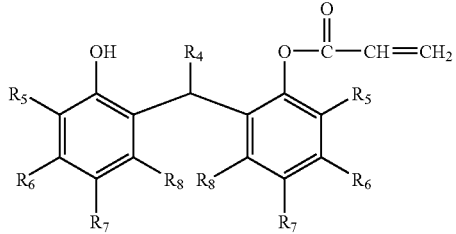

Formula (3)

wherein $R_4$ represents a hydrogen atom, an alkyl group or a cycloalkyl group; and $R_5$, $R_6$, $R_7$ and $R_8$ independently represent a hydrogen atom, an alkyl group, a cycloalkyl group, an aryl group, an alkoxy group or an aryloxy group,

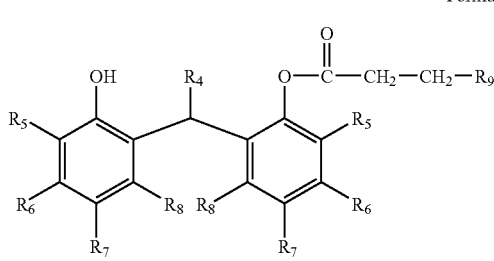

Formula (4)

wherein $R_4$ represents a hydrogen atom, an alkyl group or a cycloalkyl group; $R_5$, $R_6$, $R_7$ and $R_8$ independently represent a hydrogen atom, an alkyl group, a cycloalkyl group, an aryl group, an alkoxy group or an aryloxy group; and $R_9$ represents an alkyl group or a cycloalkyl group,

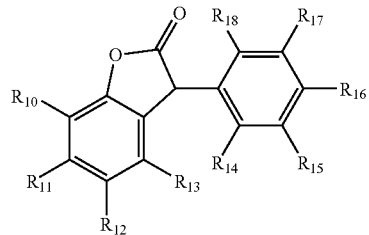

Formula (5)

wherein $R_{10}$, $R_{11}$, $R_{12}$, $R_{13}$, $R_{14}$, $R_{15}$, $R_{16}$, $R_{17}$ and $R_{18}$ independently represent a hydrogen atom, an alkyl group, a cycloalkyl group, an aryl group, an alkoxy group or an aryloxy group,

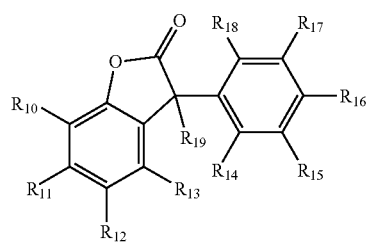

Formula (6)

wherein $R_{10}$, $R_{11}$, $R_{12}$, $R_{13}$, $R_{14}$, $R_{15}$, $R_{16}$, $R_{17}$ and $R_{18}$ independently represent a hydrogen atom, an alkyl group, a cycloalkyl group, an aryl group, an alkoxy group or an aryloxy group; and $R_{19}$ represents an alkyl group or a cycloalkyl group.

2. The cellulose ester pellets of claim 1, containing combination A and combination B each in an amount of from 0.001 to 1.00% based on the cellulose ester.

3. The cellulose ester pellets of claim 1, containing combination A and combination C each in an amount of from 0.001 to 1.00% based on the cellulose ester.

4. The cellulose ester pellets of claim 1, wherein $R_3$ in formula (1) or (2) represents an alkyl group or an aryl group.

5. A cellulose ester film containing cellulose ester and at least one combination selected from combination A, combination B and combination C, the cellulose ester film containing the at least one combination in an amount of from 0.001 to 1.00% by weight based on the cellulose ester, wherein the combination A is a combination of a compound represented by formula (1) and a compound represented by formula (2), the combination B is a combination of a compound represented by formula (3) and a compound represented by formula (4), and the combination C is a combination of a compound represented by formula (5) and a compound represented by formula (6),

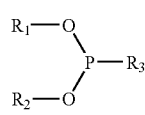

Formula (1)

wherein $R_1$ and $R_2$ independently represent an alkyl group, a cycloalkyl group or an aryl group; and $R_3$ represents an alkyl group, a cycloalkyl group, an aryl group, an alkoxy group or an aryloxy group, Formula (2)

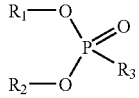

wherein $R_1$ and $R_2$ independently represent an alkyl group, a cycloalkyl group or an aryl group; and $R_3$ represents an alkyl group, a cycloalkyl group, an aryl group, an alkoxy group or an aryloxy group, Formula (3)

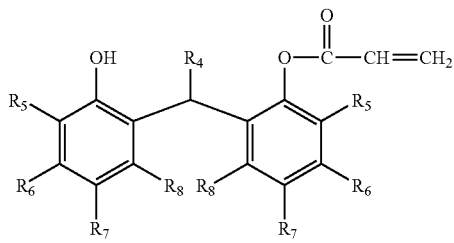

wherein $R_4$ represents a hydrogen atom, an alkyl group or a cycloalkyl group; and $R_5$, $R_6$, $R_7$ and $R_8$ independently represent a hydrogen atom, an alkyl group, a cycloalkyl group, an aryl group, an alkoxy group or an aryloxy group, Formula (4)

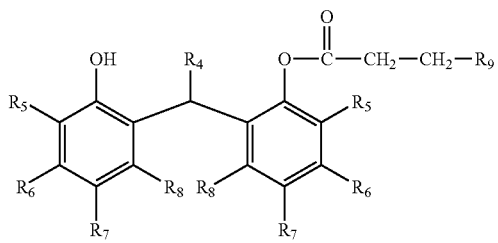

wherein $R_4$ represents a hydrogen atom, an alkyl group or a cycloalkyl group; $R_5$, $R_6$, $R_7$ and $R_8$ independently represent a hydrogen atom, an alkyl group, a cycloalkyl group, an aryl group, an alkoxy group or an aryloxy group; and $R_9$ represents an alkyl group or a cycloalkyl group, Formula (5)

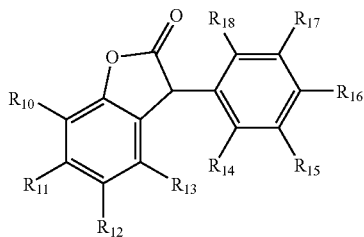

wherein $R_{10}$, $R_{11}$, $R_{12}$, $R_{13}$, $R_{14}$, $R_{15}$, $R_{16}$, $R_{17}$ and $R_{18}$ independently represent a hydrogen atom, an alkyl group, a cycloalkyl group, an aryl group, an alkoxy group or an aryloxy group, Formula (6)

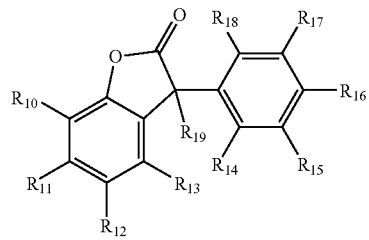

wherein $R_{10}$, $R_{11}$, $R_{12}$, $R_{13}$, $R_{14}$, $R_{15}$, $R_{16}$, $R_{17}$ and $R_{18}$ independently represent a hydrogen atom, an alkyl group, a cycloalkyl group, an aryl group, an alkoxy group or an aryloxy group; and $R_{19}$ represents an alkyl group or a cycloalkyl group.

6. The cellulose ester film of claim 5, containing combination A and combination B each in an amount of from 0.001 to 1.00% based on the cellulose ester.

7. The cellulose ester film of claim 5, containing combination A and combination C each in an amount of from 0.001 to 1.00% based on the cellulose ester.

8. The cellulose ester film of claim 5, wherein $R_3$ in formula (1) or (2) represents an alkyl group or an aryl group.

9. A method for manufacturing a cellulose ester film according to a melt cast method comprising heat-melting the cellulose ester pellets of claim 1 without using a solvent to prepare a cellulose ester melt, and then casting the melt on a support.

10. A method for manufacturing a cellulose ester film according to a melt cast method comprising preparing a cellulose ester melt containing a recycled material of the cellulose ester film of claim 5, and casting the cellulose ester melt on a support.

11. A polarizing plate comprising the cellulose ester film of claim 5 and a polarized film having a first surface and a second surface, the cellulose ester film being provided on at least one surface of the first and second surfaces.

12. A liquid crystal display comprising the polarizing plate of claim 11 and a liquid crystal cell having a first surface and a second surface, wherein the polarizing plate is provided on at least one surface of the first and second surfaces of the liquid crystal cell.

* * * * *